(12) United States Patent
Sloneker et al.

(10) Patent No.: US 12,414,488 B2
(45) Date of Patent: Sep. 16, 2025

(54) AGRICULTURAL TRENCH DEPTH SYSTEMS, METHODS, AND APPARATUS

(71) Applicant: Precision Planting LLC, Tremont, IL (US)

(72) Inventors: Dillon Sloneker, Danvers, IL (US); Jeremy J. Hodel, Morton, IL (US); Ben L. Schlipf, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 487 days.

(21) Appl. No.: 17/754,512

(22) PCT Filed: Sep. 22, 2020

(86) PCT No.: PCT/IB2020/058831
§ 371 (c)(1),
(2) Date: Apr. 4, 2022

(87) PCT Pub. No.: WO2021/064513
PCT Pub. Date: Apr. 8, 2021

(65) Prior Publication Data
US 2024/0008394 A1    Jan. 11, 2024

Related U.S. Application Data

(60) Provisional application No. 62/934,816, filed on Nov. 13, 2019, provisional application No. 62/934,796, (Continued)

(51) Int. Cl.
*A01B 63/16* (2006.01)
*A01B 63/00* (2006.01)
(Continued)

(52) U.S. Cl.
CPC ............ *A01B 63/16* (2013.01); *A01B 63/008* (2013.01); *A01C 5/064* (2013.01); *A01C 7/08* (2013.01)

(58) Field of Classification Search
CPC ......... A01B 63/16; A01B 63/14; A01B 63/00; A01B 63/008; A01B 63/002; A01C 5/064; A01C 5/062; A01C 5/06; A01C 5/00
See application file for complete search history.

(56) References Cited

U.S. PATENT DOCUMENTS 4,413,685 A    11/1983    Gremelspacher et al.
5,524,560 A    6/1996    Carter
(Continued)

FOREIGN PATENT DOCUMENTS

CN    110859071 A    3/2020
EP    3 300 566 A1    4/2018
(Continued)

OTHER PUBLICATIONS

European Patent Office, International Search Report related to International Patent Application No. PCT/IB2020/058831, mail date Dec. 21, 2020.
(Continued)

*Primary Examiner* — Christopher J. Novosad

(57) ABSTRACT

Apparatus for adjusting the depth of a trench opened by a row unit (10) of an agricultural planter. The row unit (10) includes a trench depth adjustment assembly (90) configured to modify the trench depth. The trench depth adjustment assembly (90) includes a depth adjustment body (94) pivotally connected via a pivot (92) to a frame member (14) of the row unit (10). An electric motor (3030) is operable to cause rotation of a shaft (3034) operably coupled with the depth adjustment body (94), whereby rotation of the shaft (3034) causes the depth adjustment body (94) to pivotally (Continued)

move about the pivot (92) thereby changing a position of contact of the depth adjustment body (94) with a gauge wheel arm (54), thus changing the amount of upward travel of the gauge wheel (52) with respect to a trench opening disc (62) and thus the depth of the trench.

12 Claims, 66 Drawing Sheets

Related U.S. Application Data filed on Nov. 13, 2019, provisional application No. 62/934,826, filed on Nov. 13, 2019, provisional application No. 62/910,271, filed on Oct. 3, 2019, provisional application No. 62/910,240, filed on Oct. 3, 2019, provisional application No. 62/910,254, filed on Oct. 3, 2019.

(51) Int. Cl.
*A01C 5/06* (2006.01)
*A01C 7/08* (2006.01)

(56) References Cited

U.S. PATENT DOCUMENTS

| | | |
|---|---|---|
| 5,841,282 A | 11/1998 | Christy et al. |
| 6,356,830 B1 | 3/2002 | Adamchuck et al. |
| 8,204,689 B2 | 6/2012 | Christy et al. |
| 11,678,598 B2 * | 6/2023 | Sloneker ................ A01C 5/064 172/4 |
| 11,832,544 B2 * | 12/2023 | Sloneker ................ A01C 7/203 |
| 2015/0066315 A1 | 3/2015 | Achen et al. |
| 2016/0037709 A1 | 2/2016 | Sauder et al. |
| 2017/0000003 A1 | 1/2017 | Dienst |
| 2017/0006757 A1 | 1/2017 | Anderson et al. |
| 2019/0000004 A1 | 1/2019 | Sloneker et al. |
| 2019/0110392 A1 | 4/2019 | Gresch et al. |

FOREIGN PATENT DOCUMENTS

| | | |
|---|---|---|
| EP | 3 469 868 A1 | 4/2019 |
| WO | 2012/129442 A2 | 9/2012 |
| WO | 2012/149398 A1 | 11/2012 |
| WO | 2012/149415 A1 | 11/2012 |
| WO | 2014/066654 A1 | 9/2014 |
| WO | 2014/153157 A1 | 9/2014 |
| WO | 2017/143121 A1 | 8/2017 |
| WO | 2019/169412 A1 | 9/2019 |

OTHER PUBLICATIONS

UK Intellectual Property Office, Search report for related UK Application No. GB1915093.7, dated Apr. 14, 2020.

* cited by examiner

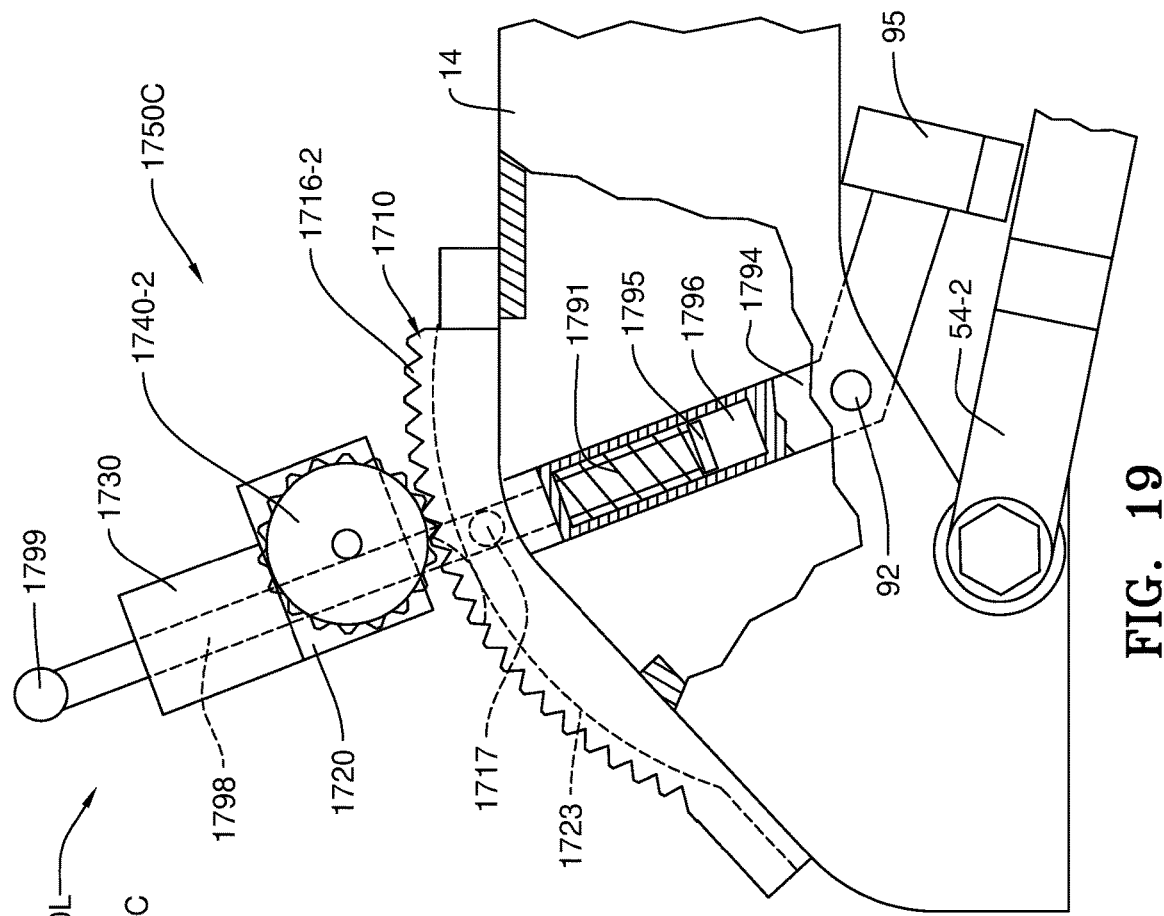
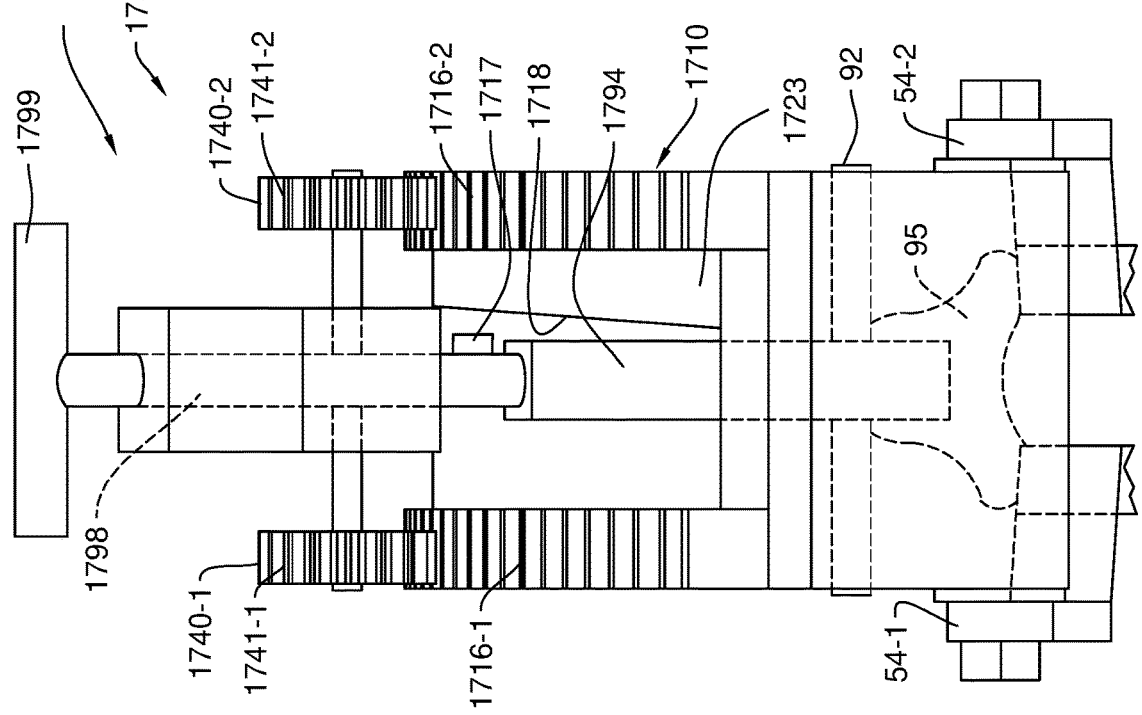

AGRICULTURAL TRENCH DEPTH SYSTEMS, METHODS, AND APPARATUS

BACKGROUND

In recent years, farmers have recognized the need to select and maintain the proper planting depth to ensure the proper seed environment (e.g., temperature and moisture) and seedling emergence. To improve agronomic practices, it would also be desirable for the farmer to understand the relationship between actual planting depth and metrics such as emergence and yield. Conventional agricultural planters include only apparatus for adjusting a maximum planting depth, which may not be maintained during operation due to soil conditions or insufficient down-pressure on the planter row unit. Even in operation of modern planters having sensors for determining whether full trench depth has been lost, the actual depth planted is still not determined. Thus there is a need for systems, methods and apparatus for controlling and/or measuring the depth of a trench opened by an agricultural planter.

DESCRIPTION OF THE DRAWINGS

FIG. 19 is a side elevation and partial cutaway view of another embodiment of a depth adjustment assembly with a position location system.

FIG. 19A is rear elevation view of the embodiment of FIG. 19.

DESCRIPTION

Figure 1:
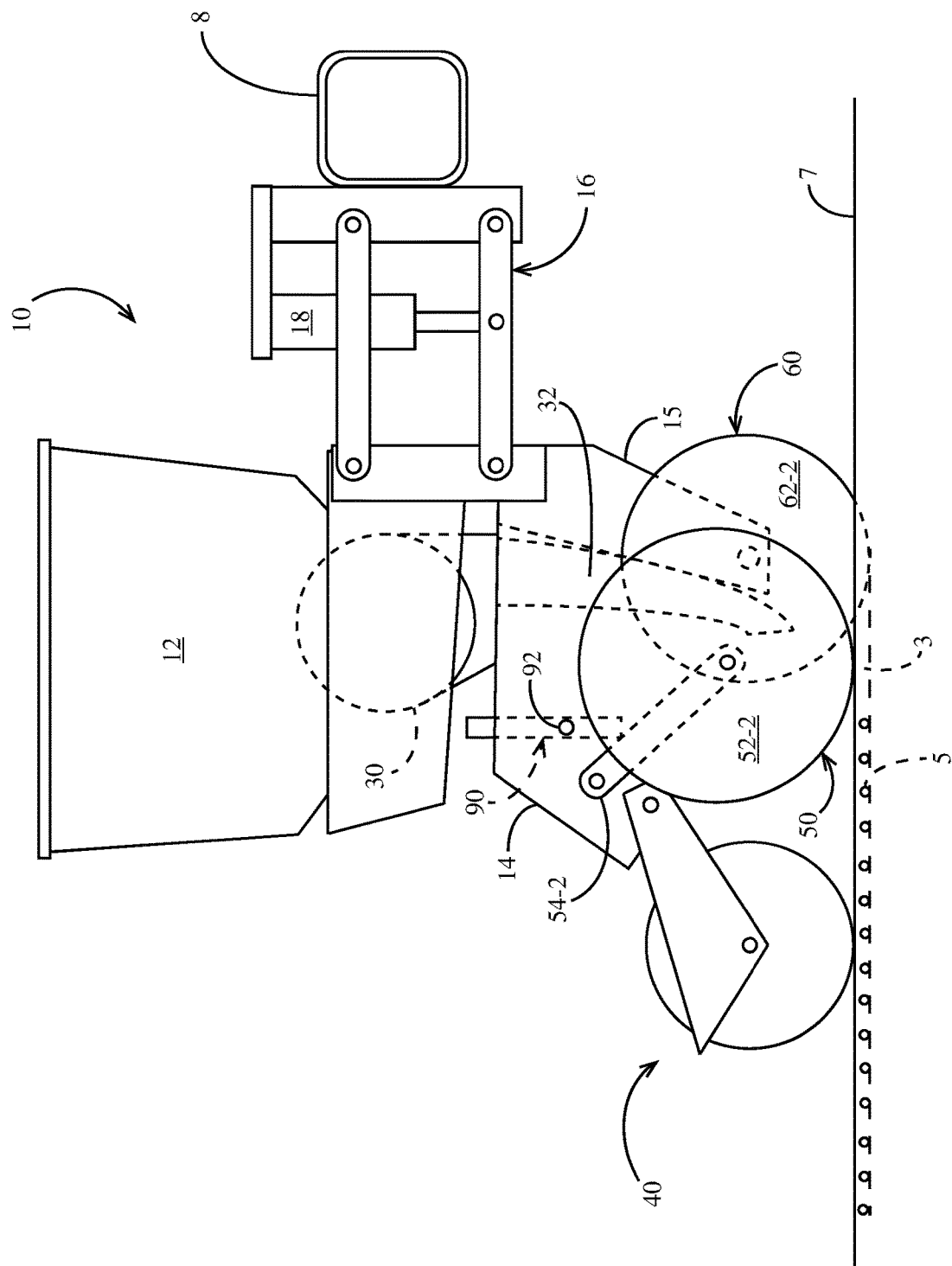
FIG. 1 is a right side elevation view of an embodiment of an agricultural row unit.
Figure 2:
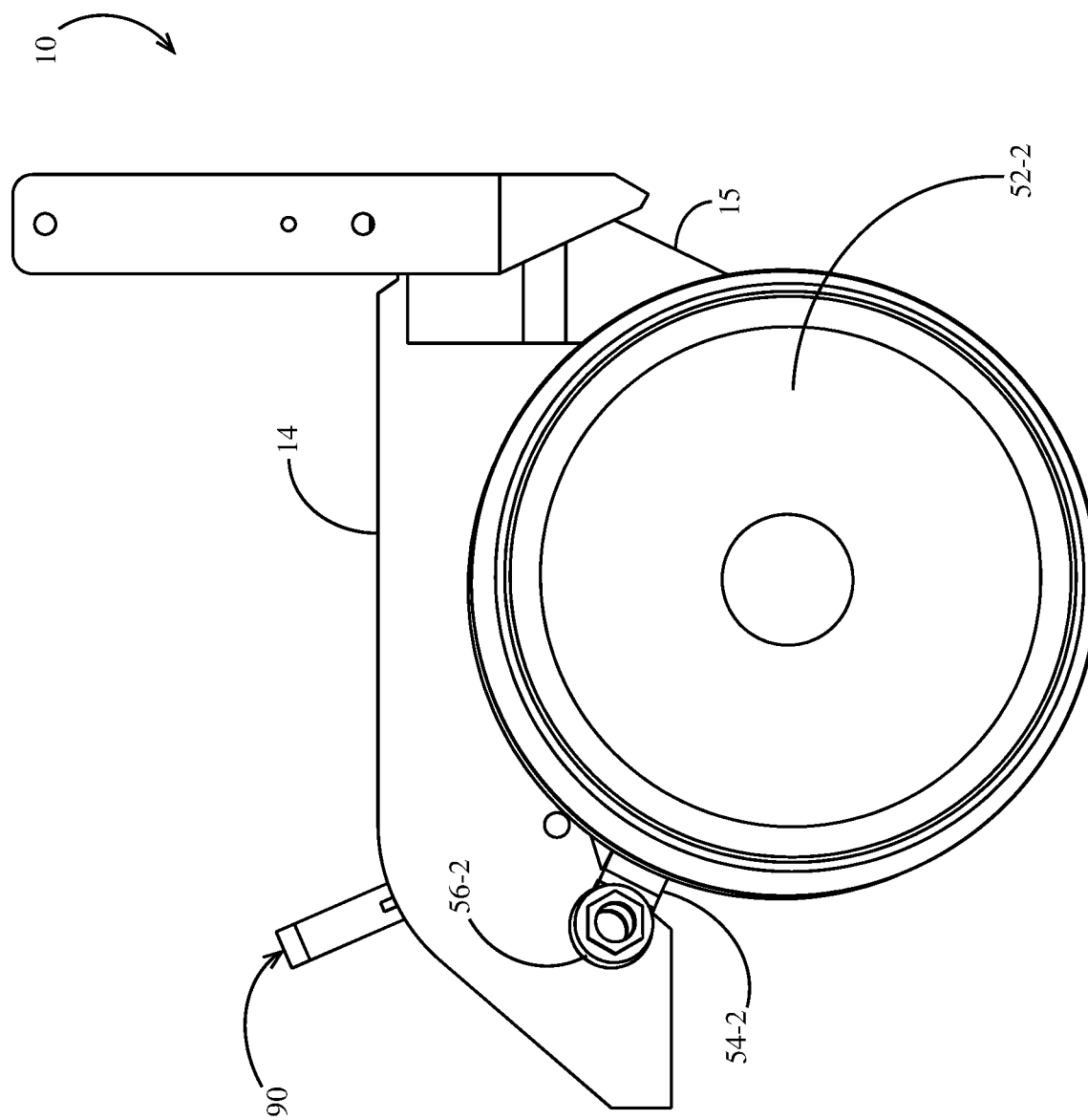
FIG. 2 is a right side elevation view of another embodiment of an agricultural row unit with certain components removed for clarity.
Figure 3:
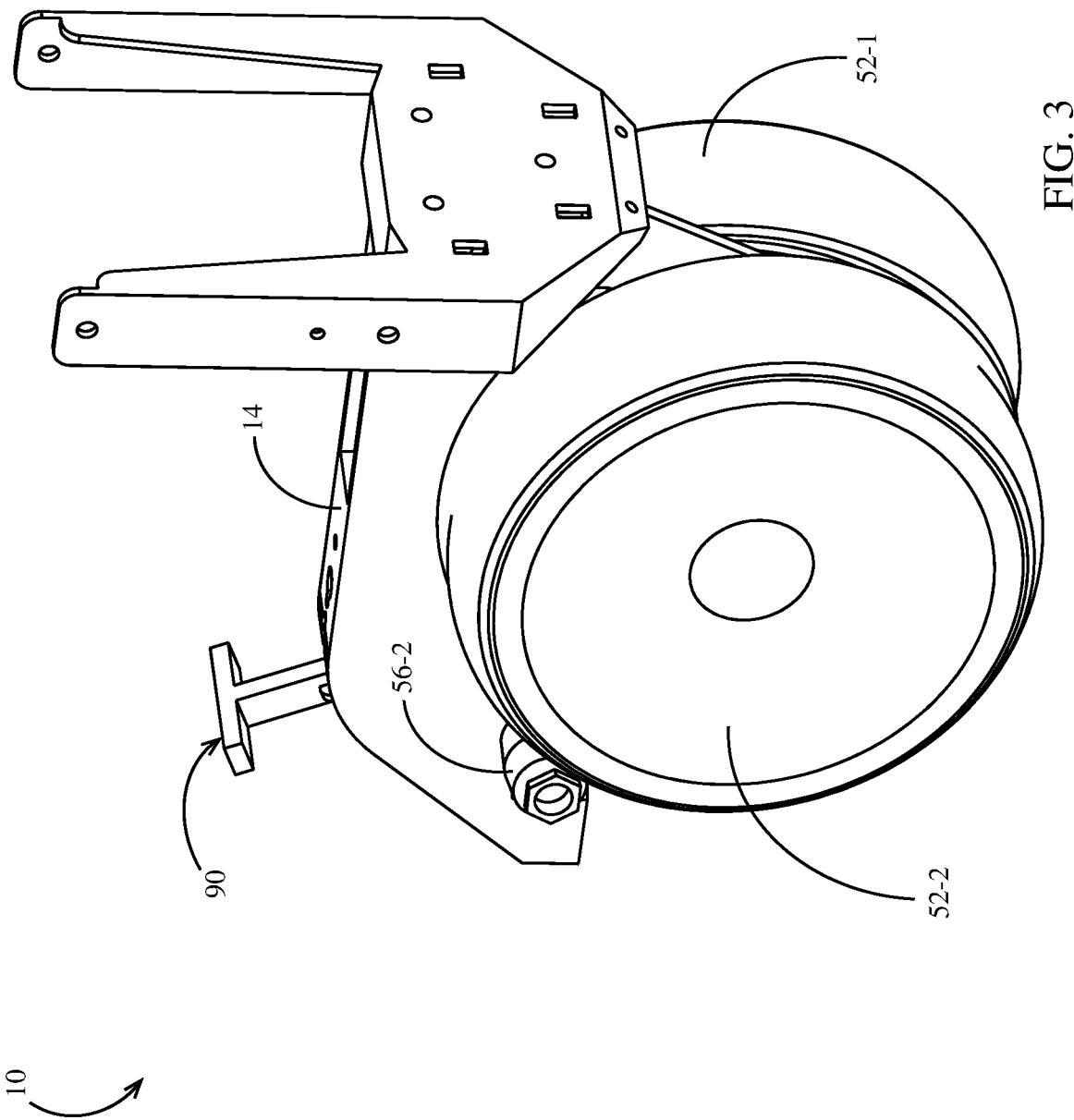
FIG. 3 is a perspective view of the agricultural row unit of FIG. 2.
Figure 4:
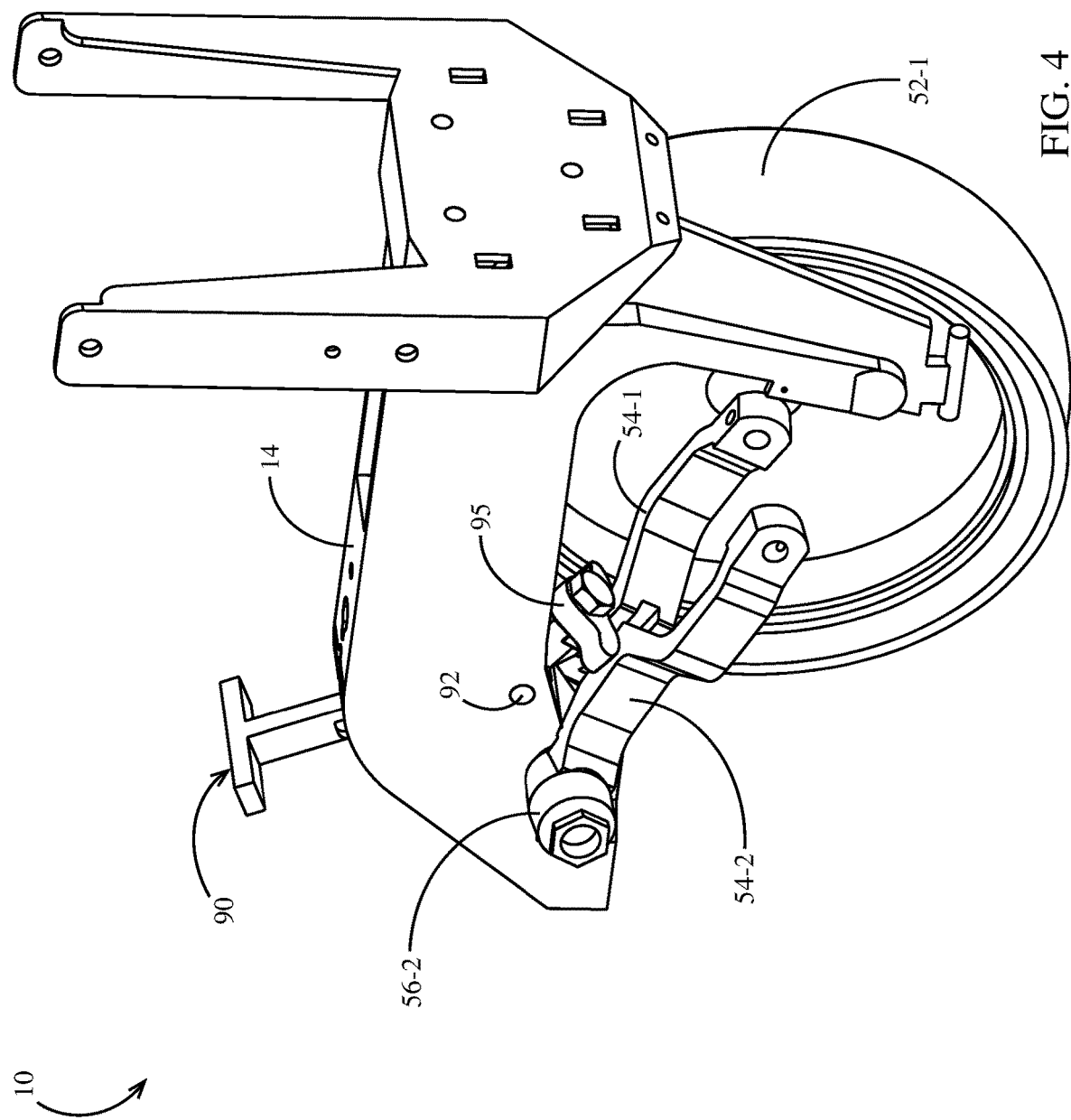
FIG. 4 is a perspective view of the agricultural row unit of FIG. 2 with a right gauge wheel removed for clarity.
Figure 5:
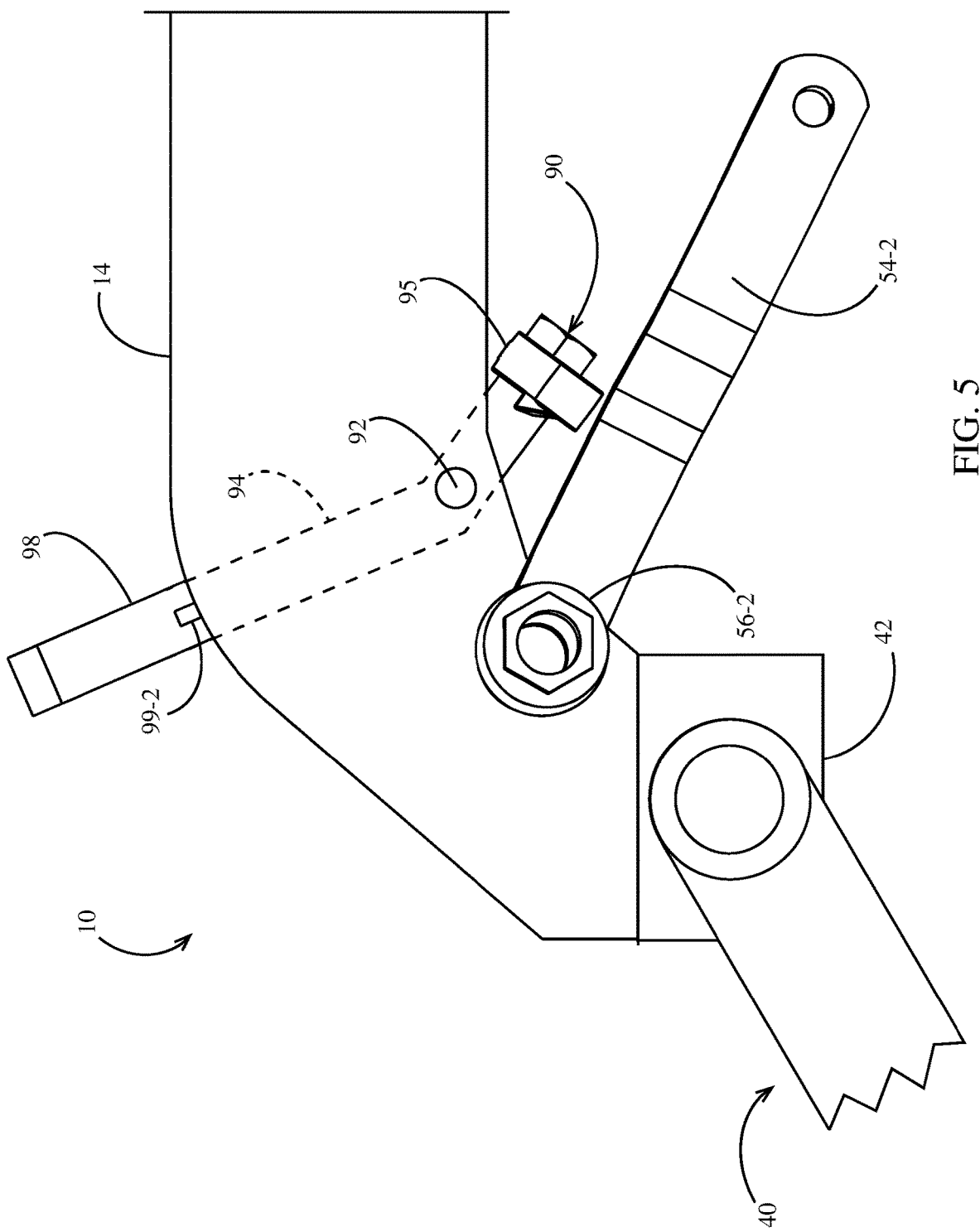
FIG. 5 is an enlarged partial right side elevation view of the agricultural row unit of FIG. 2.
Figure 6:
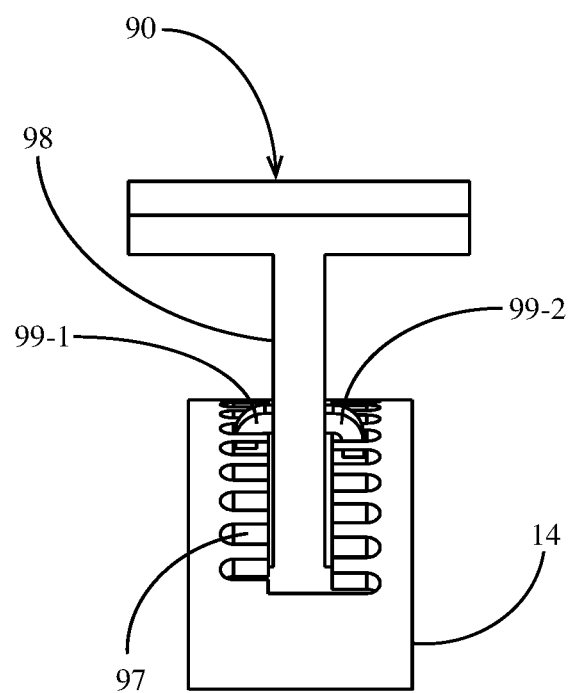
FIG. 6 is a rear elevation view of the agricultural row unit of FIG. 2.

Referring now to the drawings, wherein like reference numerals designate identical or corresponding parts throughout the several views, FIG. 1 illustrates an agricultural implement, e.g., a planter, comprising a toolbar 8 to which multiple row units 10 are mounted in transversely spaced relation. Each row unit 10 is preferably mounted to the toolbar by a parallel arm arrangement 16 such that the row unit is permitted to translate vertically with respect to the toolbar. A downforce actuator 18 may be mounted to the toolbar 8 and the parallel arm arrangement 16 and configured to apply supplemental down-pressure to the row unit 10.

The row unit 10 includes a frame 14 which supports an opening disc assembly 60. The opening assembly 60 may include two angled opening discs 62 rollingly mounted to a downwardly extending shank 15 of the frame 14. The opening discs 62 open a v-shaped trench 3 (i.e., furrow, seed furrow) in the soil surface 7 as the row unit 10 advances in a forward direction of travel through the field. The row unit 10 includes a gauge wheel assembly 50 which may comprise two gauge wheels 52 pivotally mounted to either side of the frame 14 by two gauge wheel arms 54. The gauge wheels 52 roll along the surface of the soil. A depth adjustment assembly 90 pivotally mounted to the frame 14 at a pivot 92 contacts the gauge wheel arms 54 to limit the upward travel of the gauge wheel arms 54, thus limiting the depth of the trench opened by the opening disc assembly 60. A closing assembly 40 is preferably pivotally coupled to the frame 14 and configured to move soil back into the trench 3.

Continuing to refer to FIG. 1, seeds 5 are communicated from a hopper 12 to a seed meter 30 configured to singulate the supplied seeds. The meter 30 may be a vacuum-type meter such as that disclosed in Applicant's International Patent Pub. No. WO/2012/129442, the disclosure of which is hereby incorporated by reference herein in its entirety. In operation, the seed meter 30 preferably deposits the supplied seeds into a seed tube 32 which may be removably mounted to the frame 14. In operation, seeds 5 deposited by the meter 30 fall through the seed tube 32 into the trench 3.

Figure 7:
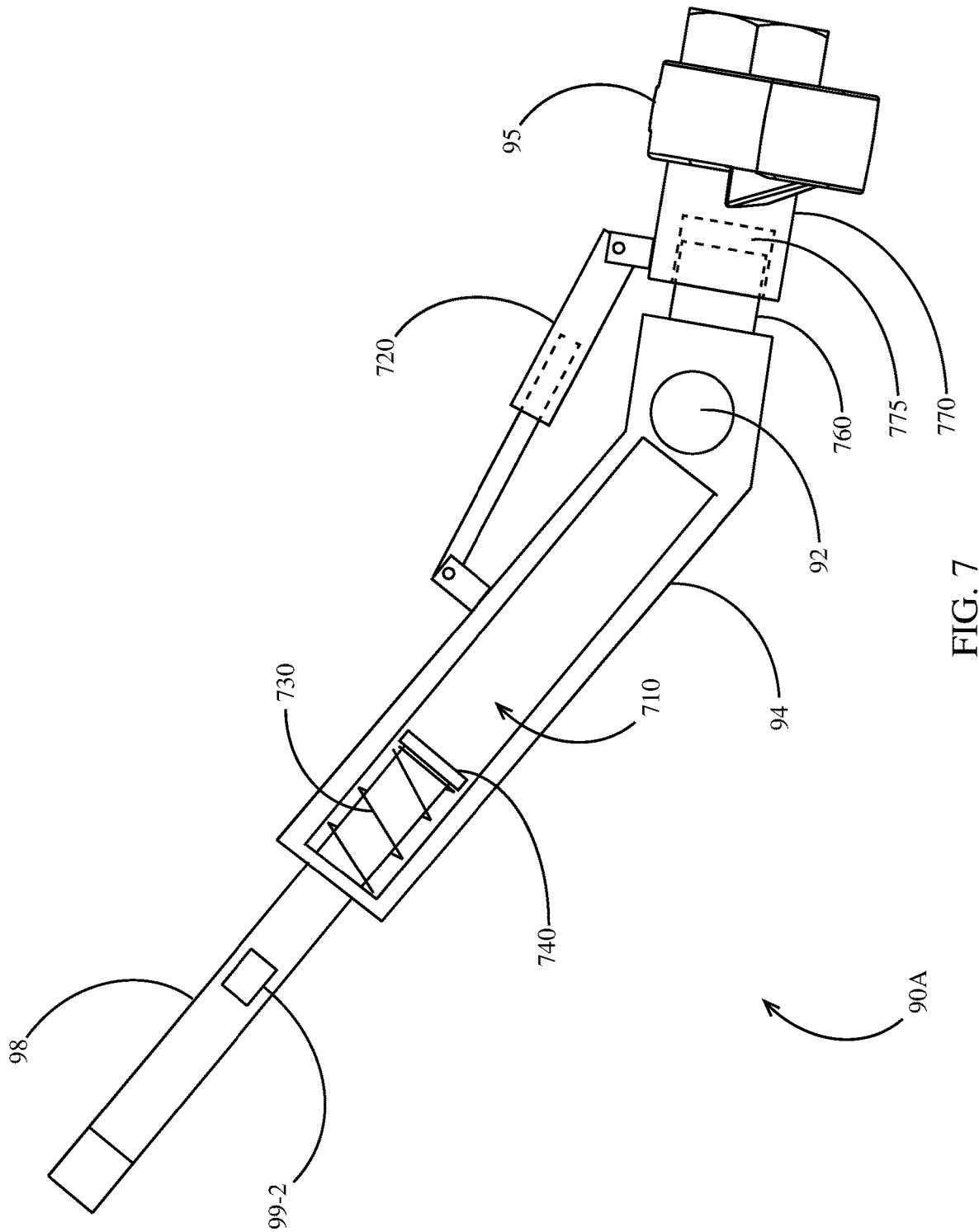
FIG. 7 is a side elevation view of an embodiment of a depth adjustment assembly and a secondary depth adjustment assembly.

Turning to FIGS. 2-6, the depth adjustment assembly 90 is illustrated in more detail. The depth adjustment assembly 90 includes a rocker 95 pivotally mounted to a depth adjustment body 94. The depth adjustment body 94 is pivotally mounted to the row unit frame 14 about the pivot 92. A handle 98 is slidably received within the depth adjustment body 94 such that the user can selectively engage and disengage the handle (e.g., left and right hooks 99-1, 99-2, respectively, which may be formed as a part of the handle 98) with one of a plurality of depth adjustment slots 97 (FIG. 6) formed within the row unit frame 14. With reference to FIG. 7, the handle 98 is partially slidingly received within a cavity 710 of the depth adjustment body 94, and an optional spring 730 engages an annular lip 740 disposed on the bottom end of the handle 98. The spring 730 imposes a resilient force to retain the hooks 99 (FIG. 6) in the selected slot 97, but permits the user to withdraw the handle 98 to temporarily disengage the hooks 99 from the slot 97. In operation, the upward travel of the gauge wheels 52 is limited by contact of the gauge wheel arms 54 with the rocker 95. When one of the gauge wheels, e.g., left gauge wheel 52-1, encounters an obstruction, the rocker 95 allows the left gauge wheel arm 54-1 to travel upward while lowering the right gauge wheel 52-2 by the same absolute displacement such that the row unit 10 rises by half the height of the obstruction. It should be appreciated that there are other row units with manual adjustments similar to those described herein. Non-limiting examples can be found in U.S. Publication Nos. US20170000003 and US20170006757, both of which are incorporated herein by reference. The depth adjustment assemblies described herein work with similar systems with rockers, pivot, and adjustment arms.

It should be appreciated that the handle 98 and depth adjustment body 94 comprise a primary depth adjustment sub-assembly configured to permit the user to select one of a plurality of pre-selected furrow depths. The pre-selected furrow depths each correspond to one of the depth adjustment slots 97. In some embodiments, as described in detail later, rather than using the handle 98 to manually select a depth adjustment slot, an actuator may be used to adjust the position of handle 98; for example, a linear actuator (not shown) mounted to the row unit frame 14 may be disposed to adjust the position of the handle 98. Alternatively, a rotary actuator may turn a gear which adjusts the position of the handle relative to the depth adjustment slots 97.

In each of the embodiments illustrated in FIGS. 7-10A and 12, a secondary depth adjustment assembly is configured to modify one or more of the pre-selected furrow depths. The secondary depth adjustment assembly may modify the pre-selected furrow depths by more precise adjustments (e.g., by smaller adjustment steps) than the depth modifications enabled by the primary depth adjustment assembly (e.g., by selecting which depth adjustment slot 97 is engaged by the handle 98). For example, referring FIG. 7, the depth adjustment assembly 90A includes an actuator 720 which adjusts the effective length of the depth adjustment assembly 90A. In the illustrated embodiment, the extension of actuator 720 determines the position of the rocker 95 relative to the depth adjustment body 94. As illustrated, the rocker 95 is pivotally mounted to a movable member 770 having a cavity 775 for receiving a protrusion 760 mounted to (or formed as a part with) the depth adjustment body 94. The protrusion 760 and cavity 775 retain the alignment of the moveable member relative to the depth adjustment body 94, but permit the actuator 720 to modify the position along an axis which is parallel to the pivot axis of the rocker 95. It should be appreciated that modification of the extension of actuator 720 (and thus the effective length of the depth adjustment assembly) modifies the furrow depth for any given depth setting of the handle 98. Any of the secondary depth adjustment assemblies described herein may be used as the only depth adjustment, such that the primary depth adjustment does not need to be set, and whereby the secondary depth adjustment can adjust the depth adjustment body 94 across the entire range of depth settings.

Figure 8:
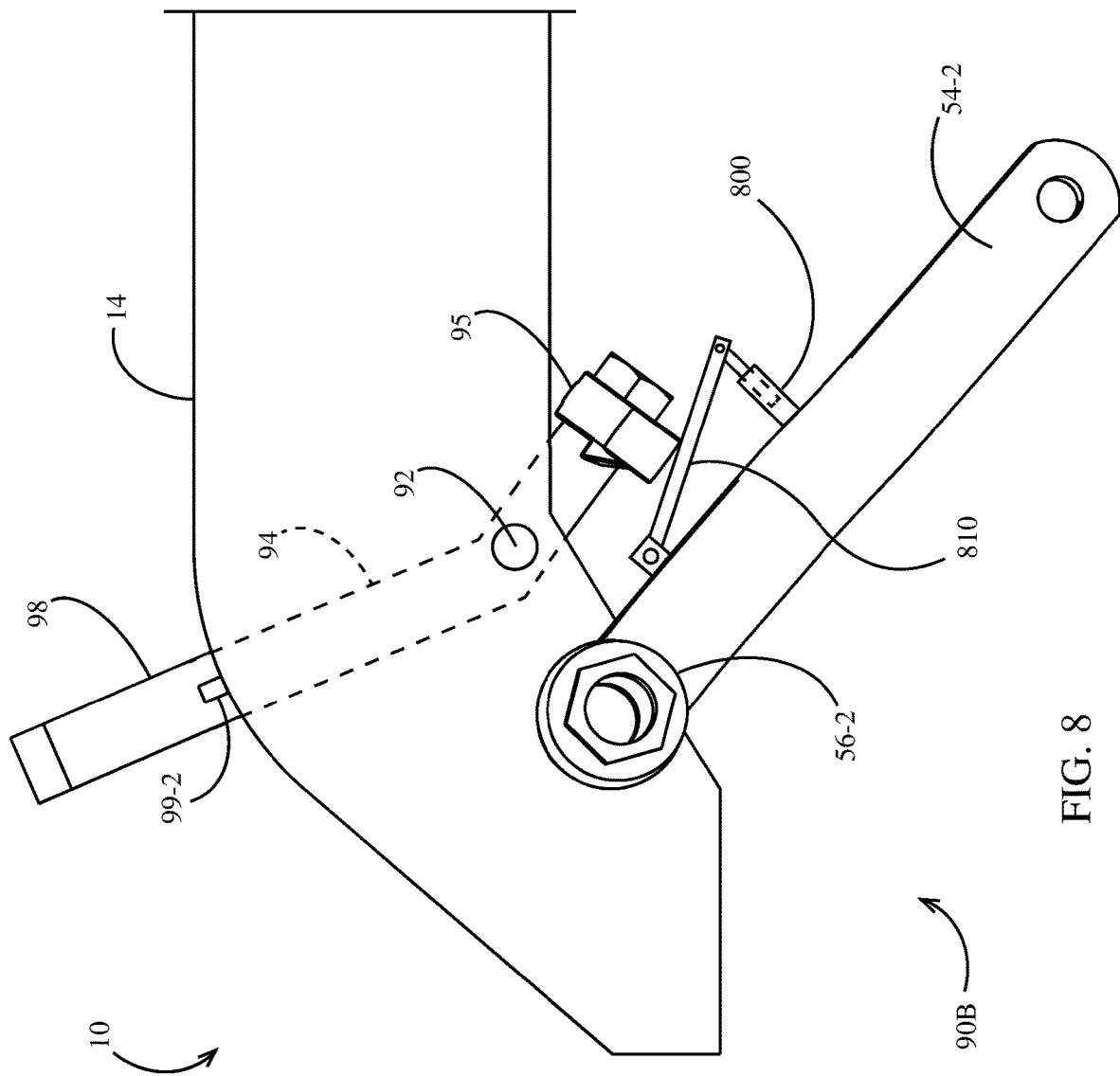
FIG. 8 is a side elevation view of another embodiment of a depth adjustment assembly and a secondary depth adjustment assembly.

FIG. 8 illustrates another embodiment of a depth adjustment assembly 90B having a secondary depth adjustment assembly wherein an actuator 800 modifies the angular position at which one or more gauge wheel arms 54 is stopped by the depth adjustment assembly 90B for any given setting of the depth adjustment handle 98. The actuator 800 adjusts a position of a surface 810 which is pivotally mounted to the gauge wheel arm 54; the surface 810 is disposed to contact the rocker 95 at the point of maximum upward travel of the gauge wheel arm 54. Extension of the actuator 800 and thus modification of the position of surface 810 thus modifies the point of maximum upward travel of the gauge wheel and thus modifies the furrow depth determined by the gauge wheel. In some embodiments, a functionally similar actuator 800 and pivotally-mounted surface 810 may be mounted to both gauge wheel arms 54.

Figure 9:
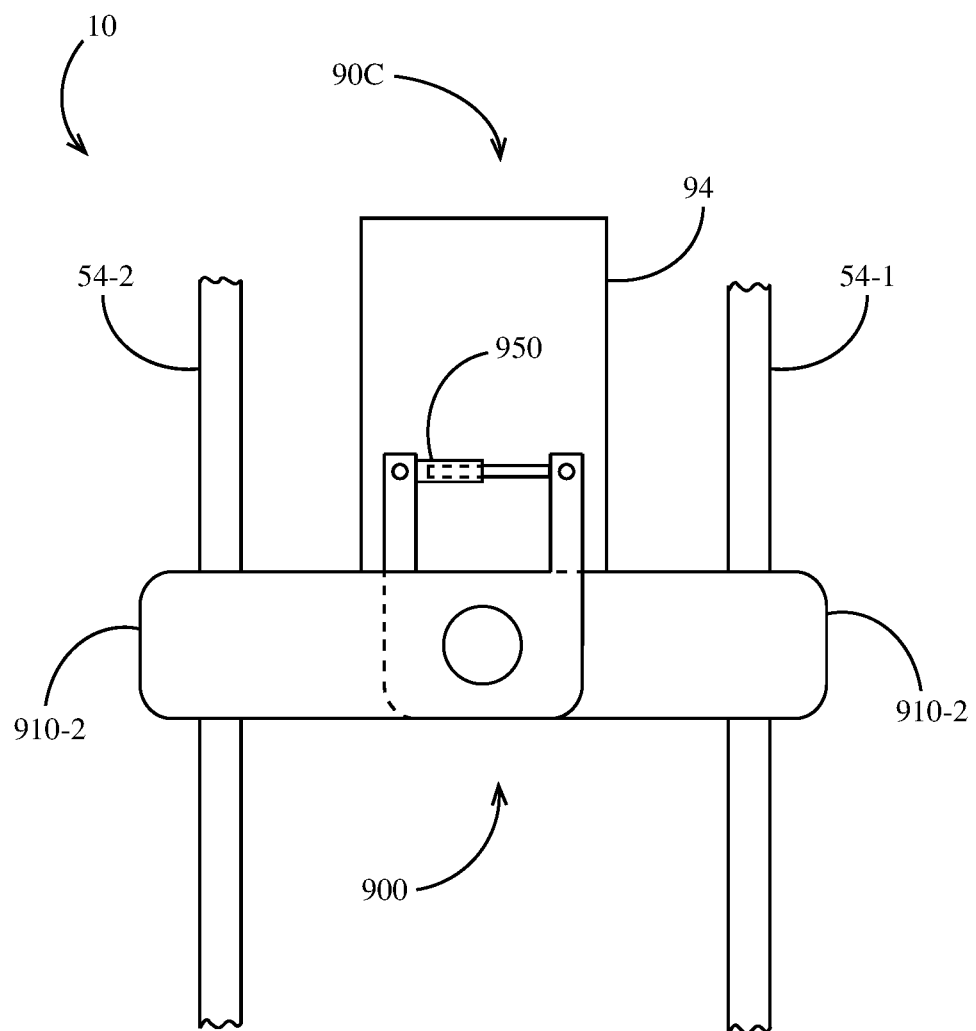
FIG. 9 is a side elevation view of another embodiment of a depth adjustment assembly and a secondary depth adjustment assembly.

FIG. 9 illustrates another embodiment of a depth adjustment assembly 90C having a secondary depth adjustment assembly wherein a modified rocker 900 is configured to modify its shape in order to modify the furrow depth for any given depth setting of the handle 98. The rocker 900 includes portions 910-1, 910-2 which contact the gauge wheel arms 54-1 and 54-2, respectively, to limit the upward travel of the gauge wheel arms. An actuator 950 changes the angle between the portions 910-1 and 910-2 and thus the shape of the rocker 900. Retraction of the actuator 950 raises the members 910 and thus modifies the maximum height of the gauge wheel arms 54 and the furrow depth.

Figure 10:
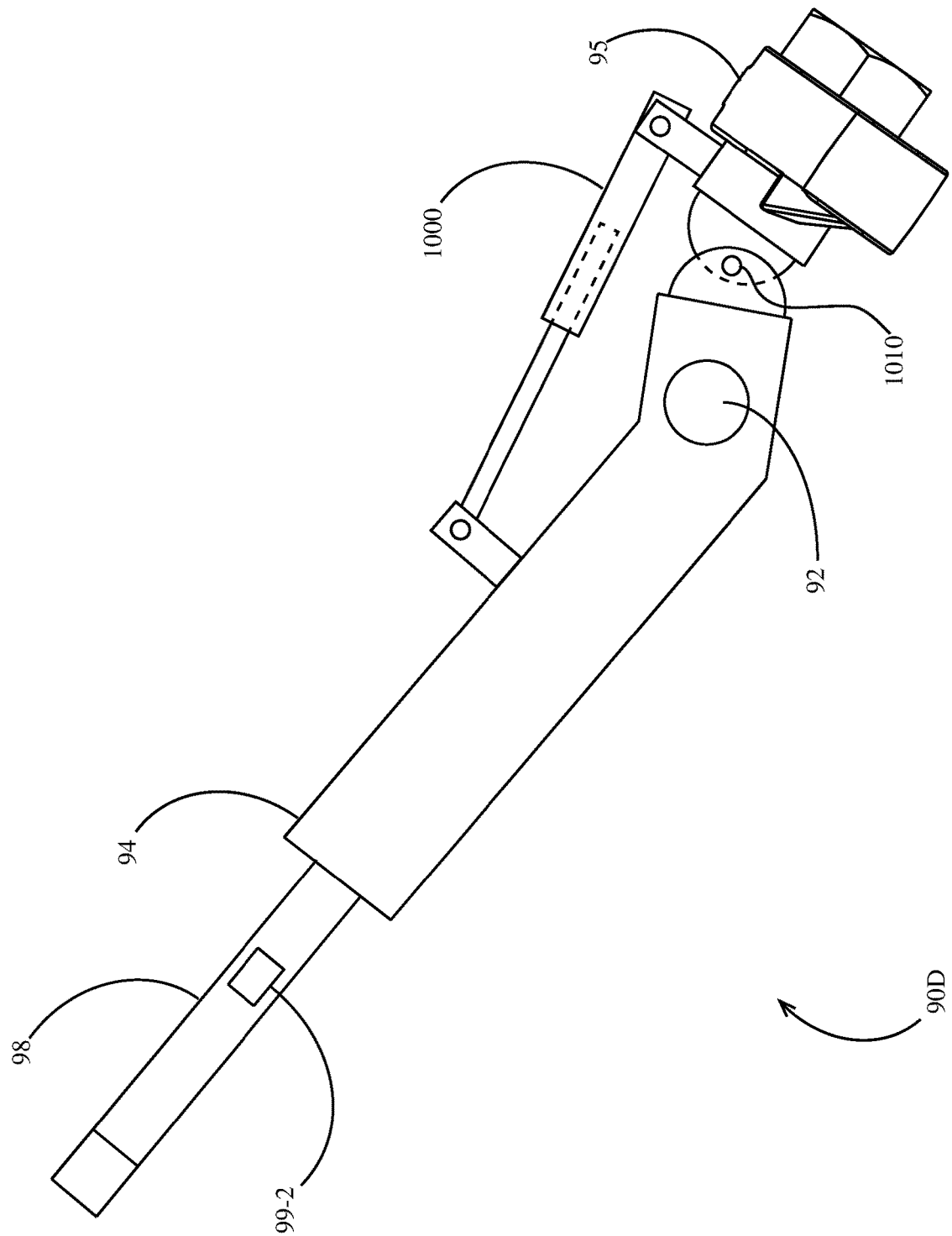
FIG. 10 is a side elevation view of another embodiment of a depth adjustment assembly and a secondary depth adjustment assembly.

FIG. 10 illustrates another embodiment of a depth adjustment assembly 90D having a secondary depth adjustment assembly wherein the rocker 95 is pivotally mounted to the depth adjustment body 94, preferably about a laterally extending axis defined by pivot 1010. An actuator 1000 preferably determines the angular position of the rocker 95 about the pivot 1010 relative to the depth adjustment body 94, thus modifying the maximum upward travel of the gauge wheel arms 54 and the furrow depth.

Figure 10A:
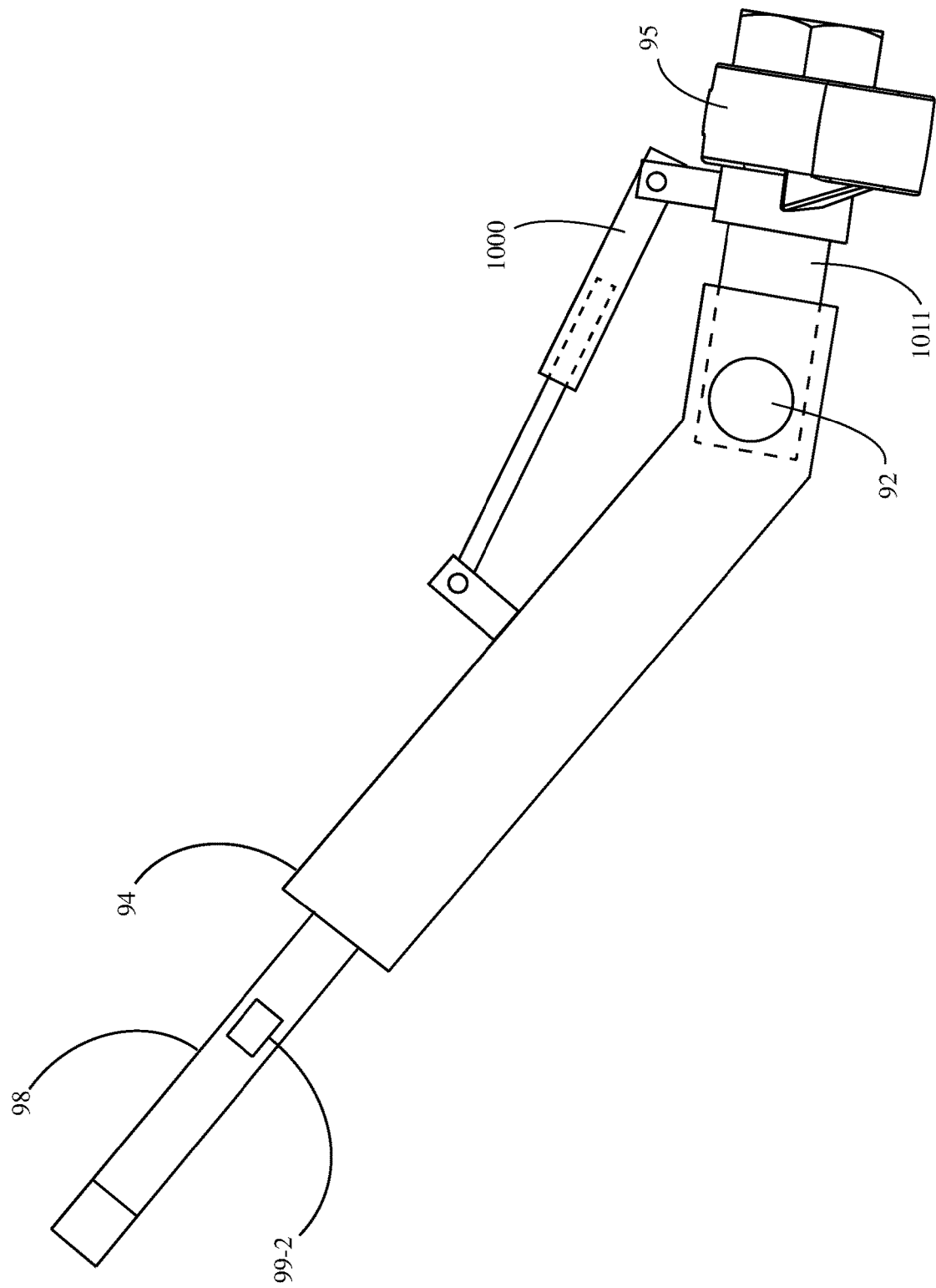
FIG. 10A is a side elevation view of another embodiment of a depth adjustment assembly and a secondary depth adjustment assembly.

FIG. 10A illustrates an alternative to the embodiment illustrated in FIG. 10. In this embodiment, pivot 1010 from FIG. 10 is removed, and rocker 95 is attached to connector 1011, which pivots about pivot 92.

Figure 12:
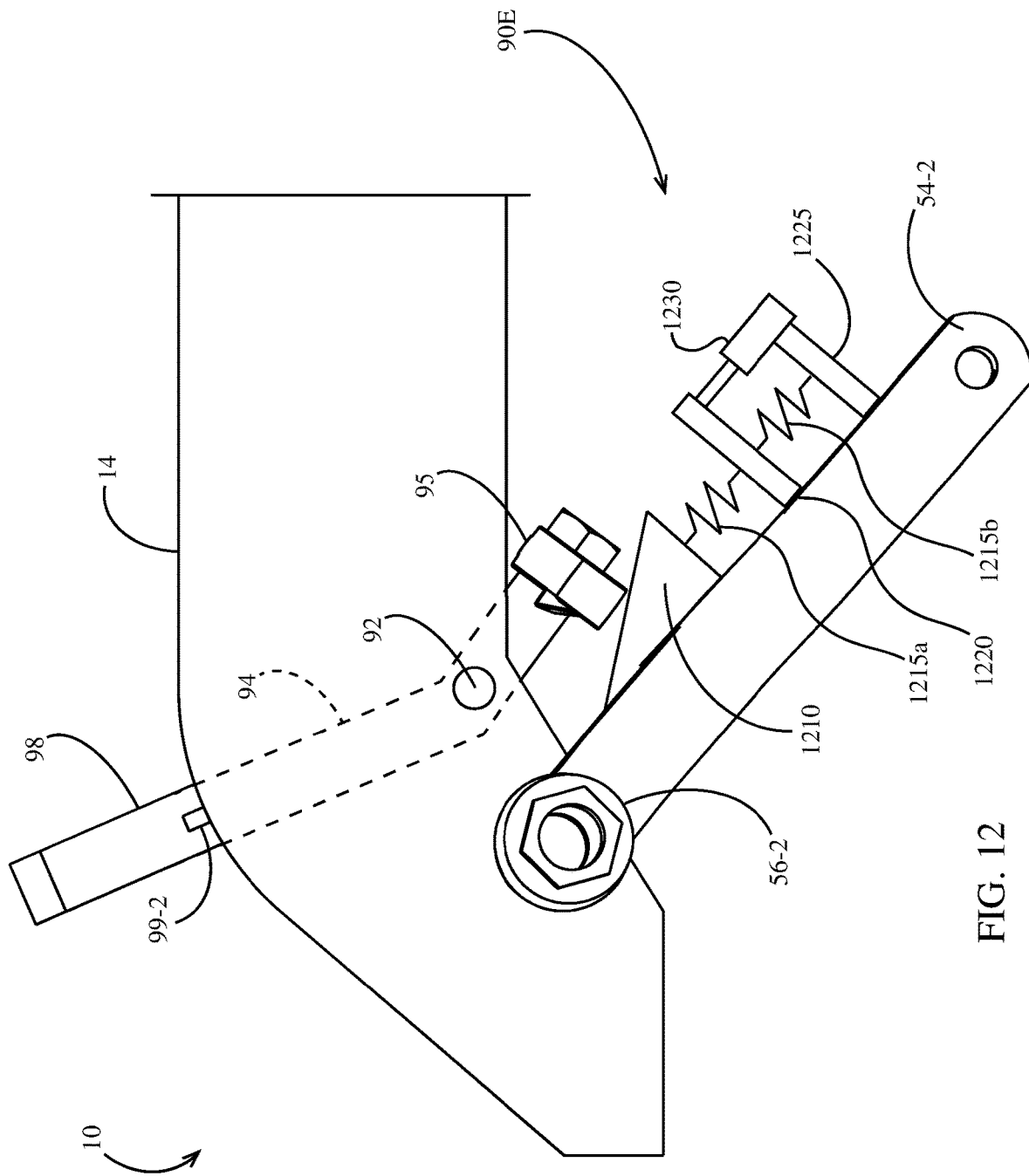
FIG. 12 is a side elevation view of another embodiment of a depth adjustment assembly and a secondary depth adjustment assembly.

FIG. 12 illustrates yet another embodiment of a depth adjustment assembly 90E having a secondary depth adjustment assembly wherein an actuator 1230 advances a depth adjustment member 1210 (e.g., a wedge) which is slidingly fixed to the gauge wheel arm and disposed to slide along the length of the gauge wheel arm 54. An actuator 1230 (e.g., a linear actuator such as an electric, hydraulic, or pneumatic actuator) selectively modifies (e.g., by extension or retraction) the position of the depth adjustment member 1210, e.g., along the length of the gauge wheel arm 54. The position of the depth adjustment member 1210 along the length of the gauge wheel arm modifies the uppermost angular position of the gauge wheel arm relative to the rocker and thus modifies the depth of the furrow opened by the row unit in operation. The actuator 1230 may be mounted to the gauge wheel arm 54, e.g., by being fixed to a plate 1225 mounted to the gauge wheel arm 54.

In some embodiments, the actuator 1230 may adjust the position of the depth adjustment member 1210 by means of a biasing mechanism. The biasing mechanism may increase or reduces a biasing force on the wedge 1210 as the actuator 1230 is extended. For example, as illustrated in FIG. 12, the actuator 1230 may modify a position of a biasing member such as a plate 1220 relative to the depth adjustment member 1210. Optionally, a first spring 1215a is may be fixed to the depth adjustment member 1210 at a first end thereof and may be fixed to the plate 1220 at a second end thereof. Optionally, a second spring 1215b may be fixed to the plate 1220 at a first end thereof and may be fixed to the plate 1225 at a second end thereof. In the undeflected position shown in FIG. 12, neither of the springs 1215a, 1215b impose a substantial force on the biasing member 1210. As the actuator 1230 advances from the undeflected position, the spring imposes an increasing advancing force on the biasing member 1220 (e.g., generally toward the rocker 95). As the actuator 1230 retracts from the undeflected position, the spring imposes an increasing retracting force on the biasing member 1220 (e.g., generally away from the rocker 95).

In operation, when a component of force transmitted from the actuator 1230 (e.g., via the spring 1215a of the biasing mechanism illustrated in FIG. 12) to the rocker 95 exceeds an oppositely acting force of the rocker 95 on the gauge wheel arm (or on the depth adjustment member if the rocker is already contacting the depth adjustment member), the depth adjustment member 1210 advances, forcing the rocker 95 farther away from the gauge wheel arm and reducing the furrow depth. It should be appreciated that the biasing force may be built up gradually by extension of the actuator 1230 without being sufficient to advance the depth adjustment member 1210 until sufficient extension of the actuator or until reduction of downforce.

Figure 14:
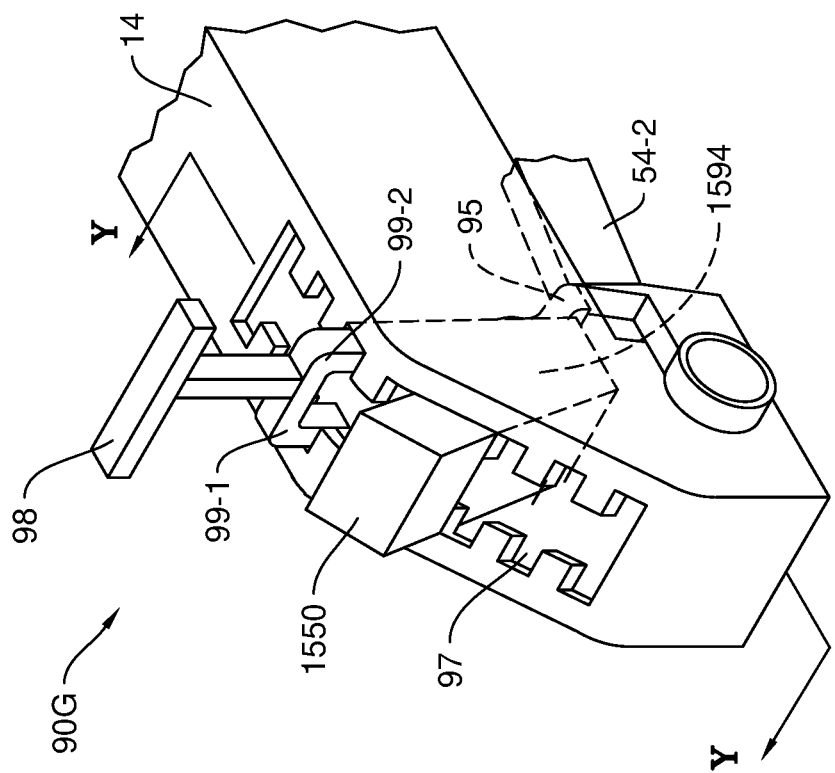
FIG. 14 is a perspective view of another embodiment of a depth adjustment assembly and a secondary depth adjustment assembly disposed on the row unit frame.
Figure 13:
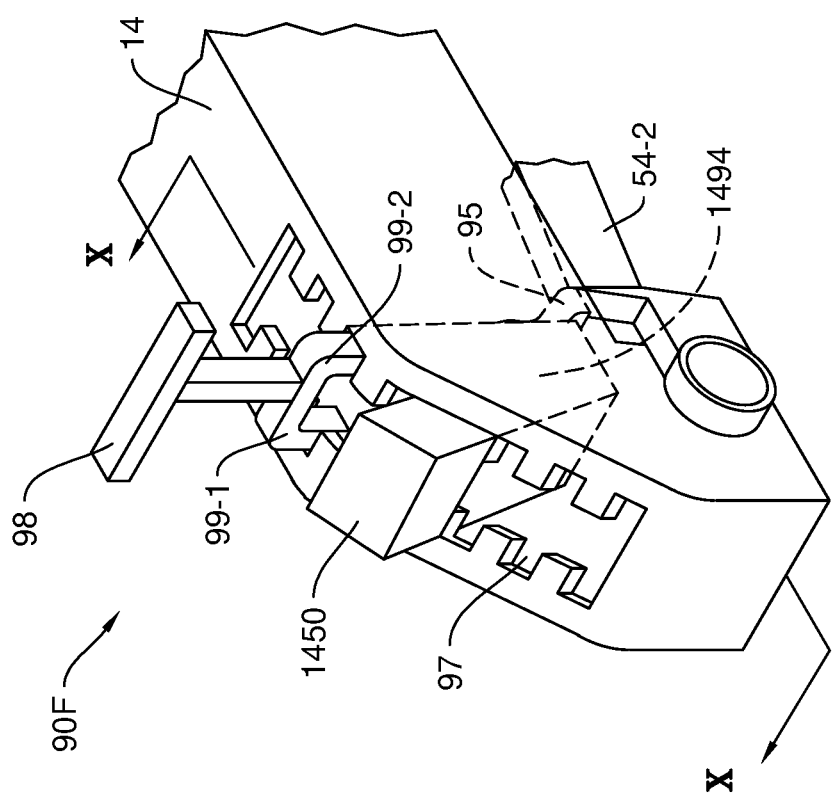
FIG. 13 is a perspective view of another embodiment of a depth adjustment assembly and a secondary depth adjustment assembly disposed on the row unit frame.

FIGS. 13 and 14 are perspective views of a row unit frame 14 showing alternative embodiments of depth adjustment assemblies 90F and 90G, respectively, disposed on the row unit 14.

Figure 13A:
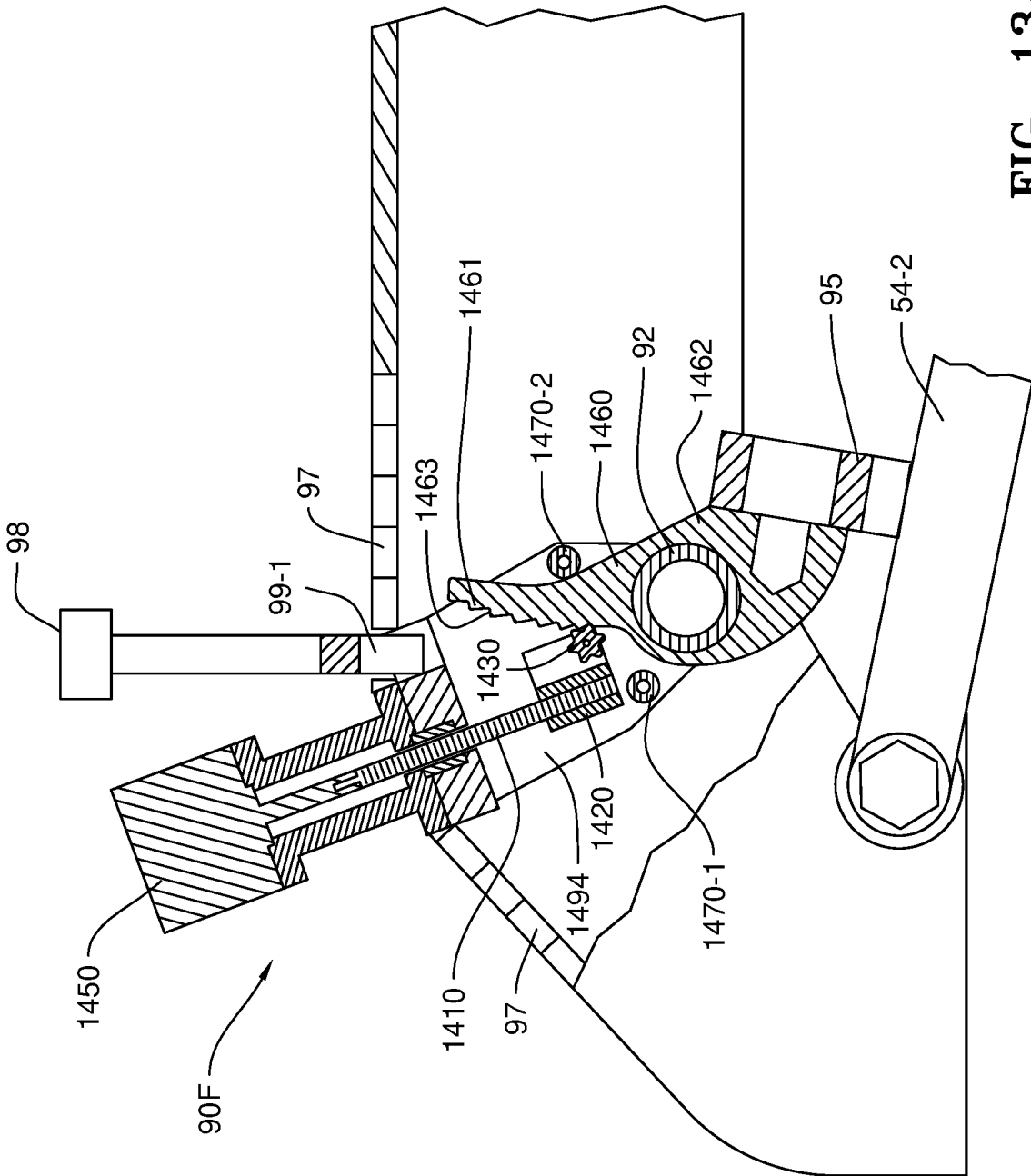
FIG. 13A is a side elevation view of the depth adjustment assembly and a secondary depth adjustment assembly of FIG. 13 as viewed along lines X-X of FIG. 13.
Figure 13B:
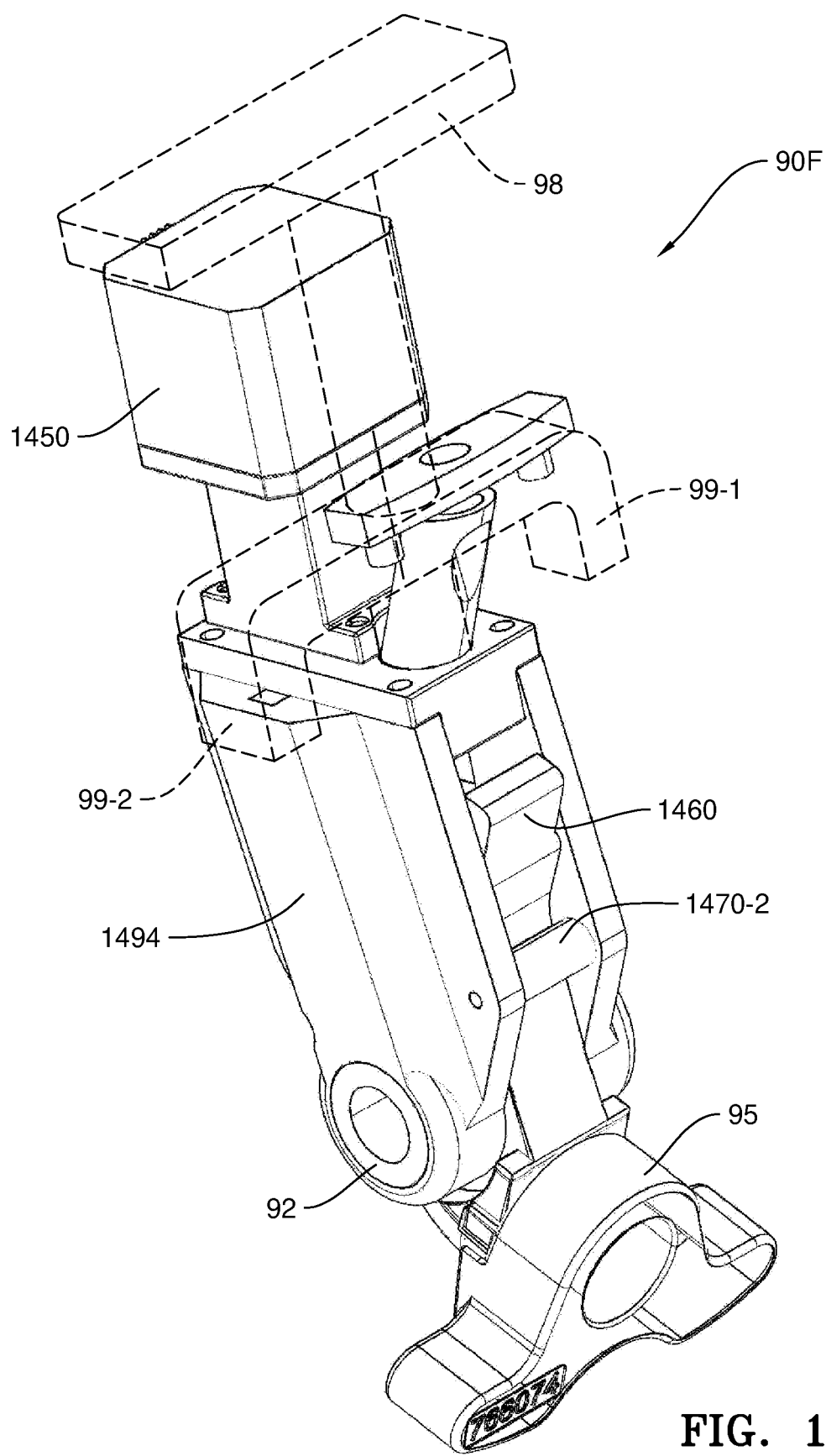
FIG. 13B is an enlarged perspective view of the depth adjustment assembly and a secondary adjustment assembly of FIG. 13 with the row unit frame removed.

Referring to FIG. 13A, a side elevation view of depth adjustment assembly 90F is shown as viewed along lines X-X of FIG. 13. FIG. 13B is an enlarged perspective view of depth adjustment assembly 90F with the row unit frame 14 removed and the handle 98 shown in dashed lines for clarity.

The depth adjustment assembly 90F includes a housing 1494 which is received between the sidewalls of the row unit frame 14. The housing 1494 is adjustably positionable along the depth adjustment slots 97 of the row unit frame 14 by engagement of the handle 98 within one of the plurality of depth adjustment slots 97 to achieve the initial preselected furrow depth. The handle 98 includes hooks 99-1, 99-2 which extend into the slots 97, thereby positioning the housing 1494 at the desired slot 97.

The secondary depth adjustment assembly of the depth adjustment assembly 90F comprises an actuator 1450 (such as an electric motor), drive screw 1410, drive member 1420, cam arm 1460 and cog 1430, all of which cooperate to adjustably position the rocker 95 with respect to the row unit frame 14 as hereinafter described.

As shown in FIG. 13A, the drive screw 1410 extends into the housing 1494 and is driven by the actuator 1450. The drive screw 1410 is threadably received by the drive member 1420. The cog 1430 is rotatably disposed on drive member 1420. A cam arm 1460 has a proximal end 1461 and a distal end 1462. The distal end 1462 of the cam arm 1460 is pivotably mounted about pivot 92. The proximal end 1461 of the cam arm 1460 includes teeth 1463 that engage with the cog 1430. The rocker 95 is pivotally attached to the distal end 1462 of the cam arm 1460. Stops 1470-1 and 1470-2 may be disposed in the housing 1494 on either side of cam arm 1460 to limit the rotational movement of cam arm 1460 in both the clockwise and counterclockwise rotation.

In operation, the actuator 1450 rotates the drive screw 1410 causing the drive member 1420 threadably attached thereto to be threaded upwardly or downwardly along the drive screw 1410 such that it is raised and lowered within the housing 1494. If the drive screw 1410 is rotated by the actuator 1450 in the direction to cause the drive member 1420 to be threaded upwardly along the drive screw 1410, the cog 1430 engages with the teeth 1463 of the cam arm 1460 causing the cam arm 1460 to pivot counterclockwise (as shown in FIG. 13A) about pivot 92, which raises the rocker 95 with respect to the row unit frame 14, permitting the gauge wheel arms 54 to raise with respect to the frame member 14, thereby increasing the furrow depth. Conversely, if the drive screw 1410 is rotated by the actuator 1450 in the opposite direction to cause the drive member 1420 to be threaded downwardly along the drive screw 1410, the cog 1430 engages with the teeth 1463 of the cam arm 1460 causing the cam arm 1460 to pivot clockwise (as shown in FIG. 13A) about pivot 92, which forces the rocker 95 lower with respect to the frame member 14, thereby forcing the gauge wheel arms 54 downwardly with respect to the frame member 14 and, in turn, decreasing the furrow depth.

Figure 14A:
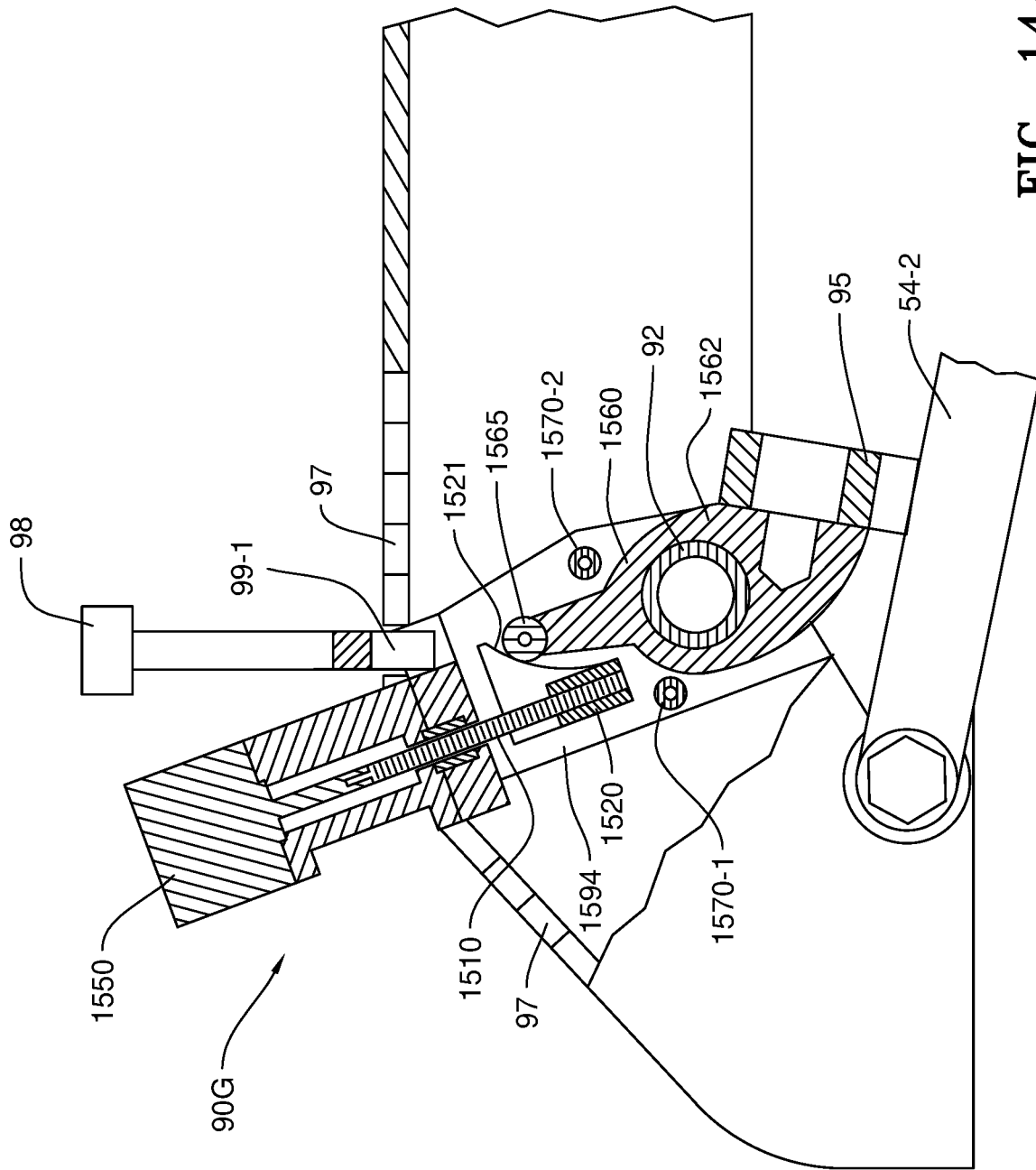
FIG. 14A is a side elevation view of the depth adjustment assembly and a secondary depth adjustment assembly of FIG. 14 as viewed along lines Y-Y of FIG. 14.

Referring to FIG. 14A, a side elevation view of depth adjustment assembly 90G is shown as viewed along lines Y-Y of FIG. 14. Similar to the embodiment of 90F, the depth adjustment assembly 90G includes a housing 1594 which is received between the sidewalls of the row unit frame 14. The housing 1594 is adjustably positionable along the depth adjustment slots 97 of the row unit frame 14 by engagement of the handle 98 within one of the plurality of depth adjustment slots 97 to achieve the initial preselected furrow depth. The handle 98 includes hooks or pegs 99-1, 99-2 which extend into the slots 97 thereby securing the housing 1594 at the desired slot 97.

Figure 14B:
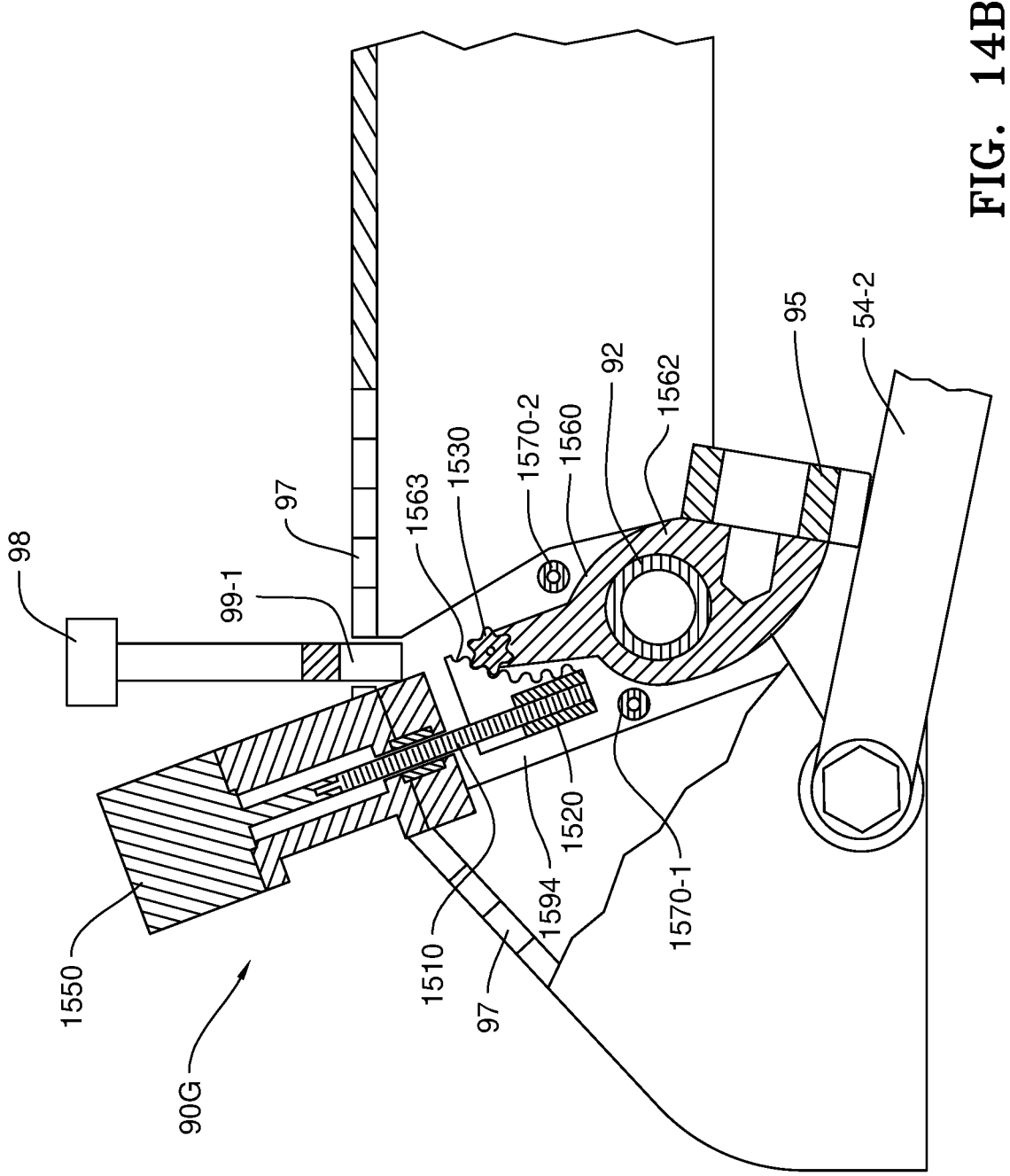
FIG. 14B is a side elevation view of the depth adjustment assembly and a secondary depth adjustment assembly of FIG. 14 showing an alternative embodiment in which the roller replaced with a cog.

The secondary depth adjustment assembly of the depth adjustment assembly 90G comprises an actuator 1550 (such as an electric motor), drive screw 1510, drive member 1520, cam arm 1560 and a roller 1565 (FIG. 14A) or a cog 1530 (FIG. 14B), which cooperate to adjustably position the rocker 95 with respect to the row unit frame 14 as hereinafter described.

As shown in FIG. 14A, the drive screw 1510 extends into the housing 1594 and is driven by the actuator 1550. The drive screw 1510 is threadably received by drive member 1520. The drive member 1520 has a sloped side 1521 that engages with a roller 1565 rotatably attached to a proximal end 1561 of the cam arm 1560. A distal end 1562 of the cam arm 1560 is pivotably mounted about pivot 92. The rocker 95 is pivotally attached to the distal end 1562 of the cam arm 1560. In an alternative embodiment shown in FIG. 14B, roller 1565 is be replaced with a rotatable cog 1530 and the sloped side 1521 includes teeth 1563 which engage with the cog 1530 as the cog 1530 rotates. Stops 1570-1 and 1570-2 may be disposed in the housing 1594 on either side of cam arm 1560 to limit the rotational movement of cam arm 1560 in both the clockwise and counterclockwise rotation.

In operation, the actuator 1550 rotates the drive screw 1510 causing the drive member 1520 threadably attached thereto to be threaded upwardly or downwardly along the drive screw 1510 such that it is raised and lowered within the housing 1594. If the drive screw 1510 is rotated by the actuator 1550 in the direction to cause the drive member 1520 to be threaded upwardly along the drive screw 1510, the roller 1565 will roll downwardly along the sloped side 1521 causing the cam arm 1560 to pivot counterclockwise (as shown in FIG. 14A) about pivot 92, which raises the rocker 95 with respect to the row unit frame 14, permitting the gauge wheel arms 54 to raise with respect to the frame member 14, thereby increasing the furrow depth. Conversely, if the drive screw 1510 is rotated by the actuator 1550 in the opposite direction to cause the drive member 1520 to be threaded downwardly along the drive screw 1510, the roller 1565 will roll along the curved surface 1521 causing the cam arm 1560 to pivot clockwise (as shown in FIG. 14A) about pivot 92, which forces the rocker 95 lower with respect to the frame member 14, thereby forcing the gauge wheel arms 54 downwardly with respect to the frame member 14 and, in turn, decreasing the furrow depth. It should be appreciated that with respect to the embodiment shown in FIG. 14B, wherein the roller 1565 and sloped surface 1521 are replaced with the cog 1530 which engage teeth 1563 on the sloped surface 1521, the same action is accomplished.

In an alternative embodiment to any of embodiments 90A, 90B, 90C, 90D, 90E, 90F, and the depth adjustment body 94, 1494, or 1594 does not need to be adjustable. Depth adjustment body 94, 1494, or 1594 can remain fixed with respect to frame 14 and the secondary adjustment assembly of any of embodiments 90A, 90B, 90C, 90D, 90E, 90F, and 90G will provide the entire range of depth adjustment. Instead of pivoting at pivot 92, depth adjustment body 94, 1494 or 1594 is fixed to frame 14.

Any of the actuators (720, 800, 950, 1000, 1230, 1450, 1550) may be electrical, hydraulic, or pneumatic actuators.

Figure 15:
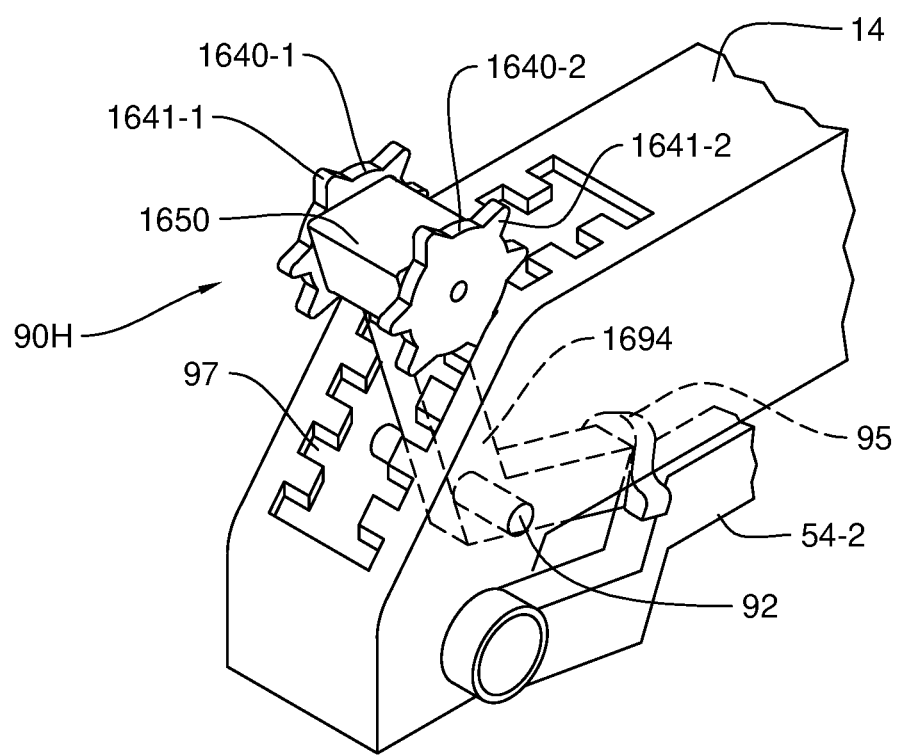
FIG. 15 is a perspective view of another embodiment of a depth adjustment assembly with a rotary actuator disposed on the row unit frame.
Figure 15A:
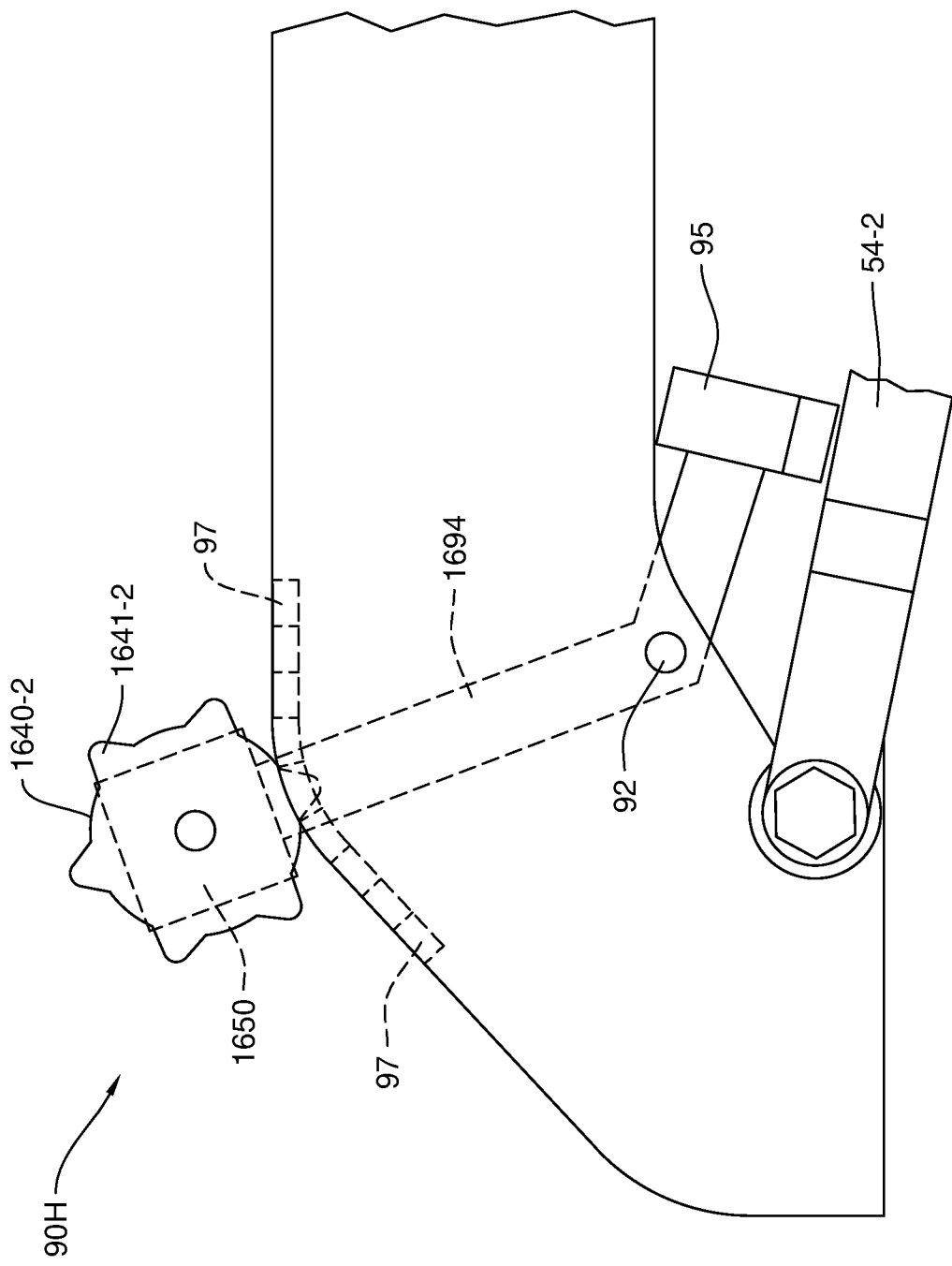
FIG. 15A is a side elevation view of the depth adjustment assembly of FIG. 15.

FIGS. 15 and 15A illustrate another embodiment of a depth adjustment assembly 90H in which a rotary actuator 1650 (such as an electric motor) turns gears 1640-1 and 1640-2 that adjusts the position of the depth adjustment body 1694 relative to the depth adjustment slots 97. Gears 1640-1 and 1640-2 have teeth 1641-1 and 1641-2, respectively that engage in slots 97. Rotary actuator 1650 is connected to depth adjustment body 1694, which is pivotally mounted to the frame 14 at pivot 92. Rocker 95 is pivotally mounted to the depth adjustment body 1694. Rotary actuator may be gear reduced (such as 300:1) to allow for smaller rotation of gears 1640-1 and 1640-2. In this embodiment, rotary actuator 1650 replaces handle 98. This embodiment can be used as the only depth adjustment assembly, or it can be used as the primary depth adjustment assembly and used in combination with any of the other secondary depth adjustment assemblies previously described.

Figure 15B:
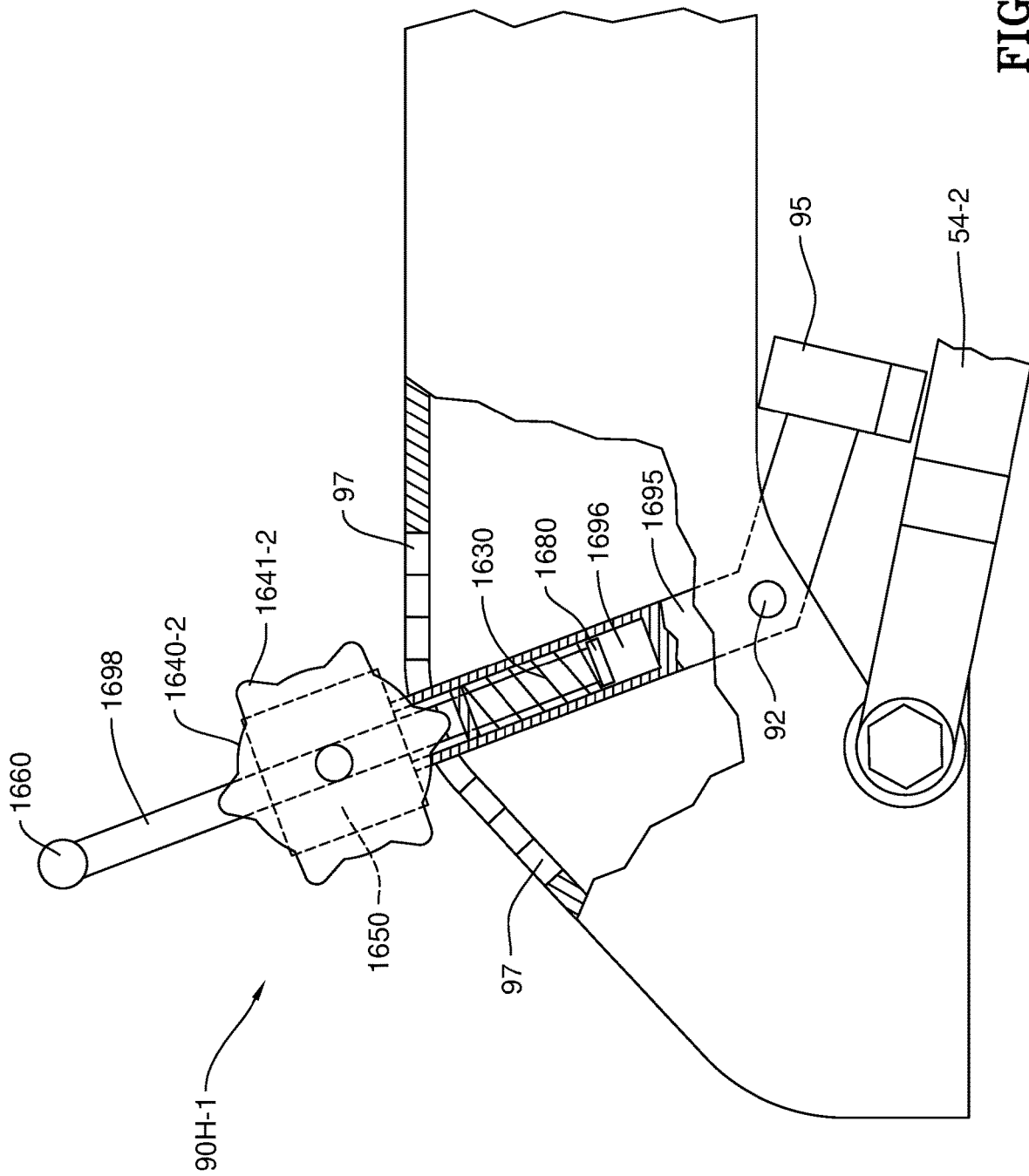
FIG. 15B is a side elevation view of the depth adjustment assembly of FIG. 15A including a manual adjustment.

FIG. 15B illustrates an alternative embodiment of a depth adjustment assembly 90H-1 similar to depth adjustment assembly 90H, but in which depth adjustment body 1694 is replaced with depth adjustment body 1695, handle shaft 1698, and spring 1630. Handle shaft 1698 is attached to actuator 1650 and is partially slidingly received within a cavity 1696 of the depth adjustment body 1695. The spring 1630 engages an annular lip 1680 disposed on the bottom end of the handle shaft 1698. The spring 1630 thus imposes a resilient force to retain the gears 1640 in the selected slot 97, but permits the user to withdraw the actuator 1650 using handle 1660 attached to actuator 1650 to temporarily disengage the gears 1640 from the slot 97 to a desired pre-set depth to minimize the amount of travel that the actuator 1650 needs to reach a selected depth.

Figure 16:
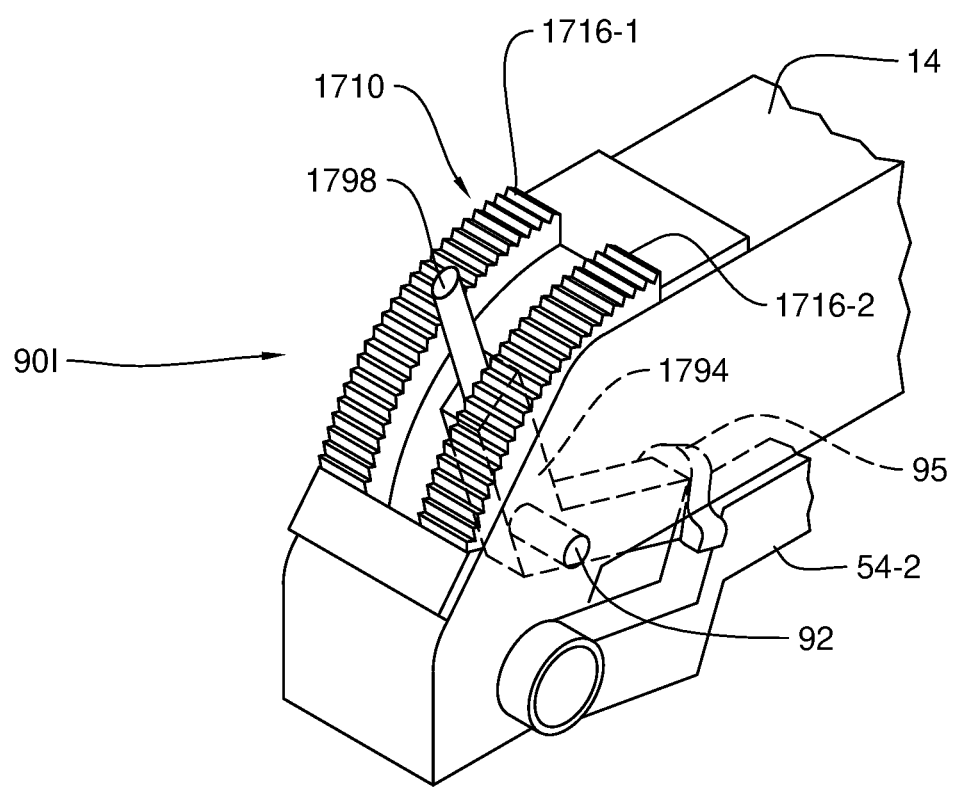
FIG. 16 is a partial perspective view of another embodiment of a depth adjustment assembly with a rotary actuator disposed on a gear rack on the row unit frame.
Figure 16A:
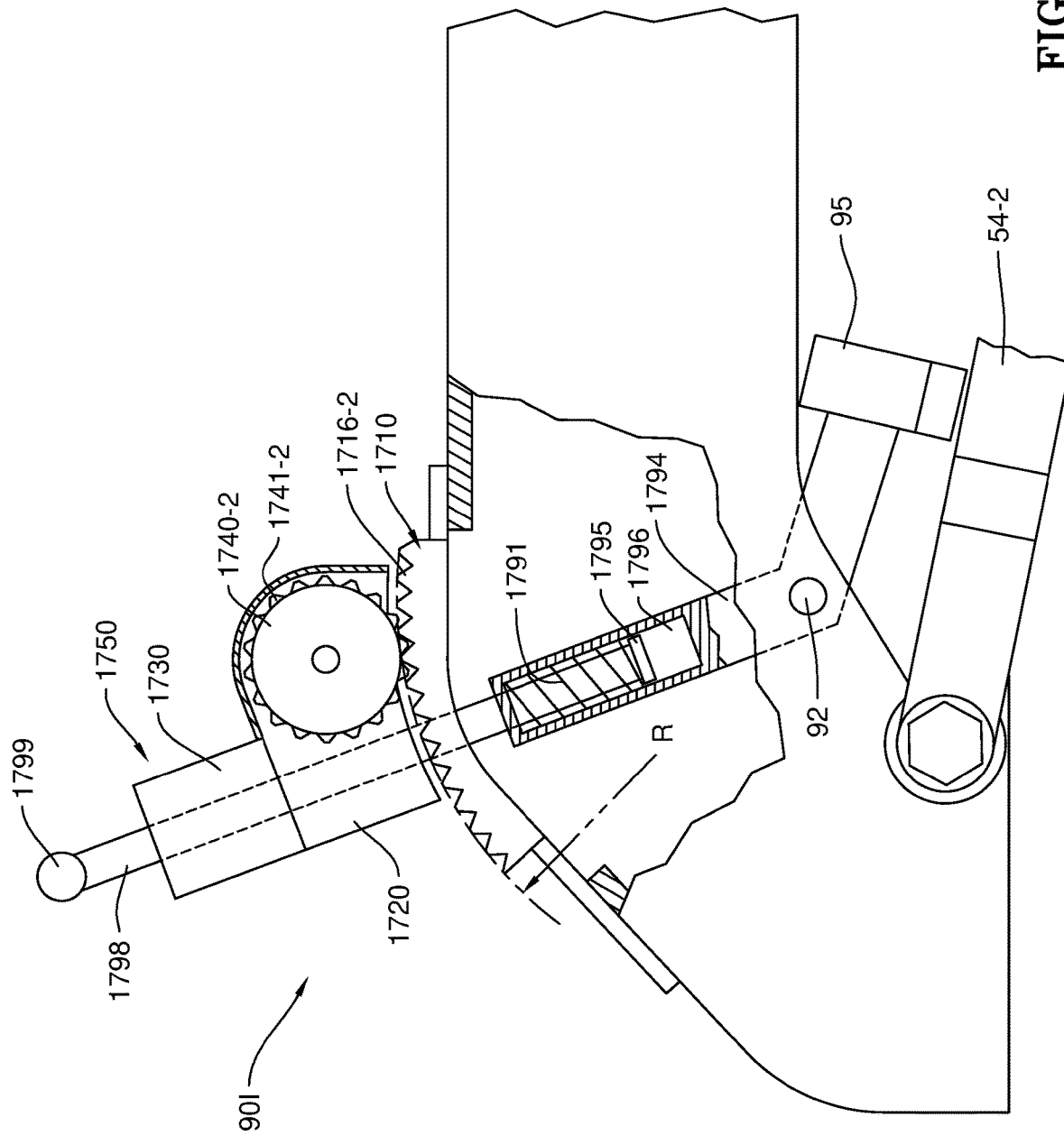
FIG. 16A is a side elevation and partial cutaway view of the depth adjustment assembly of FIG. 16.

FIGS. 16 and 16A illustrate another embodiment of a depth adjustment assembly 90I in which a gear rack 1710 is disposed on row unit 14 over depth adjustment slots 97. A radius R (FIG. 16A) from pivot 92 to gear rack 1710 remains constant along the gear rack 1710 having two rows of teeth 1716-1, 1716-2. Rotary actuator 1750 is disposed over gear rack 1710 and is connected to a handle shaft 1798 at gear box 1720. Rotary actuator 1750 includes a motor 1730 connected to a gear box 1720. In the rear perspective view of FIG. 16, the rotary actuator 1750 is removed for clarity to better show the gear rack 1710. Gear box 1720 has gears 1740 having teeth 1741 for meshing with gear rack 1710. Only one of the gears is visible in FIG. 16A, but it should be appreciated that respective gears 1740-1, 1740-2, having respective teeth 1741-1, 1741-2 would rotatably engage with respective teeth 1716-1, 1716-2 of gear rack 1710. A handle 1799 can be disposed on motor 1730 to permit rotary actuator 1750 to disengage from gear rack 1710 for moving to a different position on gear rack 1710 to preset a selected depth. Rotary actuator 1750 may be gear reduced (such as 300:1) to allow for smaller rotation of gears 1740-1 and 1740-2. In this embodiment, rotary actuator 1750 replaces handle 98 described in the previous embodiments. Handle shaft 1798 is attached to actuator 1750 at gear box 1720 and is partially slidingly received within a cavity 1796 of a depth adjustment body 1794. A spring 1791 engages an annular lip 1795 disposed on the bottom end of the handle shaft 1798. The spring 1791 imposes a resilient force to retain the gears 1740 meshed with gear rack 1710 but permits the user to withdraw the actuator 1750 using handle 1799 attached to actuator 1750 to temporarily disengage the gears 1740 from gear rack 1710. Depth adjustment body 1794 is pivotally mounted to the frame 14 at pivot 92. Rocker 95 is pivotally mounted to the depth adjustment body 1794.

Figure 16B:
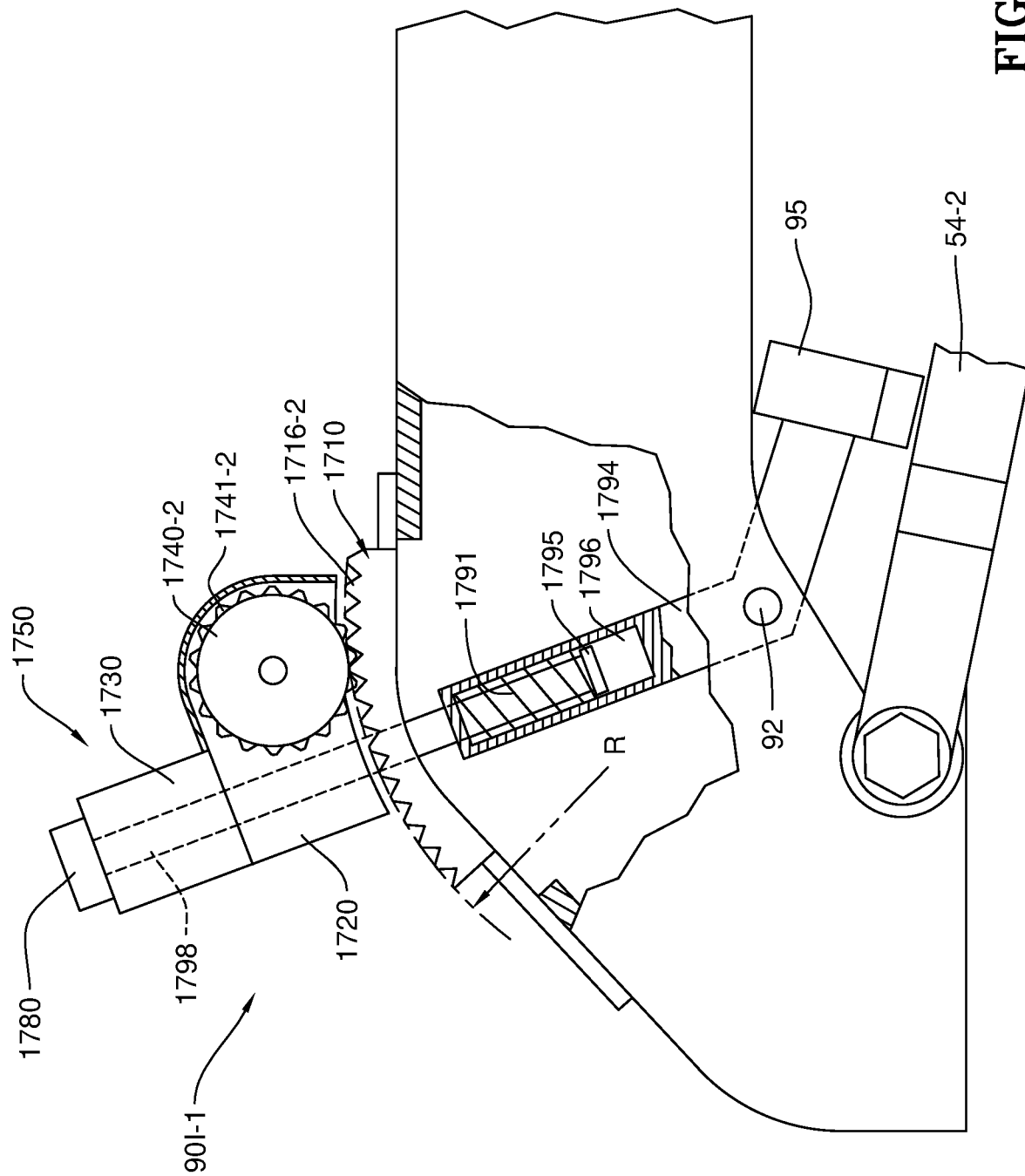
FIG. 16B is a side elevation and partial cutaway view of another embodiment for the depth adjustment assembly of FIG. 16.

FIG. 16B illustrates an alternative embodiment of a depth adjustment assembly 90I-1, similar to the depth adjustment assembly 90I, but in which handle 1799 is replaced with manual adjustment 1780. Manual adjustment 1780 may be a knob, a bolt head or other suitable means to permit a user to manually move motor 1730 by hand or a tool to adjust depth adjustment assembly 90I-1 when motor 1730 cannot be driven electrically.

Figure 16C:
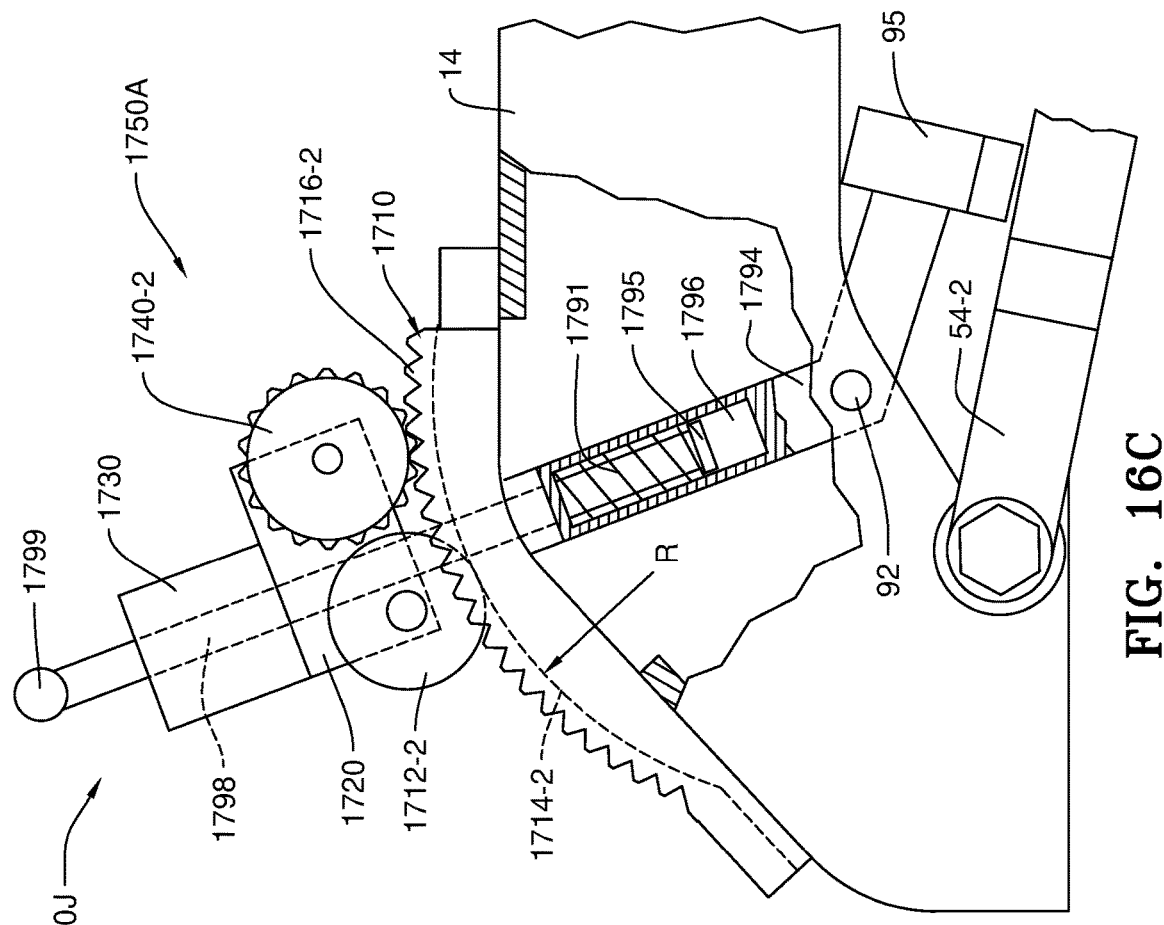
FIG. 16C is a side elevation and partial cutaway view of another embodiment for the depth adjustment assembly of FIG. 16
Figure 16D:
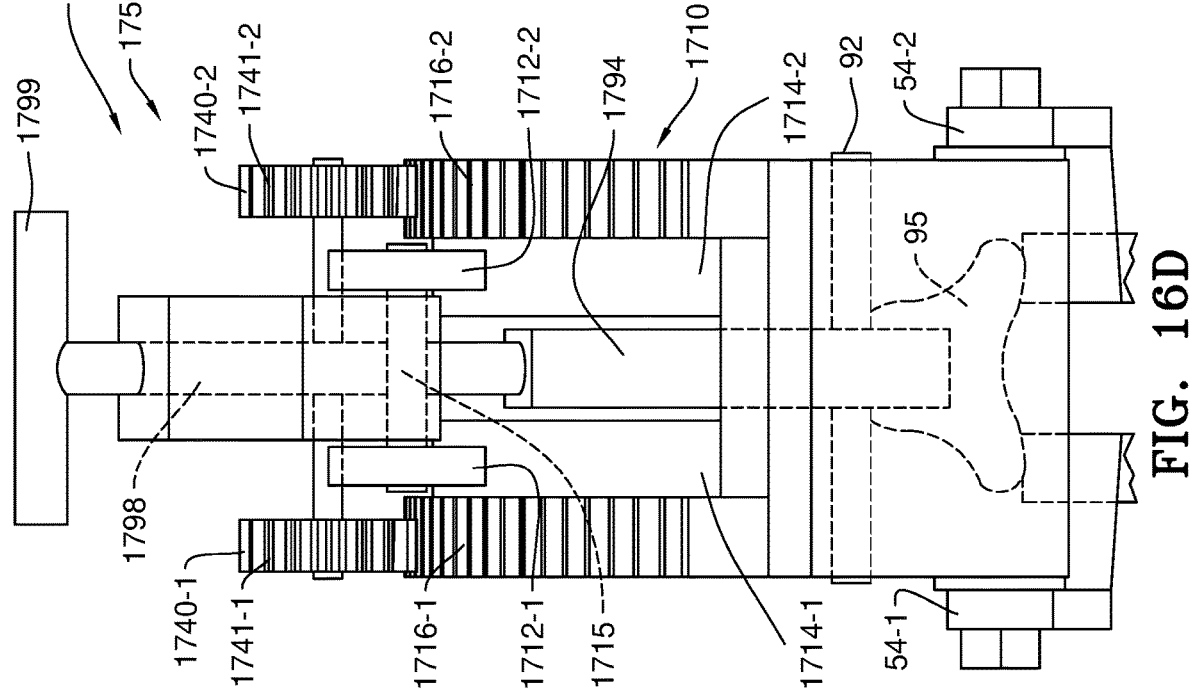
FIG. 16D is a rear elevation view of the embodiment of FIG. 16C.
Figure 16E:
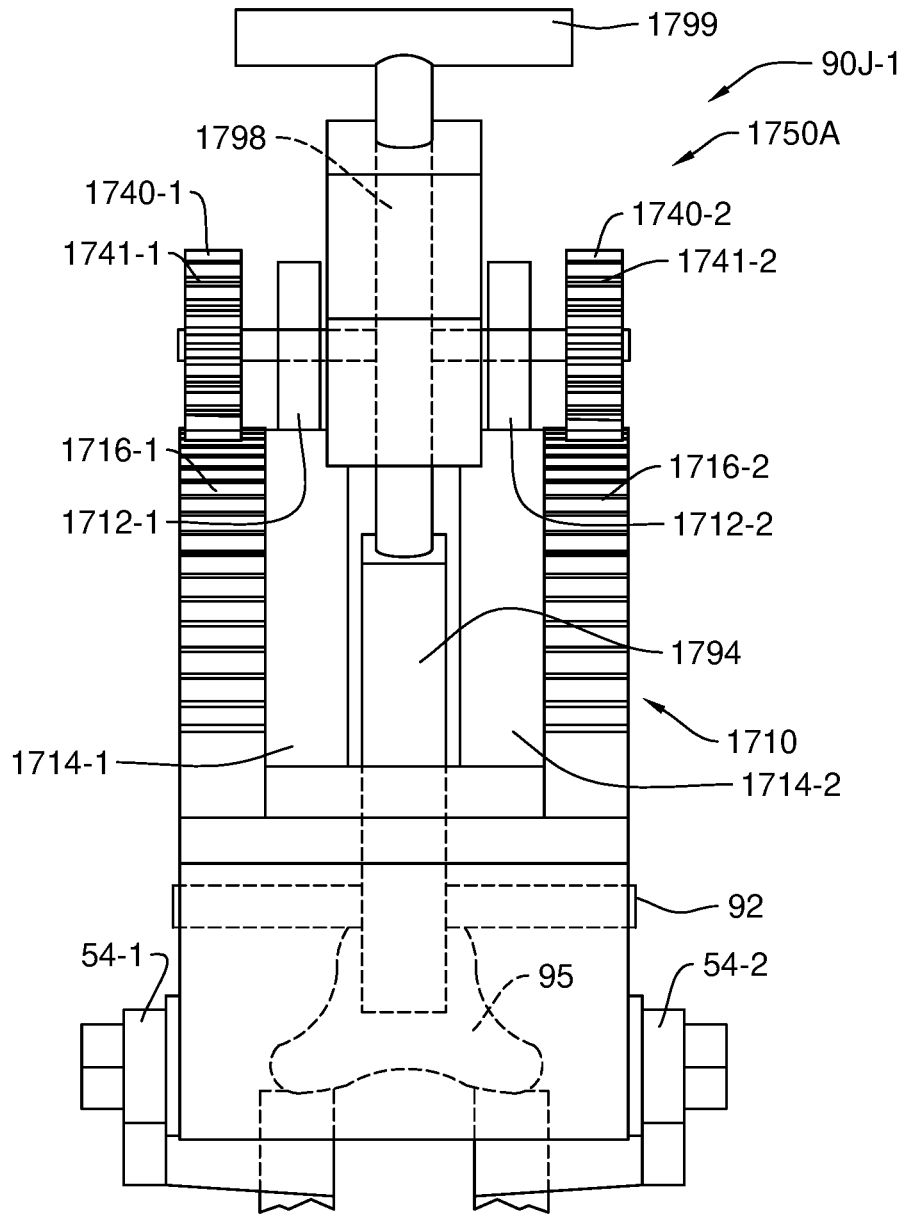
FIG. 16E is a rear elevation view of another embodiment for a depth adjustment assembly.

FIG. 16C is a side elevation and partial cutaway view of another embodiment of a depth adjustment assembly 90J that further includes a rotary actuator 1750A. FIG. 16D is a rear elevation view of the embodiment of 16C. In this embodiment, gear rack 1710 includes shelves 1714-1 and 1714-2 laterally inward of respective teeth 1716-1 and 1716-2. Rollers 1712-1 and 1712-2 are secured to an axle 1715 extending through gearbox 1720. The rollers 1712-1 and 1712-2 ride on the respective shelves 1714-1 and 1714-2. The force on gears 1740-1 and 1740-2 from spring 1791 is reduced because the force is acting through rollers 1712-1 and 1712-2 on shelves 1714-1 an 1714-2, thus allowing for easier movement of gears 1740-1 and 1740-2 on teeth 1716-1 and 1716-2. Also, it is easier to maintain center distance for gear mesh. Similar to FIG. 16B, handle 1799 can be replaced with manual adjustment 1780. FIG. 16E illustrates an alternative embodiment of a depth adjustment assembly 90J-1, similar to the depth adjustment assembly 90J, but with rollers 1712-1 and 1712-2 coaxial with gears 1740-1 and 1740-2. This simplifies the embodiment that is shown in FIGS. 16C and 16D to permit the depth adjustment assembly 90J-1 to have a full range of motion across teeth 1716.

Figure 17:
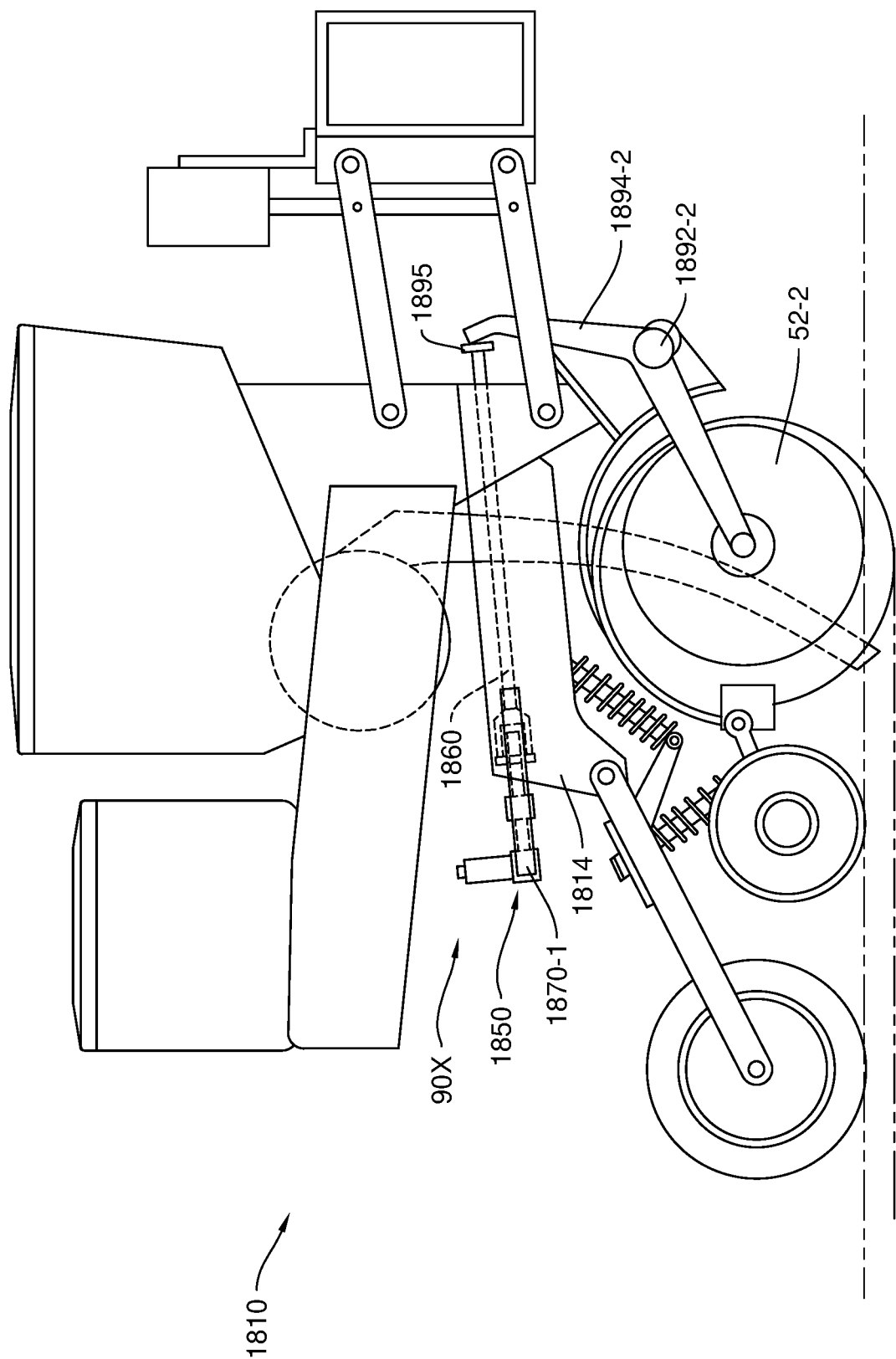
FIG. 17 is a side elevation view showing a Case row unit adapted with another embodiment of a depth adjustment assembly.

FIG. 17 is a side elevation view of a conventional Case row unit 1810 such as disclosed in U.S. Pat. No. 6,827,029

Figure 17A:
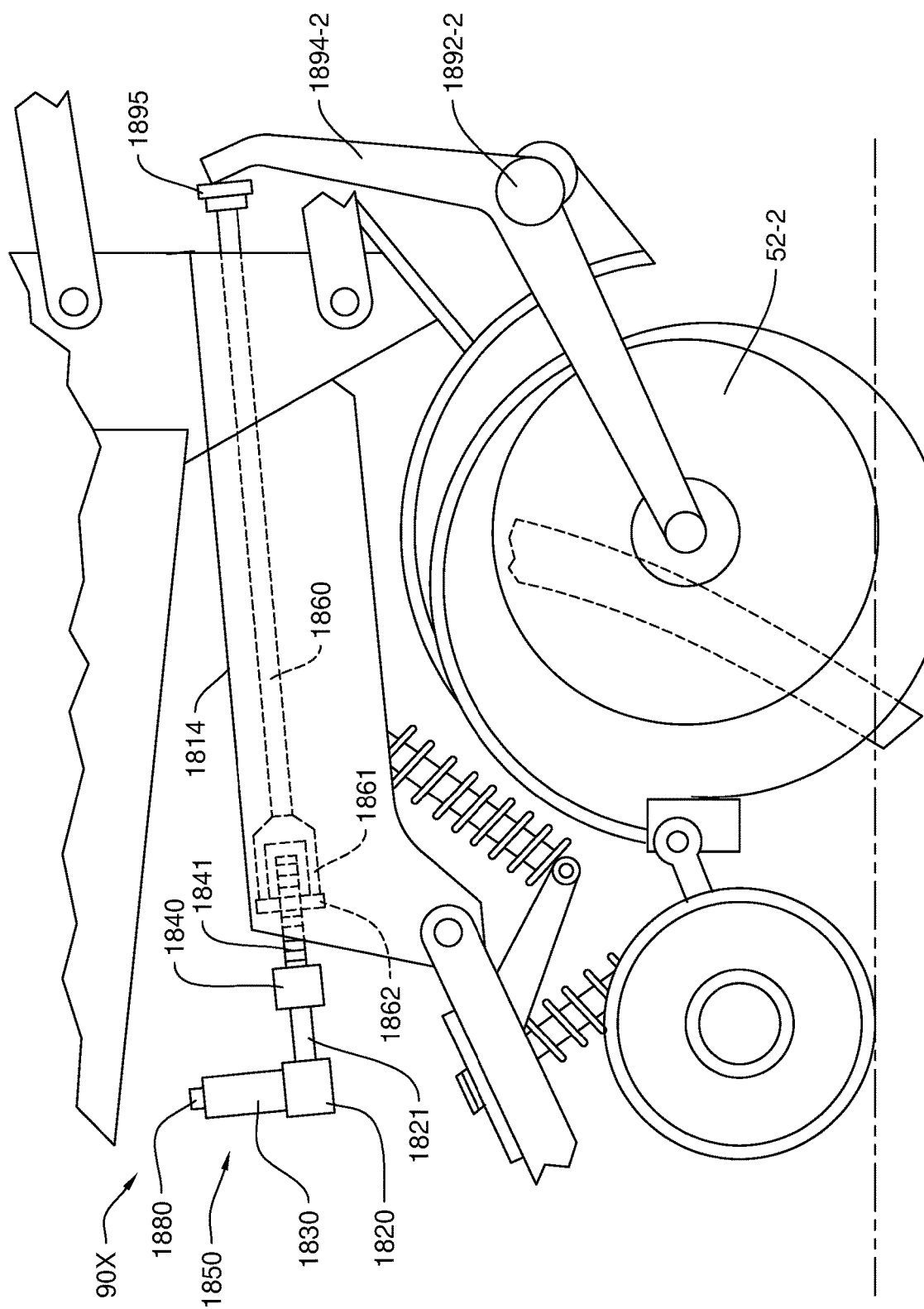
FIG. 17A is an enlarged view of the embodiment of FIG. 17.

(the "Case '029 patent"), incorporated herein by reference, which is adapted with another embodiment of a depth adjustment assembly 90X, as hereinafter described. FIG. 17A is an enlarged partial view of FIG. 17. The conventional Case row unit includes an adjustment handle (identified by reference numeral 90 in FIG. 2 of the Case '029 patent) which is removed and replaced with an actuator 1850 coupled to a screw 1841 that engages with the adjustment rod 1860 (corresponding to rod 92 in FIG. 2 of the Case '029 patent). The depth adjustment assembly 90X is mounted to row unit 1810 via bracket 1870 having bracket arms 1870-1 and 1871-2 attached to channel member 1814. Actuator 1850 includes motor 1830 and gear box 1820, which drives shaft 1821, which is coupled to threaded rod 1841 via coupler 1840. Threaded rod 1841 is threadably engaged with adjustment rod 1860 extending through the channel member 1814. Adjustment rod 1860 has a receiver end 1861 with a threaded nut 1862 for threadably receiving threaded rod 1841. Adjustment rod 1860 extends through channel member 1814 and is connected to a rocker 1895 at its distal end. The rocker 1895 is pinned to the distal end of the adjustment rod 1860 and acts on respective gauge wheel arms 1894-1 and 1894-2. Gauge wheel arms 1894-1 and 1894-2 are pivotally connected to a frame member of the row unit 1810 via pivots 1892-1 and 1892-2, respectively. Gauge wheels 52-1 and 52-2 are connected to gauge wheel arms 1894-1 and 1894-2, respectively.

Figure 18:
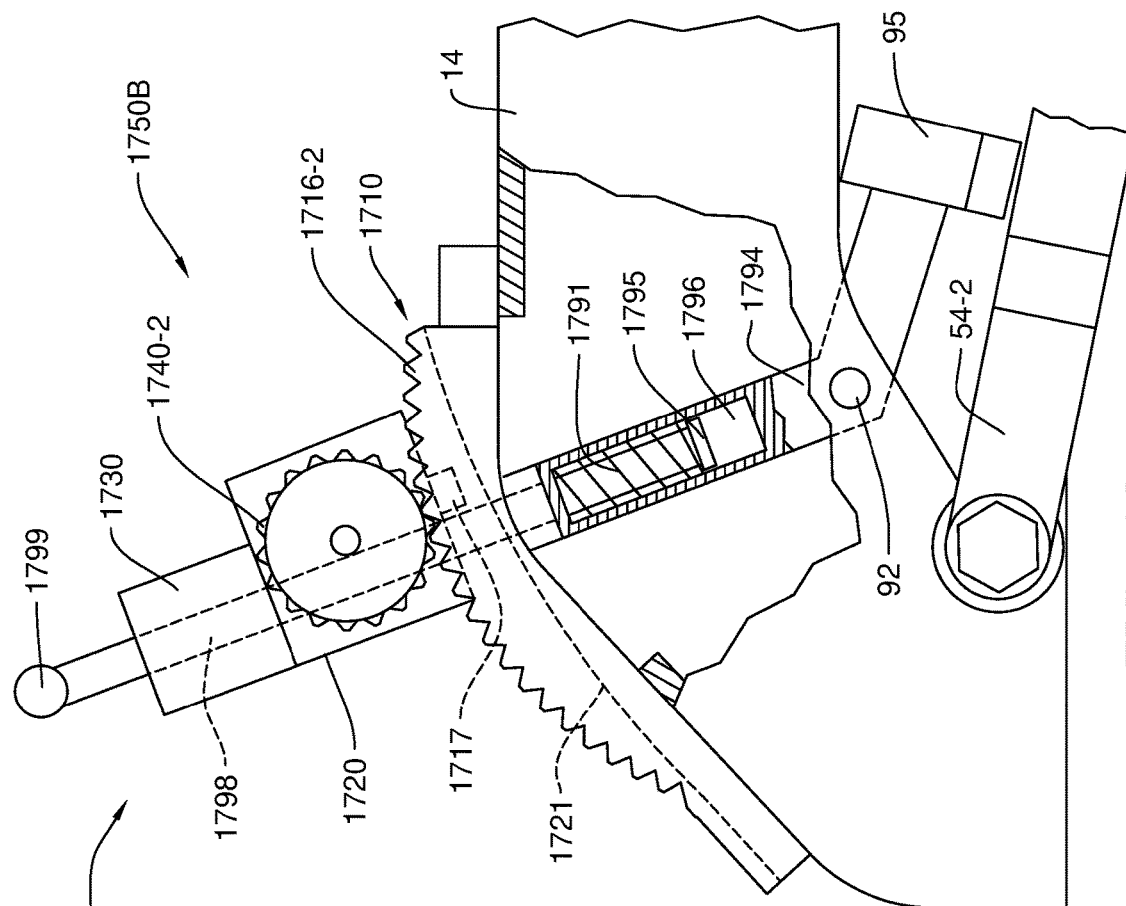
FIG. 18 is a side elevation and partial cutaway view of another embodiment of a depth adjustment assembly with a position location system.
Figure 18A:
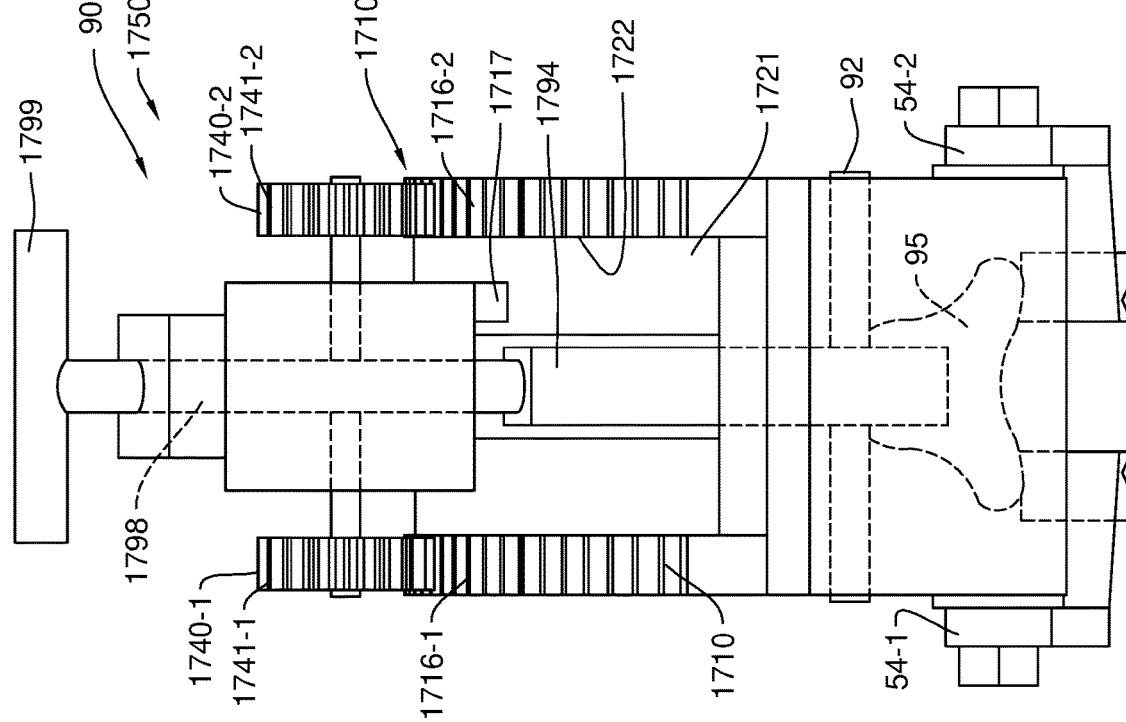
FIG. 18A is rear elevation view of the embodiment of FIG. 18.

FIGS. 18 and 18A illustrate another embodiment of a depth adjustment assembly 90K utilizing a gear rack 1710 and a distance sensor 1717 to determine the position of the actuator 1750B along the gear rack 1710. FIG. 18A is a rear elevation view of FIG. 18. In this embodiment, the distance sensor 1717 is disposed on the bottom of gear box 1720 and is disposed over a ledge 1721 disposed on an interior surface 1722 of gear rack 1710. In this embodiment, ledge 1721 has a constantly changing distance with respect to the constant radius of teeth 1716. Sensing this change in distance, distance sensor 1717 communicates with depth control and soil monitoring system 300 (discussed later).

FIGS. 19 and 19A illustrate another embodiment of a depth adjustment assembly 90L utilizing a gear rack 1710 and a distance sensor 1717 to determine the position of the actuator 1750C along the gear rack 1710. FIG. 19A is a rear elevation view of FIG. 19. In this embodiment, the distance sensor 1717 is disposed on the handle shaft 1798. The interior wall 1718 of ledge 1723 adjacent to the distance sensor 1717 has a constantly changing width transverse to the direction of travel of handle shaft 1798. The change in distance to the interior wall 1718 is sensed by the distance sensor 1717 which communicates with depth control and soil monitoring system 300.

Distance sensor 1717 can be any sensor that can measure distance. Examples of distance sensors include, but are not limited to Hall effect sensors and inductive sensors.

FIGS. 20A to 20K illustrate another embodiment of a depth adjustment assembly 90M utilizing a gear rack 1910 and a distance sensor 1917 to determine the position of actuator 1950 along the gear rack 1910. In this embodiment, the distance sensor 1917 is disposed above ledge 1921 of gear rack 1910. In one embodiment, distance sensor 1917 is attached to gear box 1920. In this embodiment, ledge 1921 has a constantly changing distance with respect to the constant radius of teeth 1916. Sensing this change in distance, distance sensor 1917 communicates with depth control and soil monitoring system 300. Alternatively, gear rack 1910 can have an interior wall similar to interior wall 1718 on gear rack 1710 with distance sensor disposed to sense the change in distance to the interior wall (not shown).

In depth adjustment assembly 90M the actuator 1950 is disposed on and engaged with gear rack 1910. Actuator 1950 includes an electric motor 1930 connected to and driving gear box 1920. Gear box 1920 drives gears 1940-1 and 1940-2. Gears 1940-1 and 1940-2 have teeth 1941-1 and 1941-2, respectively, for engaging teeth 1916 (1916-1 and 1916-2) on gear rack 1910.

Figure 20A:
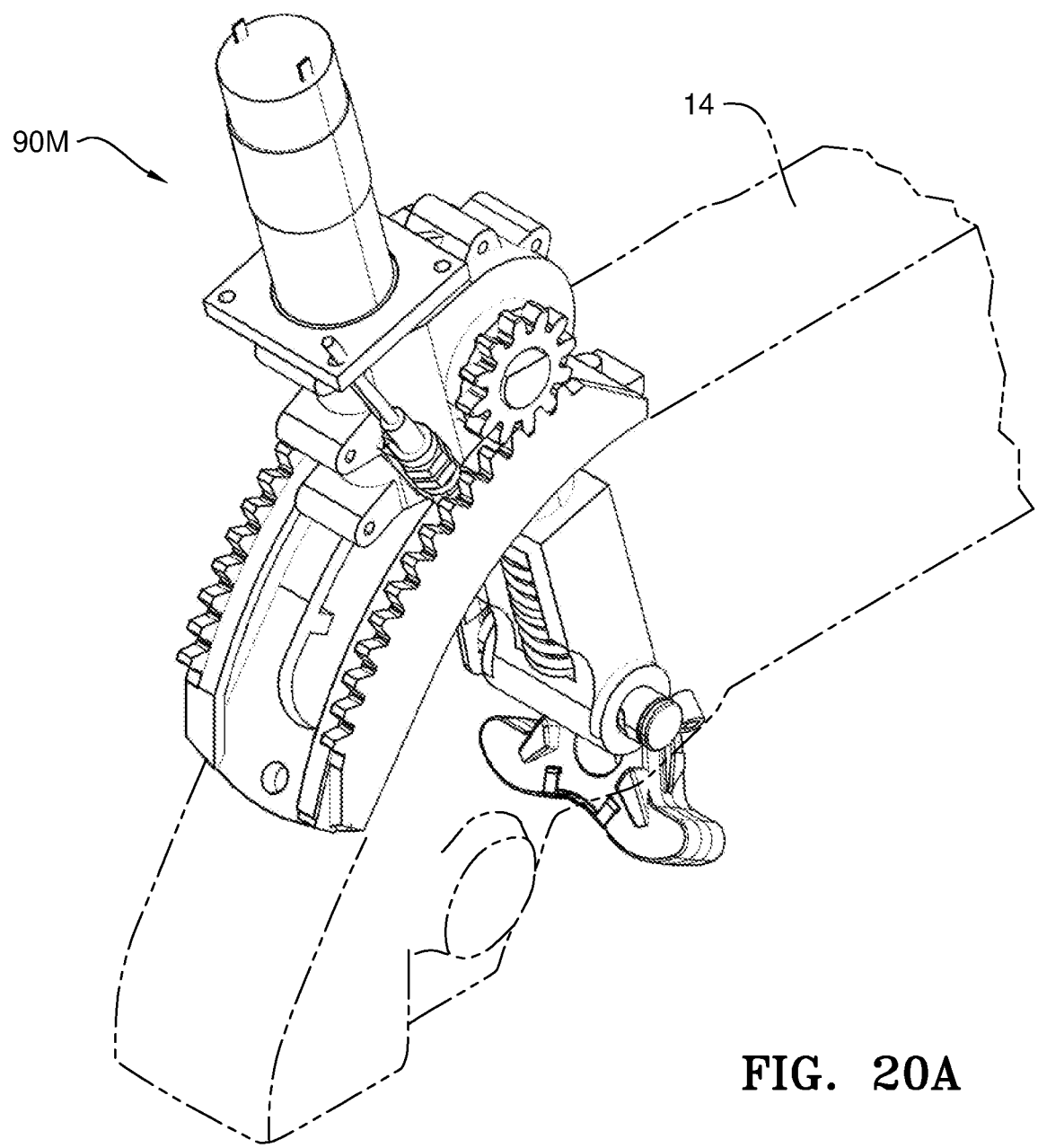
FIG. 20A is a perspective view of another embodiment of a depth adjustment assembly with a position location system shown mounted to a row unit frame member.
Figure 20B:
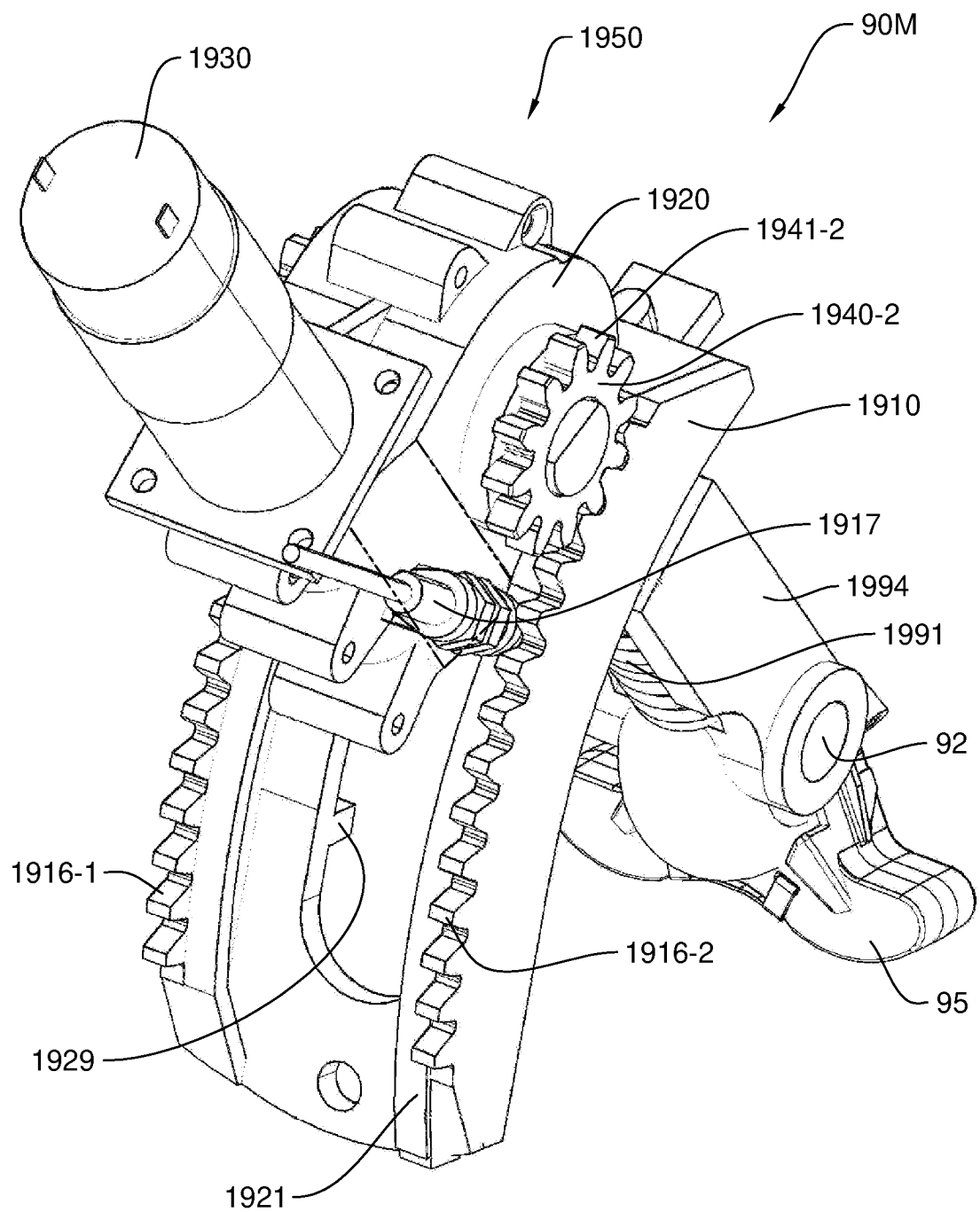
FIG. 20B is an enlarged perspective view of the depth adjustment assembly embodiment of FIG. 20A with the row unit frame member removed.
Figure 20C:
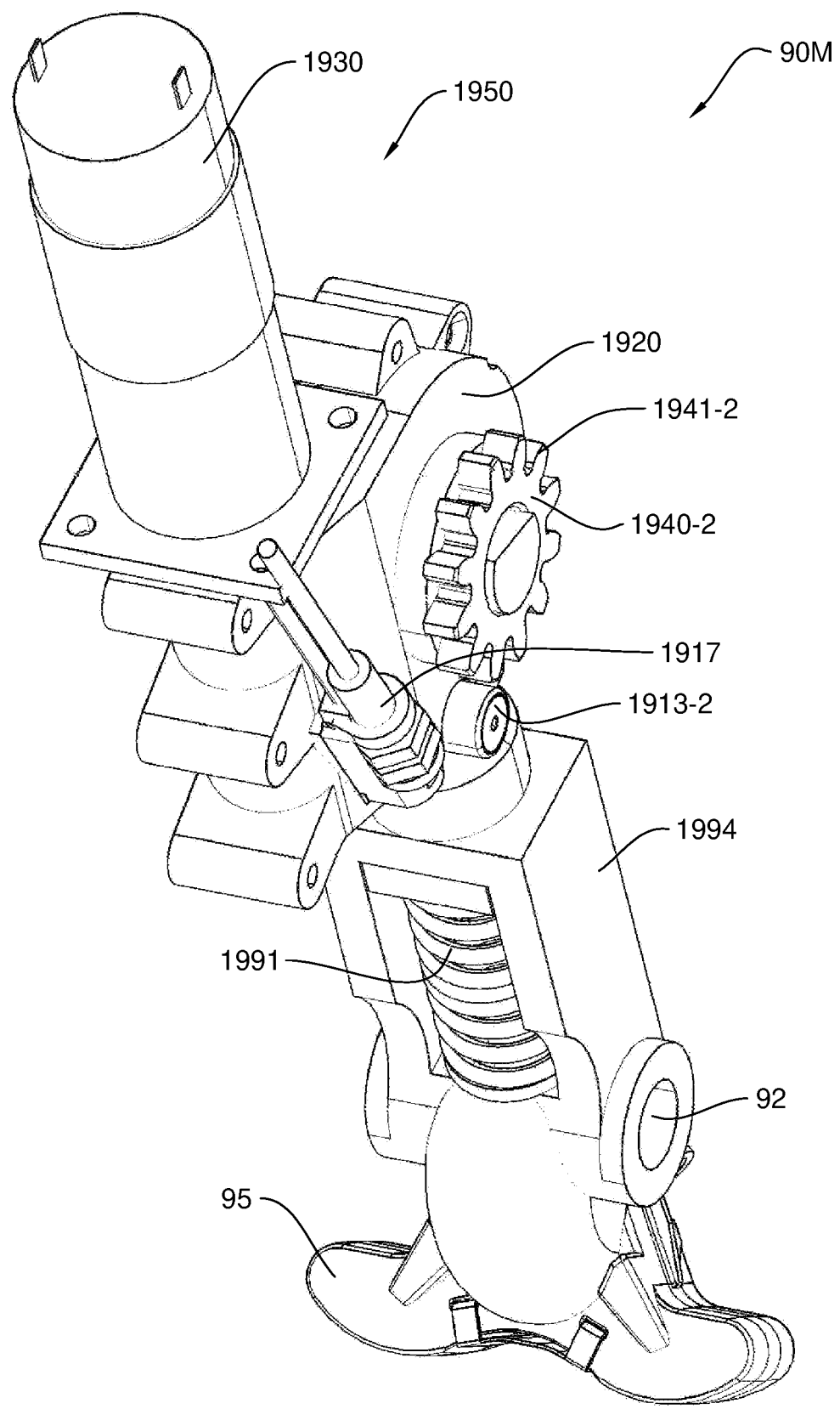
FIG. 20C is a perspective view of the embodiment of FIG. 20B with the gear rack removed.
Figure 20D:
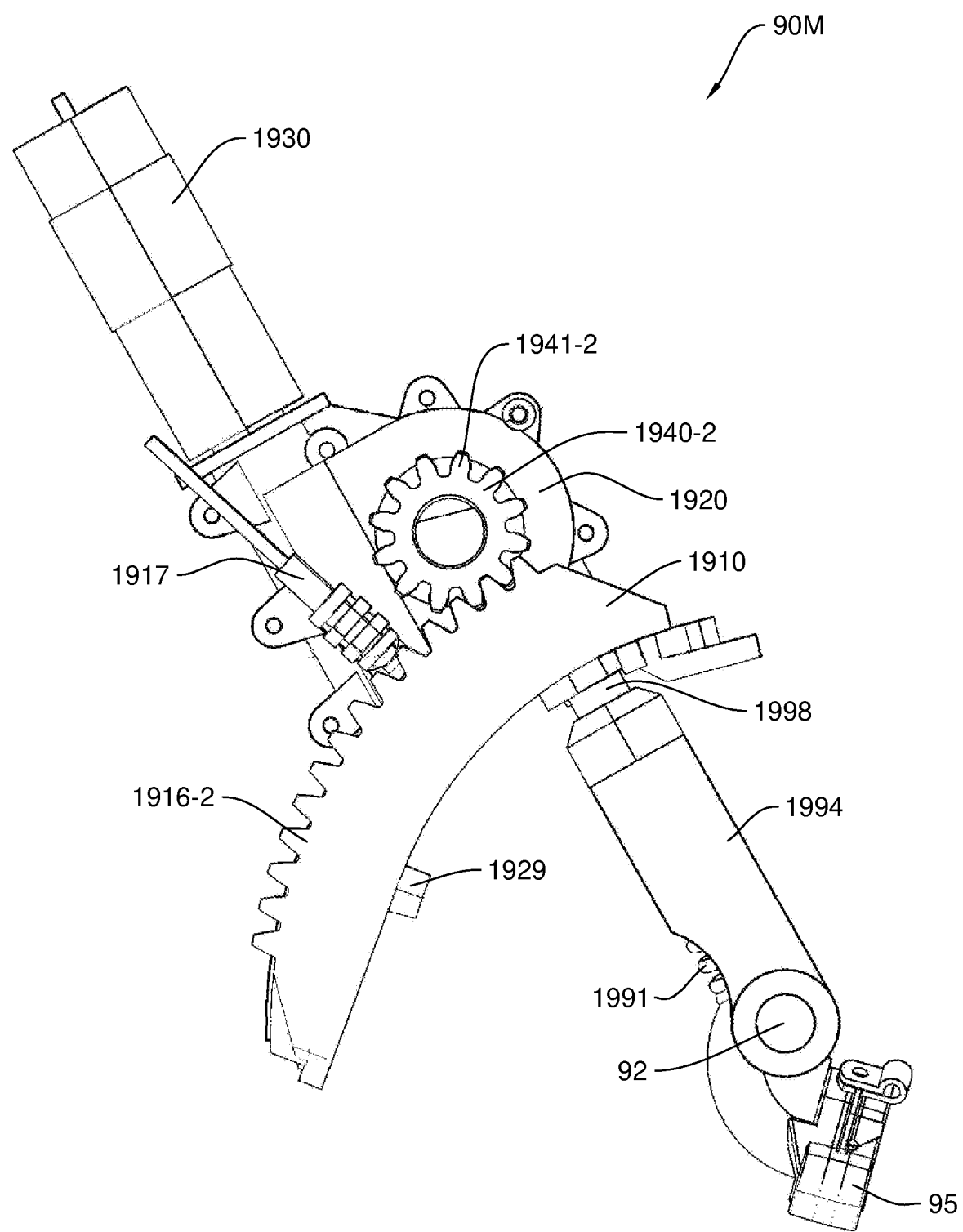
FIG. 20D is a right side view of the embodiment of FIG. 20B.
Figure 20E:
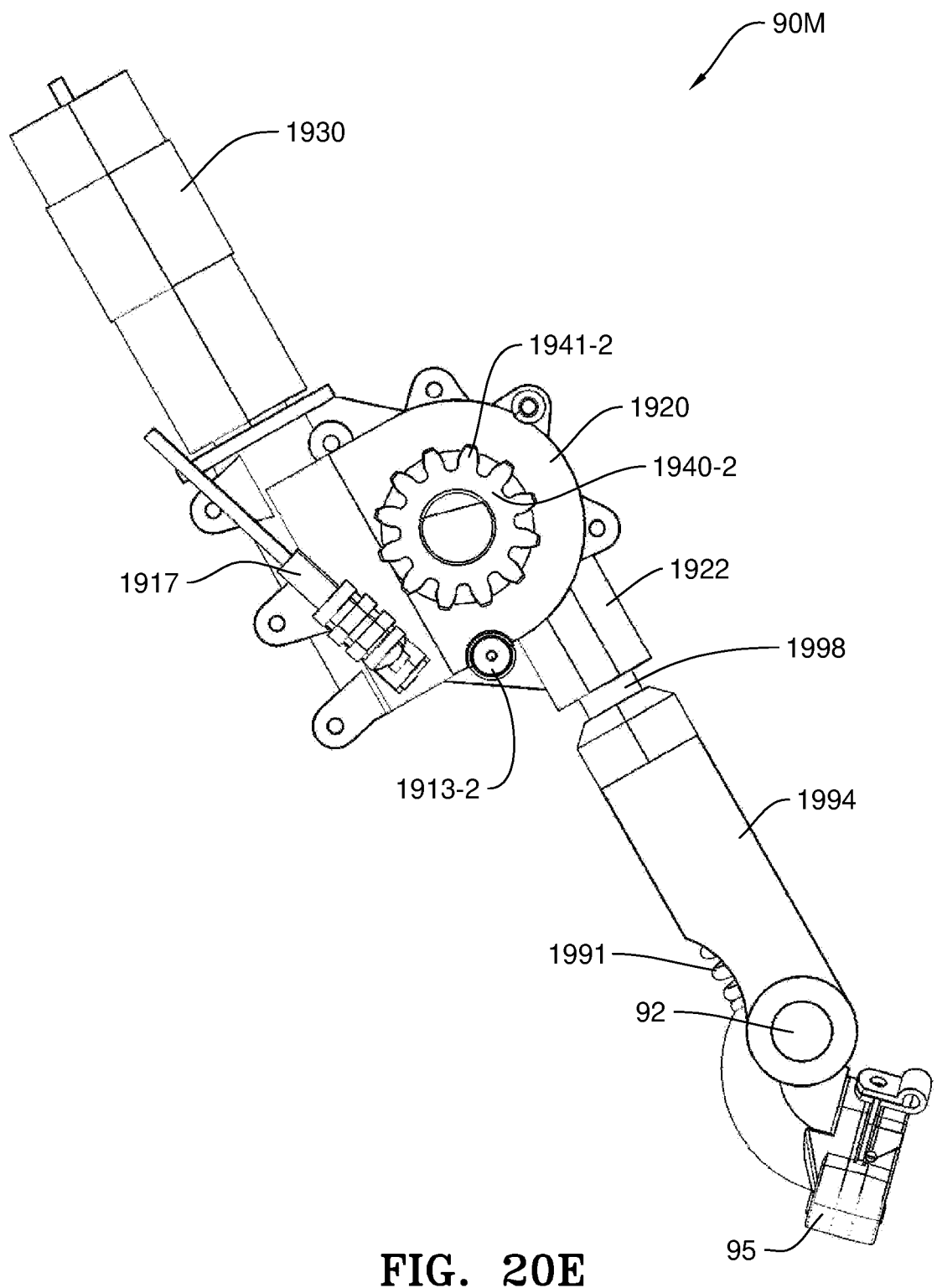
FIG. 20E is a right side view of the embodiment of FIG. 20C.
Figure 20F:
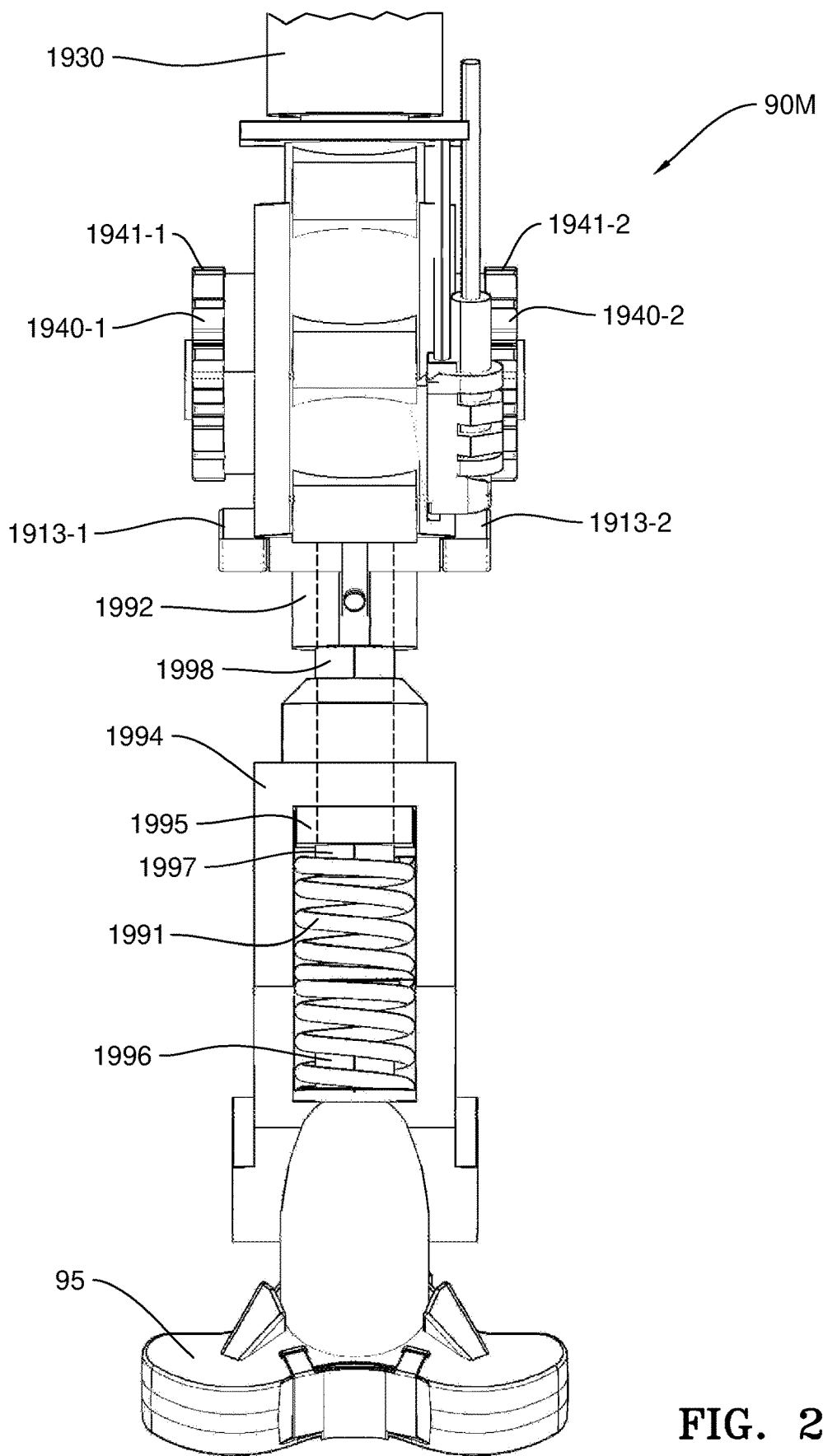
FIG. 20F is a rear view of the embodiment of FIG. 20C.

As best viewed in FIG. 20F, gear box 1920 is connected via shaft 1998 to depth adjustment body 1994 which pivots about pivot 92 to adjust rocker 95. In one embodiment, shaft 1998 is connected to gear box 1920 via connection 1922 (FIG. 20E). Shaft 1998 terminates with annular lip 1995 (FIG. 20F) inside depth adjustment body 1994. Disposed in depth adjustment body 1994 is force member 1991 (such as a spring) to force shaft 1998 via annular lip 1995 away from depth adjustment body 1994. In the embodiment when force member 1991 is a spring, annular lip 1995 can have a nub 1997 and depth adjustment body 1994 can have a nub 1996 about which spring 1991 is disposed to help retain spring 1991 within depth adjustment body 1994.

Figure 20G:
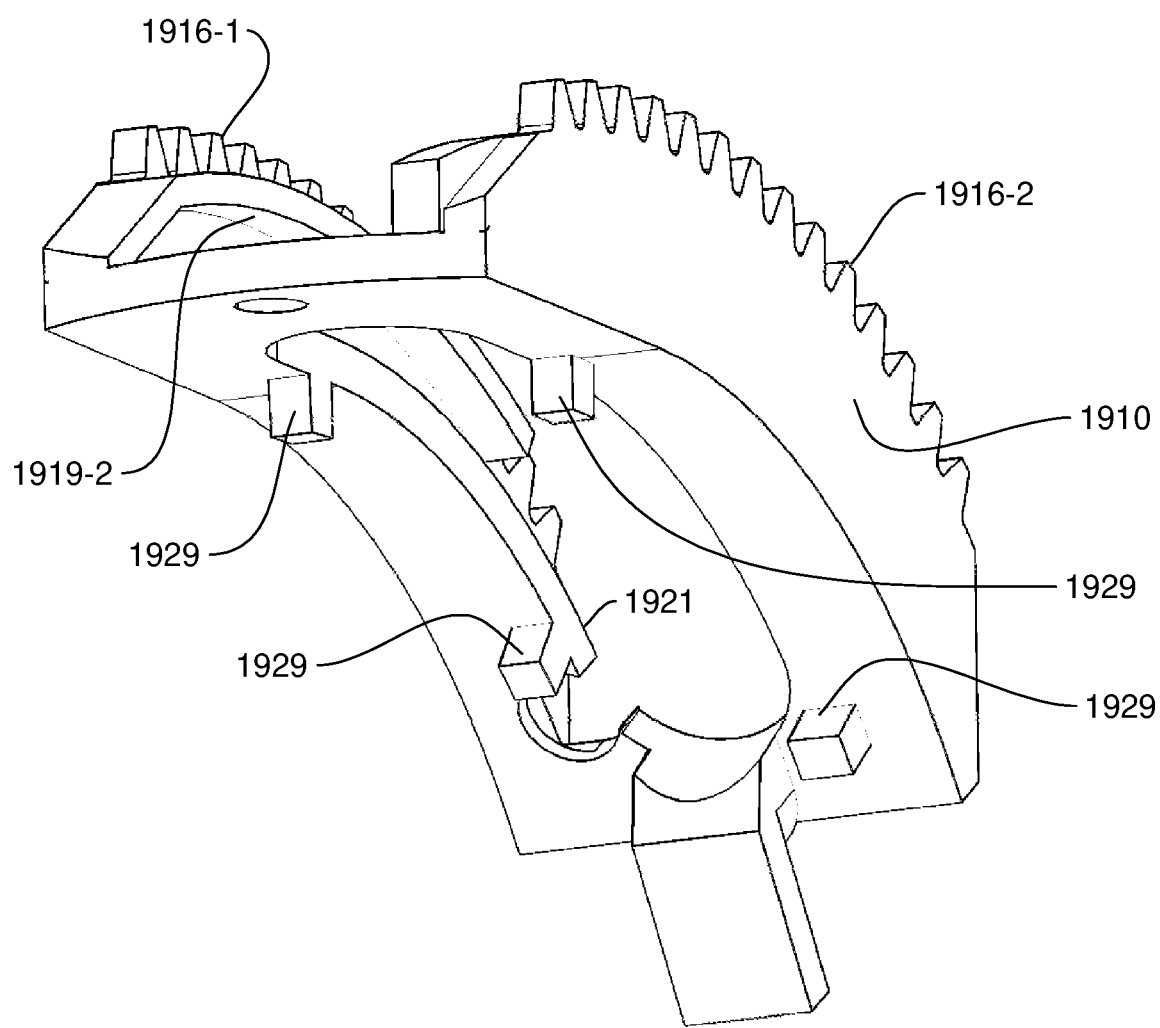
FIG. 20G is a perspective view of the bottom of the gear rack of the embodiment of FIG.
Figure 20H:
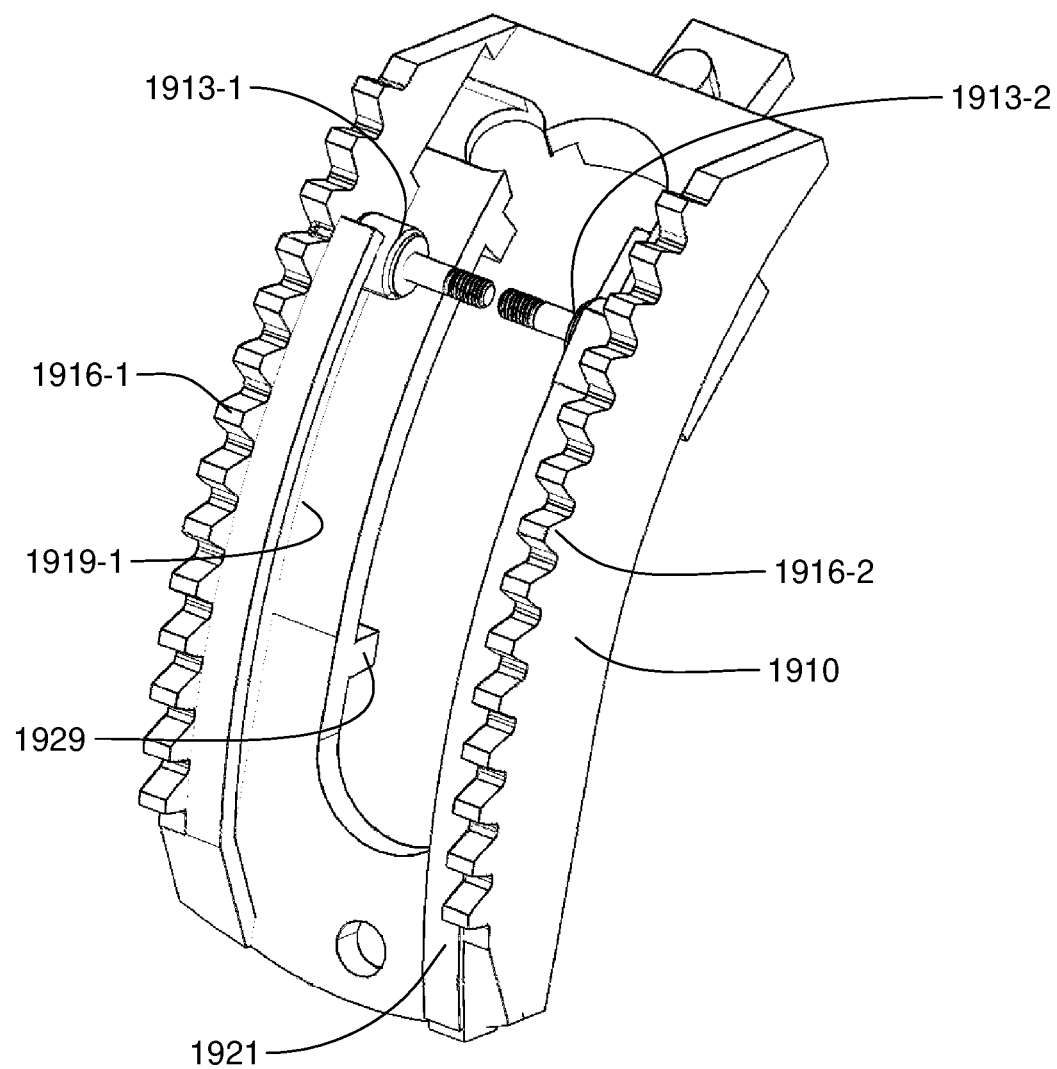
FIG. 20H is another perspective view of the gear rack and rollers of the embodiment of FIG. 20A.

As best viewed in FIG. 20G, gear rack 1910 in one embodiment can have one or more protrusions 1929 which may engage with the depth adjustment notches 97 on frame 14, which are typically found on most frames (not shown).

Figure 20I:
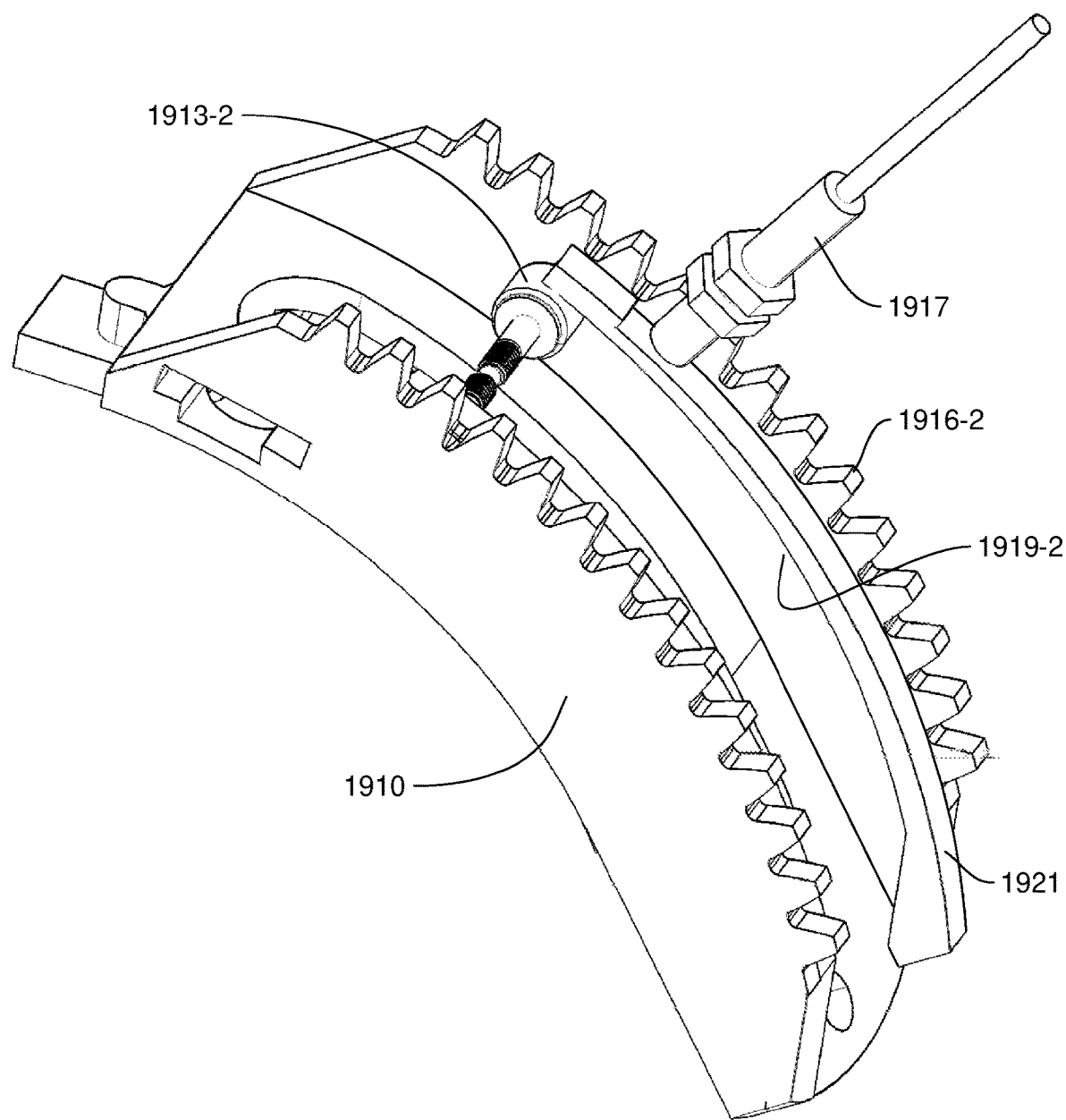
FIG. 20I is a another perspective view of the gear rack of FIG. 20A.

Gear box 1920 includes wheels 1913-1 and 1913-2 (see FIG. 20H with the gear box 1920 removed for clarity) attached to its side. Wheels 1913-1 and 1913-2 engage shelves 1919-1 and 1919-2, respectively, on gear rack 1910. The engagement of wheels 1913-1 and 1913-2 can be best viewed in FIGS. 20H and 20I. FIG. 20I is a perspective view of gear rack 1710 showing the changing radius of ledge 1921 with respect to teeth 1916-2 and ledge 1919-2.

Figure 20J:
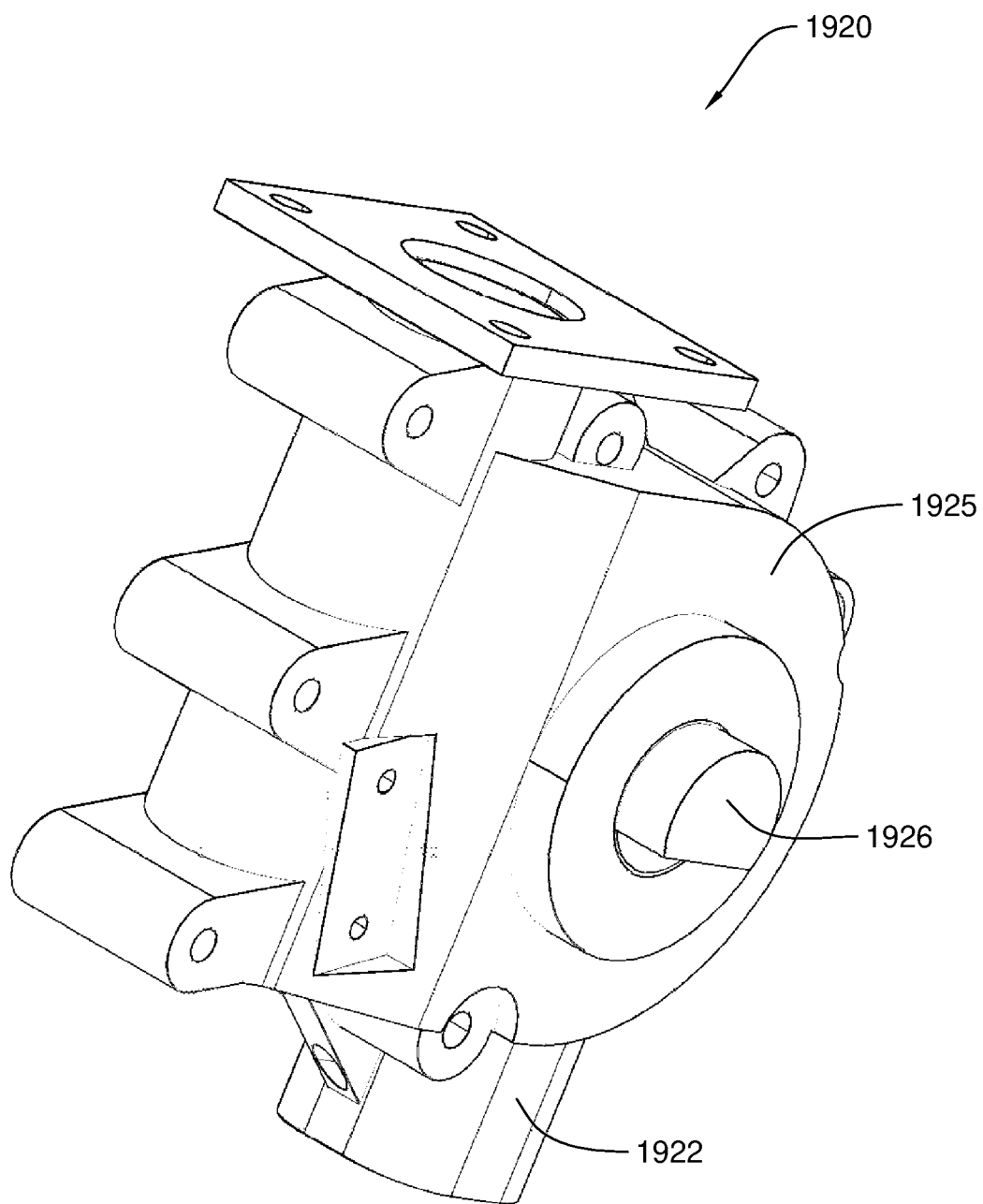
FIG. 20J is a perspective view of the gear box of the embodiment of FIG. 20A.
Figure 20K:
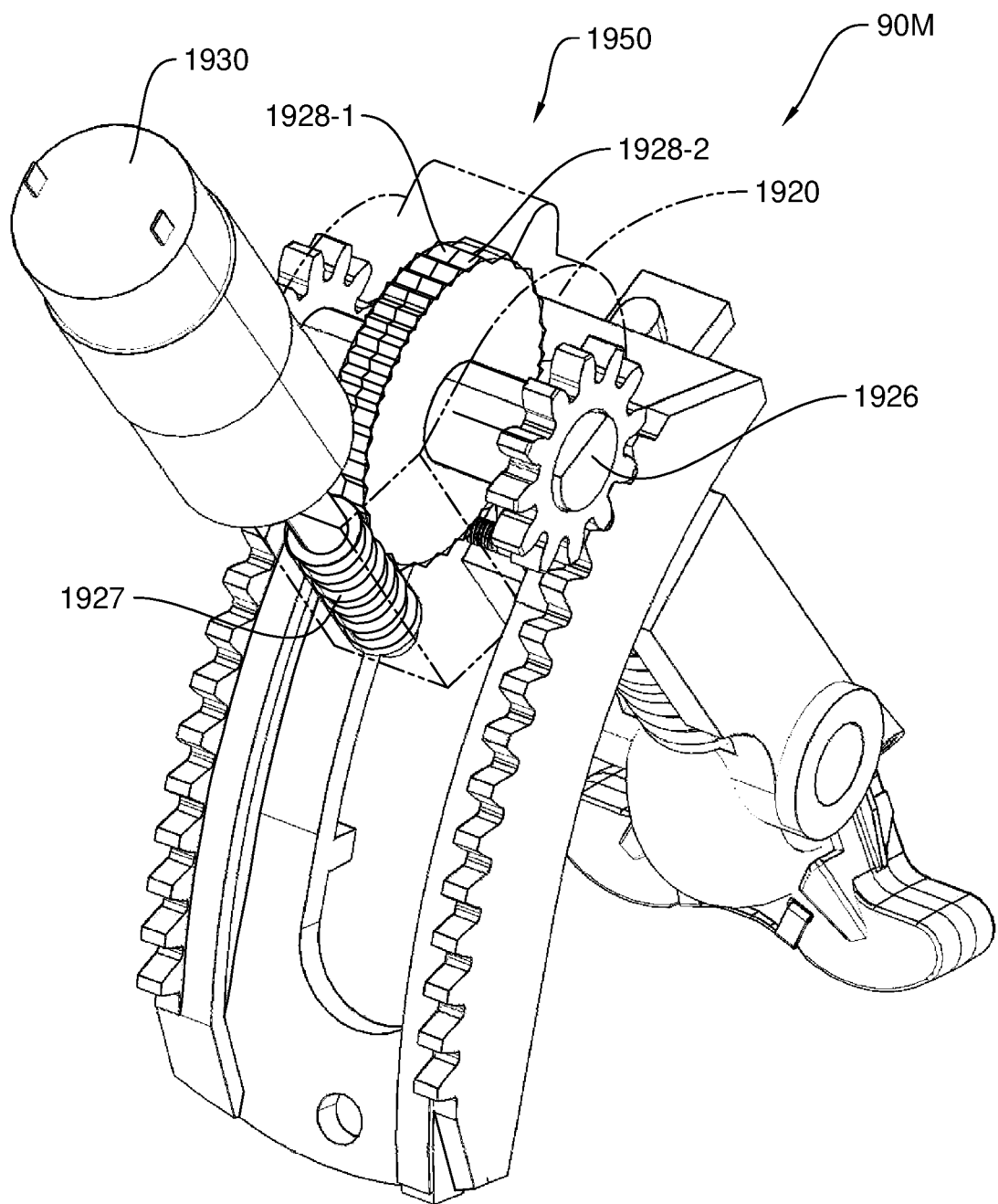
FIG. 20K is a perspective view of the worm gear and wheel inside of the gear box of FIG. 20J.

FIG. 20J shows gear box 1920, and FIG. 20K shows the internal parts of gear box 1920 with gear box housing 1925 removed to show worm gear 1927, wheel 1928 (or 1928-1 and 1928-2) and shaft 1926. Worm gear 1927 coupled to a rotatable shaft 1931 driven by motor 1930 turns wheel gear 1928 and shaft 1926. Gears 1940-1 and 1940-2 are disposed about shaft 1926. In one embodiment, worm gear 1927 and wheel gear 1928 are made from powdered metal. In one embodiment for ease of assembly, wheel gear 1928 is made in two parts, left wheel gear 1928-1 and right wheel gear 1928-2, all of which can be made from powdered metal.

Figure 21:
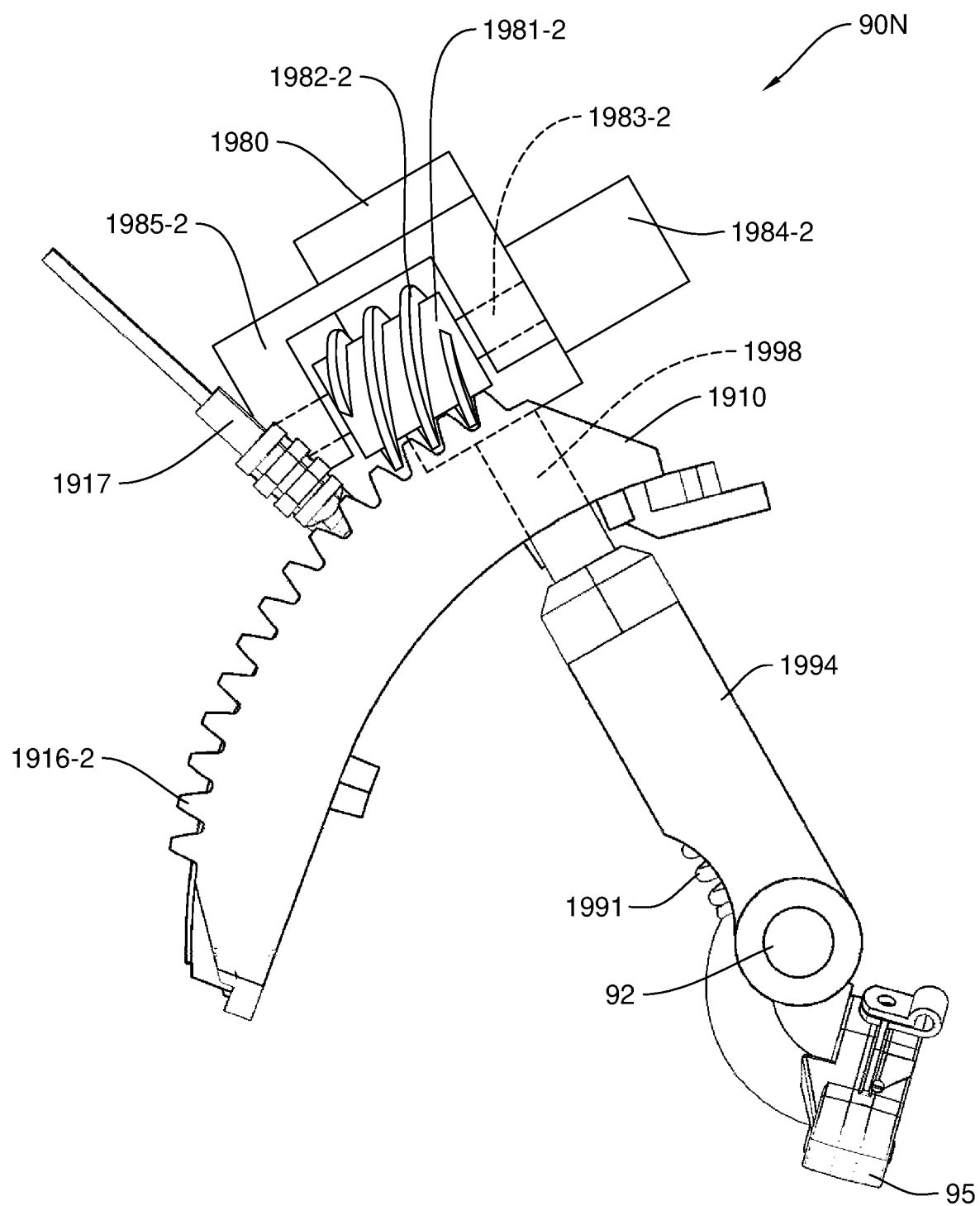
FIG. 21 is a side elevation and partial cutaway view of another embodiment of a depth adjustment assembly with a position location system.
Figure 22A:
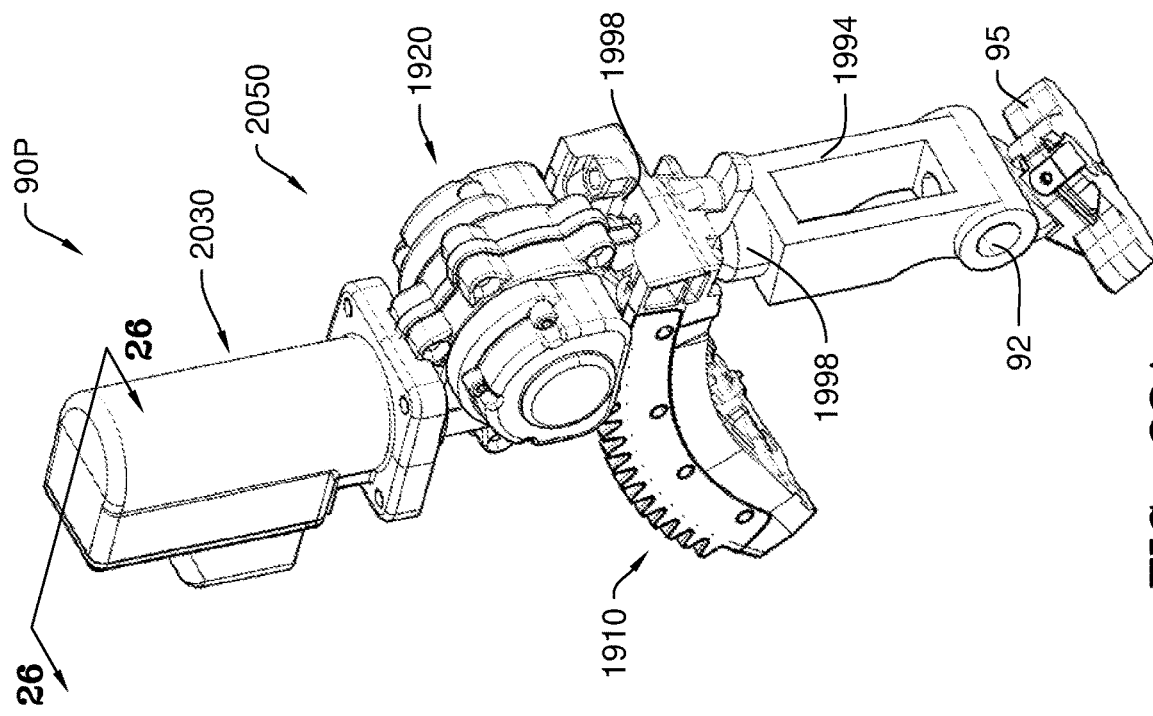
FIG. 22A is a front perspective view the embodiment of the depth adjustment assembly of FIG. 22.
Figure 22:
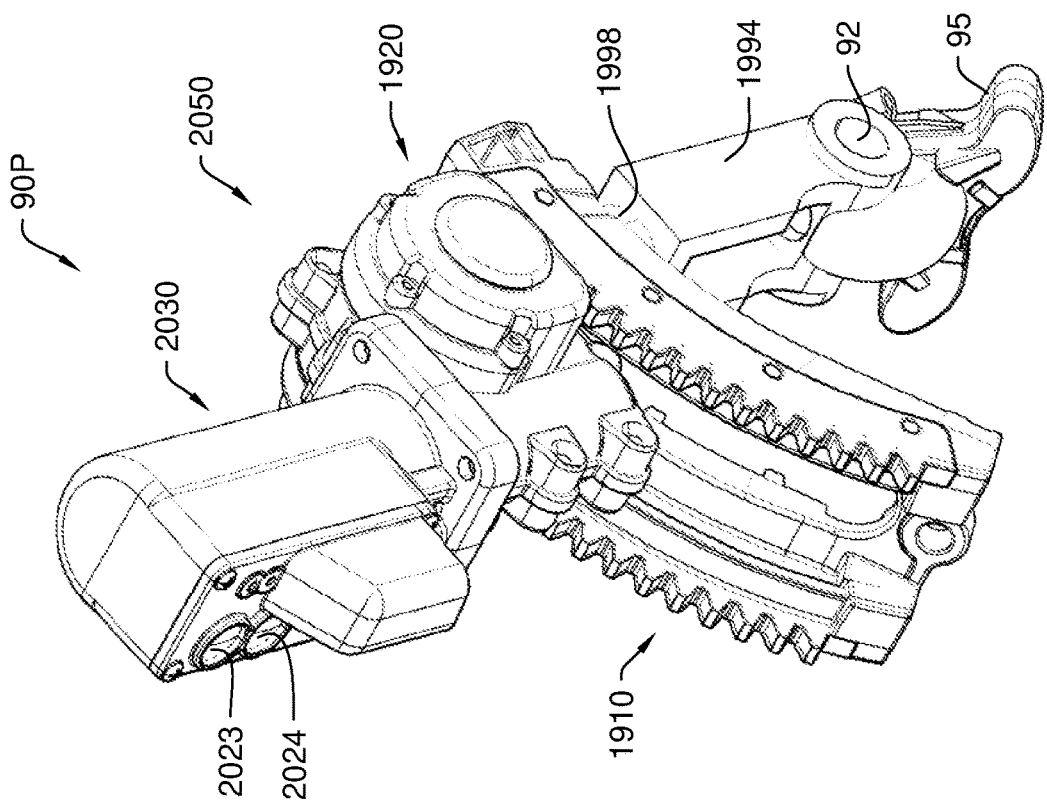
FIG. 22 is a rear perspective view of another embodiment of a depth adjustment assembly similar to the embodiment of FIG. 20A and including a position location system.
Figure 23:
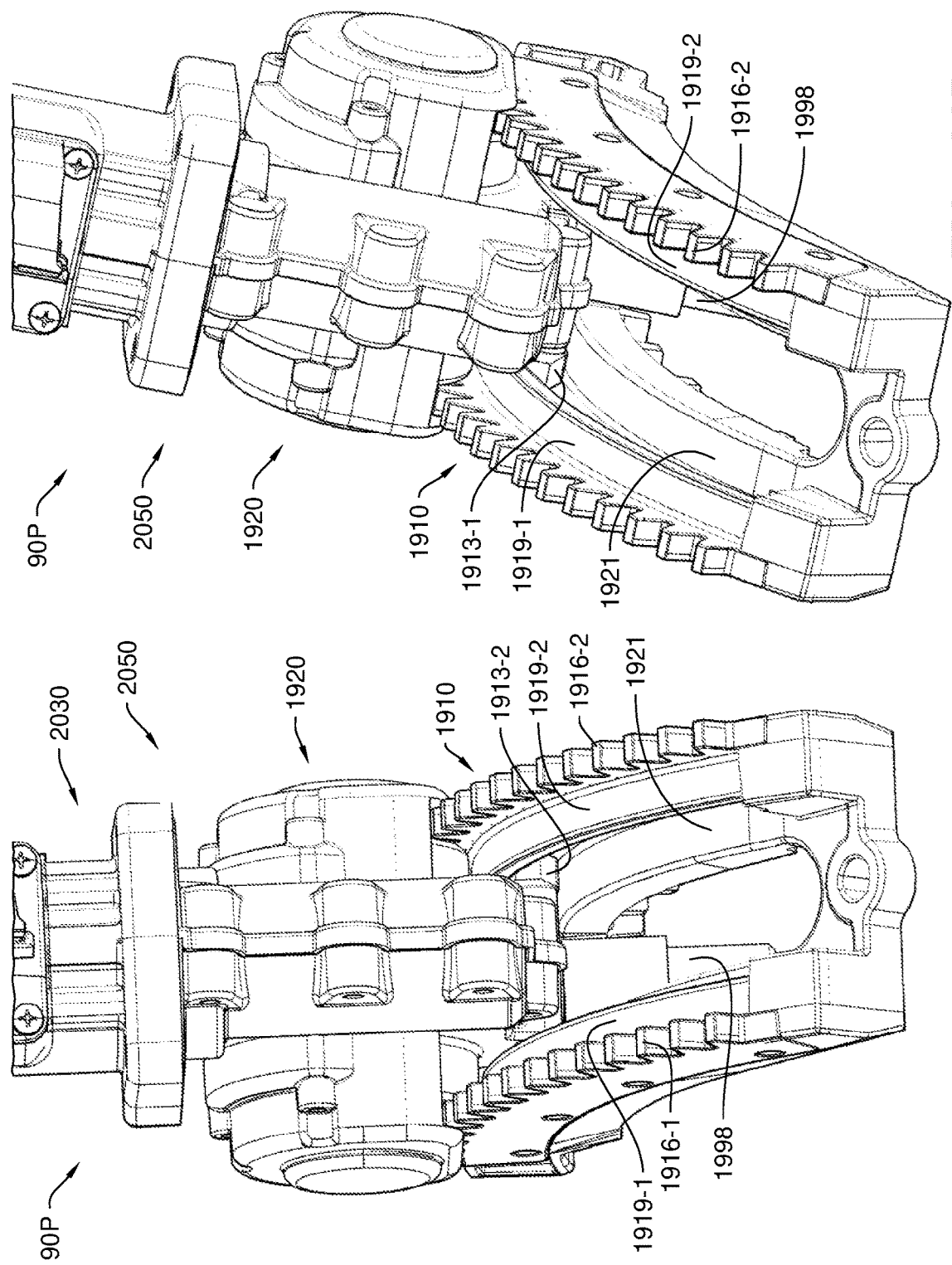
FIGS. 23A and 23B are enlarged perspective views of the embodiment of FIG. 22 showing the UHMVV guides.

FIG. 21 is a side elevation view of another embodiment of a depth adjustment assembly 90N. Assembly 90N is an alternative to assembly 90M in which the wheel gears/pinions are replaced with one or more worm gears. In this embodiment, gear box 1980 is connected via shaft 1998 to depth adjustment body 1994 which pivots about pivot 92 to adjust rocker 95. Disposed on either or both sides of gear box 1980 and positioned over gear rack 1910 is a worm gear 1981 having flights 1982 that engage with the teeth 1916 of the gear rack 1910. The worm gear 1981 has a shaft 1983 which is rotatably driven by an electric motor 1984. The shaft 1983 is supported within a U-shaped bracket 1985 which is supported by the gear box 1980. For consistency with the previously described embodiments, it should be appreciated that the depth adjustment assembly 90N may comprise corresponding left and right worm gears 1981, flights 1982, shafts 1983, motors 1984 and brackets 1985 differentiated by the suffix "-1" and "-2" for those components disposed over the respective left and right gear teeth 1916-1, 1916-2 of the gear rack 1910. However, because FIG. 21 is a sided elevation view, only the "-2" components are visible.

FIGS. 22-26 illustrate another embodiment of a depth adjustment assembly 90P. As with the previously described embodiment 90M, the depth adjustment assembly 90P utilizes an actuator 2050 comprising an electric motor 2030. The gear box, gear rack, and depth adjustment body and the interaction of the respective components are the same for this embodiment 90P as was previously described in connection with embodiment 90M. As such, the same reference numbers are used for the same or corresponding parts in the drawing figures illustrating embodiment 90P as was used for the embodiment 90M. Accordingly, in the interest of brevity, since the gear box 1920, gear rack 1910, and depth adjustment body 1994 are the same for the two embodiments 90P and 90M, the description, operation and interaction of the various components will not be repeated here.

Figure 24:
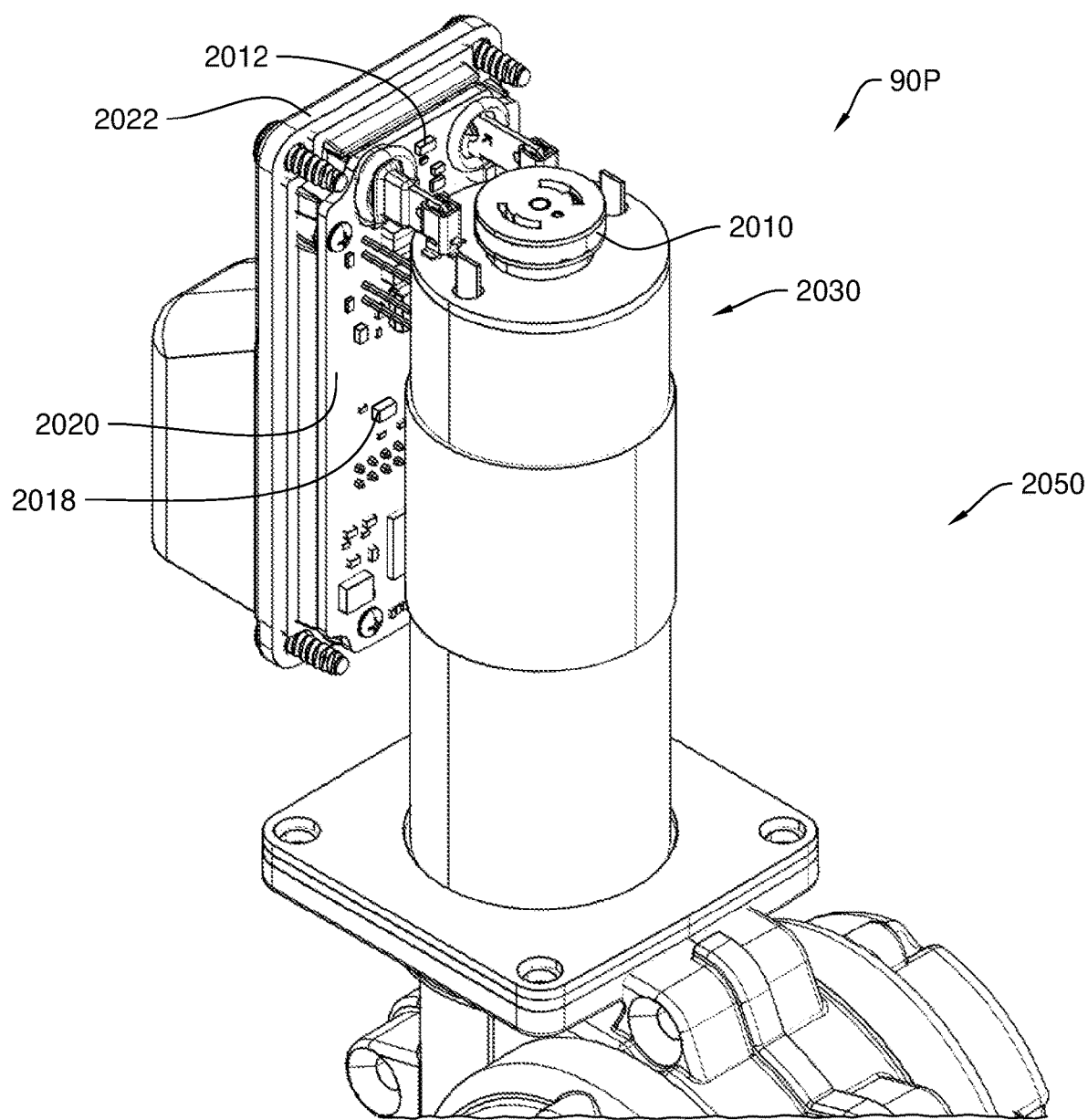
FIG. 24 is an enlarged perspective view of the embodiment of FIG. 22 showing the cover removed from the motor and circuit board to show the magnet and a Hall effect sensor and current sensor on the circuit board.
Figure 25:
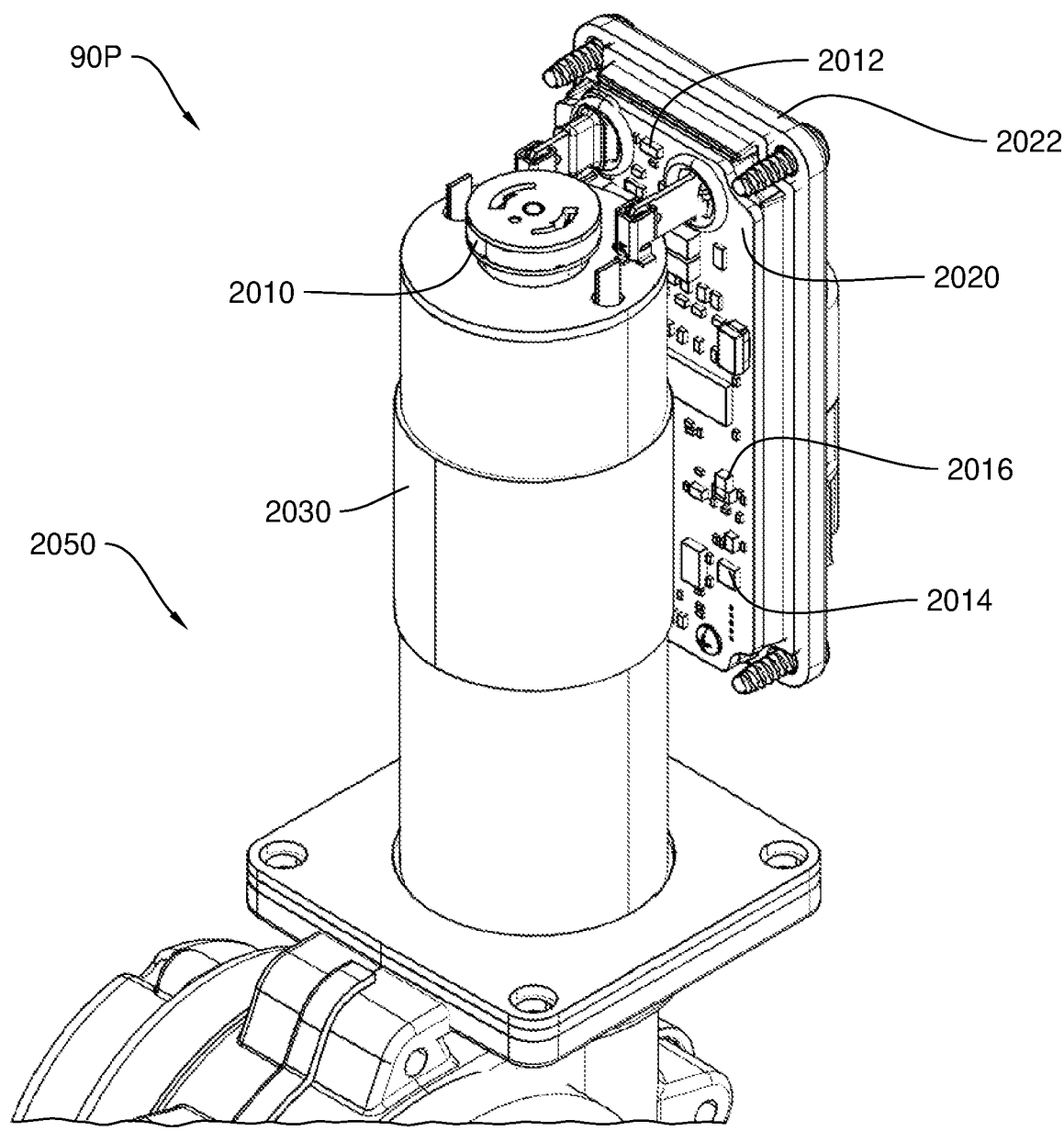
FIG. 25 is another enlarged perspective view of the embodiment of FIG. 22 showing the cover removed from the motor and circuit board to show the magnet, the Hall effect sensor, another current sensor and an accelerometer on the circuit board.
Figure 26:
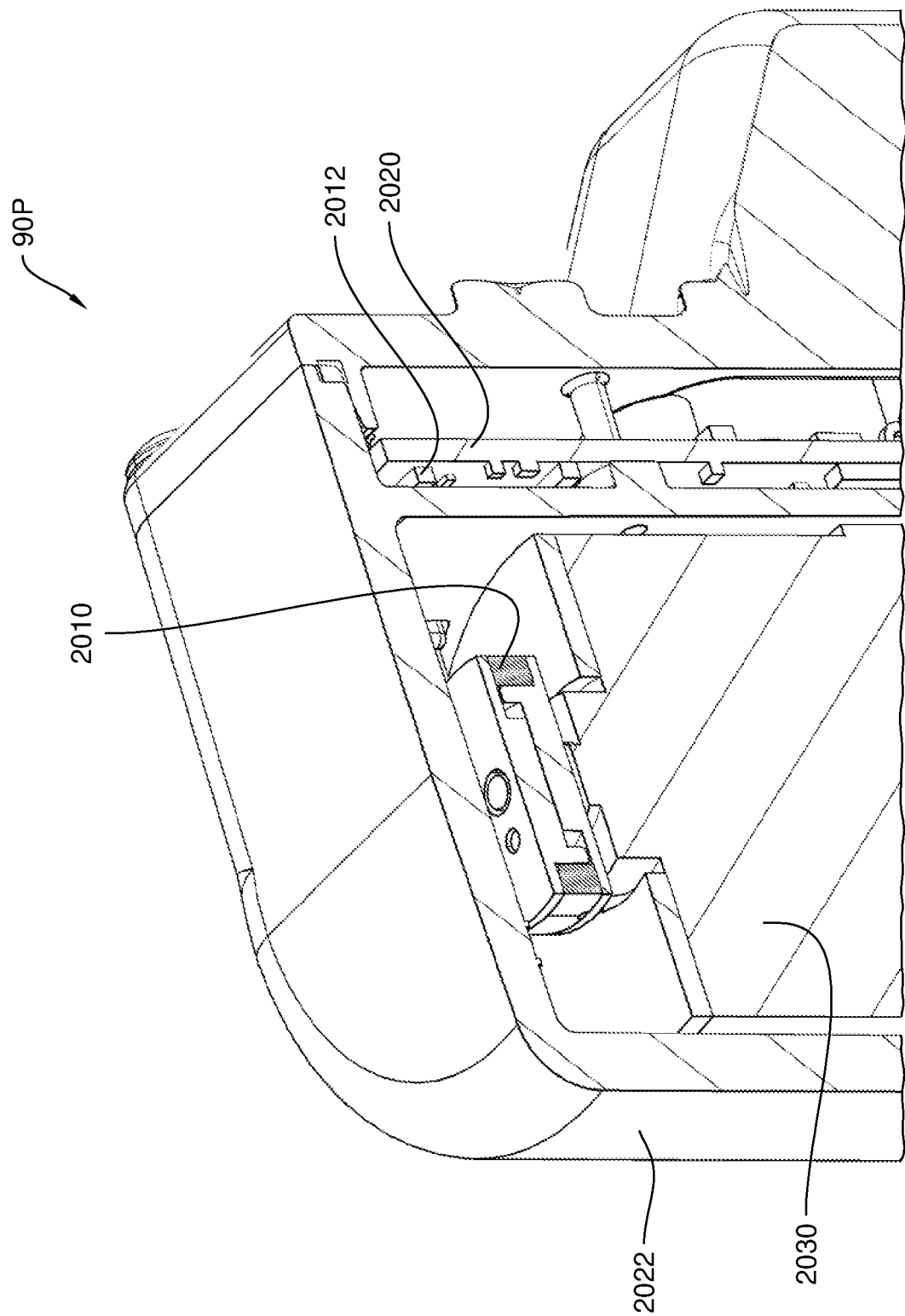
FIG. 26 is an enlarged cross-sectional view of the embodiment of FIG. 22 as viewed along lines 26-26 of FIG. 22, showing the magnet in relation to the Hall effect sensor on the circuit board within the cover.

Unlike embodiment 90M, however, the embodiment of 90P utilizes a different method of sensing position of the depth adjustment body 1994 with respect to the gear rack 1910. Referring to FIGS. 24, 25 and 26, a ring magnet 2010 and a Hall effect sensor 2012 are used to count the motor revolutions to detect position of the depth adjustment body 1994 with respect to the gear rack 1910. An accelerometer 2014 also measures the angle (i.e., position) of the depth adjustment body 1994 with respect to the gear rack 1910. Current sensors 2016, 2018 detect both directions of rotation of the motor 2030 or the motor shaft 1931 having a worm gear 1927 which engages with the wheel gear or gears 1928 as illustrated in FIG. 20K and as previously described in connection with embodiment 90M. The ring magnet 2010 is disposed to rotate with the motor 2030 or motor shaft 1931. The Hall effect sensor 2012, accelerometer 2014 and current sensors 2016, 2018 are mounted to a circuit board 2020 within a protective housing 2022 and are in data communication with the planter monitor 50 discussed later.

Optionally, manual buttons 2023 and 2024 can be mounted to circuit board 2020 for manually advancing depth adjustment assembly 90P in either direction. Each manual button 2023 and 2024 can be configured to move depth adjustment assembly 90P in a direction opposite to the other manual button 2023 or 2024. Each manual button 2023 and 2024 can be configured to move depth adjustment assembly 90P a predetermined distance with a push of the button. For example, a push could advance depth adjustment assembly 90P by ⅛ inch (0.32 cm). Also, holding either manual button 2023 or 2024 will continuously advance depth adjustment assembly Manual adjustment can be used to manually calibrate depth adjustment assembly 90P or to move depth adjustment assembly 90P to a location out of the way to allow an operator to work on any piece of equipment. In another embodiment, pushing both manual buttons 2023 and 2024 can be programed to execute a selected function, such as moving depth adjustment assembly 90P to the shallowest or deepest setting.

Calibration

In one method of calibrating the depth adjustment assembly 90P, the actuator 2050 is "homed" or "zeroed" with respect to a starting position. The zero or home position may be associated with the shallowest setting, with the deepest setting, with the shallowest and the deepest setting, or with a known depth between the shallowest and deepest settings, such as, for example, a two inch depth.

By way of example, to zero or home the actuator 2050 to the shallowest depth, the motor 2030 is commanded to actuate via the planter monitor 50 to cause the gears to engage and rotate to move the depth adjustment body 1994 along the gear rack 2010 toward the shallowest position until the gear box 1920 or depth adjustment body 1994 abuts with a positive stop on the gear rack 1910. When the positive stop is reached, the current detected by one of the current sensors 2016, 2018 will begin to spike, indicating the gear box 1920 or depth adjustment body 1994 is at the shallowest setting possible, which establishes the zero or home position. The detected current spike associated with the zero or home position may be between 5% to 20% of the full motor current. For example, if the motor 2030 is an 18 amp motor, when the current reaches 2 amps (i.e., approximately 10% of the full motor current), the motor is commanded to shut off, and that position is associated with the "zero" or "home" position. In other words the motor may be commanded to shut off before the current reaches full current to save the motor from being overworked. In other embodiments, the current spike may be no more than 95% of the full motor current, or no more than 90%, or no more than 80%, or no more than 70%, or no more than 60%, or no more than 50%, or no more than 40%, or no more than 30%, or no more than 25% of the full motor current.

Once home or zero is established, a block of a known thickness (e.g., two inches) is placed under each gauge wheel 52-1, 52-2 to simulate a known trench depth setting (i.e., the permitted travel distance of the gauge wheels with respect to the opener disks). The motor 2030 is then commanded to actuate to cause the gears to engage and rotate to move the depth adjustment body 1994 toward the deepest trench depth setting until another spike in the current is detected by one of the current sensors 2016, 2018, indicating that the gauge wheels are pressing firmly against the blocks and establishing that the predefined trench depth setting has been reached (e.g., the two inch depth corresponding to the block thickness). As the depth adjustment moves from the shallowest position until reaching the predefined block depth setting, the number of revolutions of the motor 2030 or motor shaft 1931 are counted via the Hall effect sensor detecting the rotation of the magnet 2010 (which rotates with the motor 2030 or motor shaft 1931). The counted number of revolutions, whether of the motor 2030 or motor shaft 1931, are hereinafter referred to as "revolution counts." The number of revolution counts will therefore correspond to the predefined depth setting (which, in this example, is a two inch depth based on the known thickness of the block placed under the gauge wheels). Therefore after calibrating to a known block thickness, the relationship (linear or non-linear depending on the shape of the row unit 10) between revolution counts versus change in depth can be applied to determine the depth throughout the entire range of movement of the actuator 2050 or depth adjustment body 1994 with respect to the gear rack 1910 based on revolution counts.

It should also be appreciated that rather than zeroing or homing the actuator to the shallowest depth, the actuator may be zeroed or homed to the deepest depth. In such a method, the motor 2030 is commanded to actuate via the planter monitor 50 to cause the gears to engage and rotate to move the depth adjustment body 1994 along the gear rack 2010 toward the deepest position until the gear box 1920 or depth adjustment body 1994 abuts with a positive stop on the gear rack 1910. When the positive stop is reached, the current detected by one of the current sensors 2016, 2018 will begin to spike, indicating the gear box 1920 or depth adjustment body 1994 is at the deepest setting possible, which establishes the zero or home position. Once zero or home is determined, a block of a known thickness (e.g., two inches) is placed under each gauge wheel 52-1, 52-2 to simulate a known trench depth setting (i.e., the permitted travel distance of the gauge wheels with respect to the opener disks). A benefit to going to the deepest setting possible is that the weight of the planter is carried by opening discs 62 on each row unit 10 so that the planter does not need to be raised. This allows the block to be placed under each gauge wheel 52. The motor 2030 is then commanded to actuate to cause the gears to engage and rotate to move the depth adjustment body 1994 toward the shallowest trench depth setting until another spike in the current is detected by one of the current sensors 2016, 2018, indicating that the gauge wheels are pressing firmly against the blocks indicating that the predefined trench depth setting has been reached (e.g., the two inch depth corresponding to the block thickness). As the depth adjustment body 1994 moves from the deepest position until reaching the predefined block depth setting, the number of revolutions of the motor 2030 or motor shaft 1931 are counted via the Hall effect sensor detecting the rotation of the magnet 2010 (which rotates with the motor 2030 or motor shaft 1931). The number of revolution counts will therefore correspond to the predefined depth setting (which, in this example, is a two inch depth based on the known thickness of the block placed under the gauge wheels). Therefore, after calibrating to a known block thickness, the relationship (linear or non-linear depending on the shape of the row unit 10) between motor revolutions versus change in depth can be applied to determine the depth throughout the entire range of movement of the actuator 2050 or depth adjustment body 1994 with respect to the gear rack 1910 based on revolution counts. After calibration, the depth can be set to maximum again so that the blocks can be removed without the need to raise the planter.

It should also be appreciated that the zero or home position need not be at the shallowest or deepest position. Instead, the zero or home position may be associated with a known depth between the shallowest and deepest settings (e.g., a two inch depth). By way of example, if it is desired to associate the zero or home position with a two inch trench depth (i.e., the permitted travel distance of the gauge wheels with respect to the opener disks), the actuator 2050 or depth adjustment body 1994 may initially be placed at the shallowest or deepest setting and then a two inch thick block may be placed under each gauge wheel 52-1 and 52-2. The motor 2030 may then be commanded to cause the depth adjustment body 1994 to travel toward the shallowest or deepest position. As the depth adjustment body 1994 moves toward the shallowest or deepest position, the motor revolutions are counted until a current spike is observed as the gauge wheels 52-1, 52-2 start to contact the block. The position of the depth adjustment body 1994 where the current spike is detected (i.e., at the two inch depth in this example) is established as the zero or home position. When the actuator 2050 or depth adjustment body 1994 is moved from the established zero or home position toward a deeper or shallower setting, the number of rotations of the motor 2030 or motor shaft 1931 (in the direction of the increase or decrease of the depth) are counted from the established zero or home position. As previously described, the linear relationship between revolution counts versus change in depth can be applied to determine the depth throughout the entire range of movement of the actuator 2050 or depth adjustment body 1994 based on revolution counts.

The above described calibration processes may be repeated for each row unit of the planter, which may be performed sequentially for each row unit or all row units may be calibrated simultaneously. It should be appreciated that only the zero or home position needs to be set, because the thickness of the block used under the gauge wheels is known which sets the trench depth. It should also be appreciated that not all rows need to be zeroed using the above methods. A subset of rows, for example, 50%, 33%, 25%, 20%, or any number less than 100%, may be zeroed or homed according to any of the above methods. The subset of rows that are zeroed are then averaged to provide an average zero or home that can then be applied across all rows equally or to the rows that were not zeroed.

During the calibration process in any of the above examples for detecting the current spikes when the gauge wheels contact the blocks, a downforce sensor may be utilized to ensure consistent loading on the gauge wheels 52-1 and 52-2 across the various row units 10. For example, a downforce system, such as the DeltaForce® system available from Precision Planting LLC, 23207 Townline Road, Tremont, IL 61568 (described in International Publication No. WO2014/018716), may be utilized to ensure consistent loading on the gauge wheels 52-1 and 52-2 at each row unit 10 to ensure uniform results across the agricultural implement.

It should also be appreciated that the depth adjustment assembly 90P may be manually calibrated by moving depth adjustment assembly 90P to a zero or home location by activating manual button 2023 or 2024 to move depth adjustment assembly 90P as previously described.

When operating in a field, and in particular a no-till field, the gear rack 1910 could become filled with debris, which could limit the travel of the actuator 2050 on the gear rack 1910 causing an earlier current spike due to the depth adjustment body 1994 or gear box 1920 abutting the debris filling the gear rack 1910 instead of the depth adjustment body or gear box 1920 abutting the positive stop on the gear rack 1910. This earlier or premature current spike due to abutment with the debris will result in a false or incorrect home or zero position. Accordingly, it may be desirable to home or zero the actuator 2050 or depth adjustment body 1994 at a midpoint of the gear rack 1910 or at some other point between either end of the gear rack 1910 where debris is unlikely to accumulate so as to avoiding a false or incorrect home or zero position.

Figure 27:
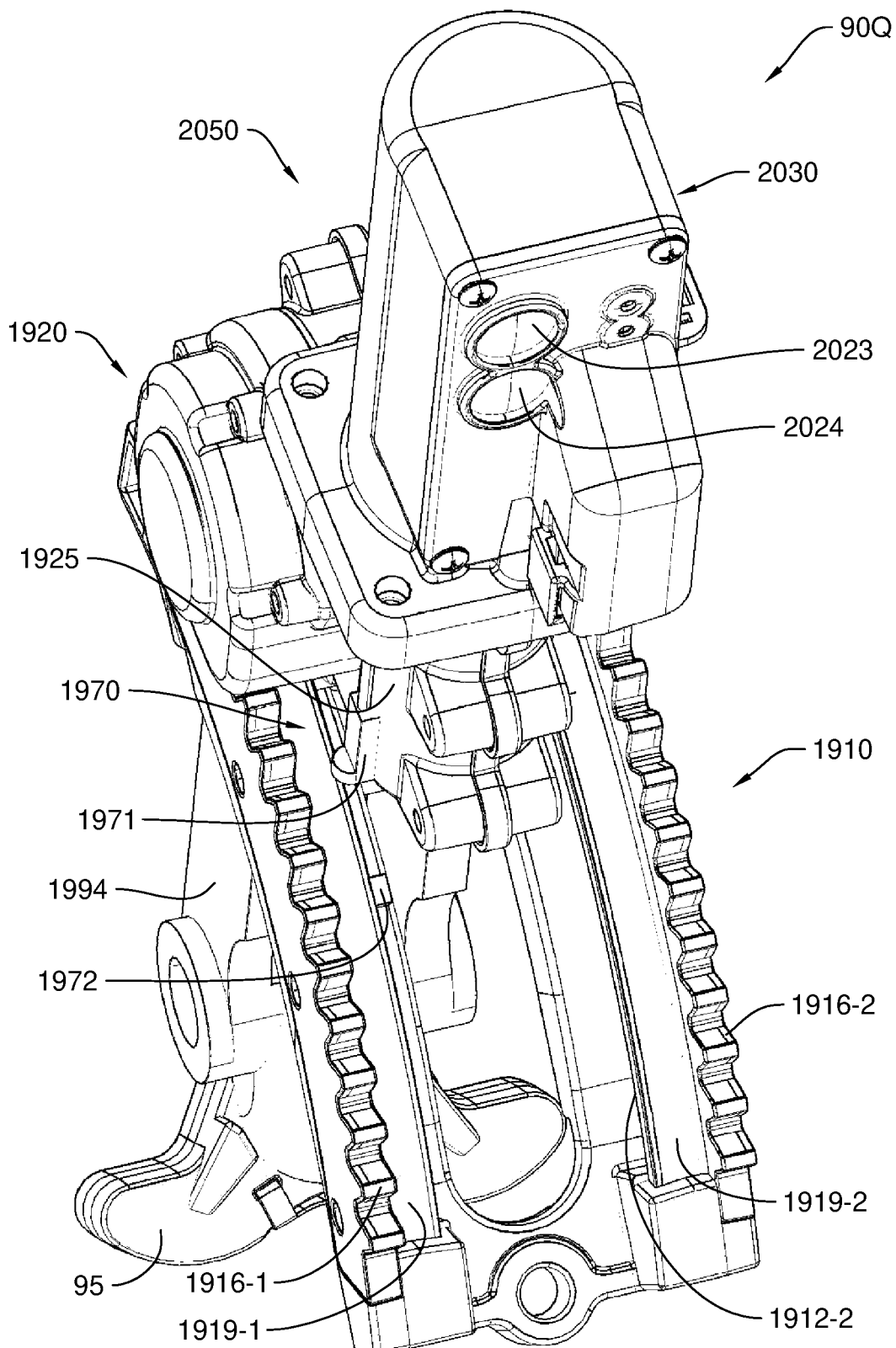
FIG. 27 is a rear perspective view of another embodiment of a depth adjustment assembly similar to the embodiment of FIG. 22 and incorporating a homing system.

FIG. 27 is a rear perspective view of another embodiment of a depth adjustment assembly 90Q. In this embodiment, the depth adjustment assembly 90Q is substantially the same as the previously described depth adjustment assembly 90P, but incorporates a homing system 1970 for homing the actuator 2050 or depth adjustment body 1994 with respect to a position on the gear rack 1910 between the ends of the gear rack 1910. The homing system 1970 includes a sensor 1971 and a target 1972. The target 1972 may be a magnet, and the sensor 1971 may be a Hall effect sensor. Alternatively, the sensor 1971 may be an inductive sensor, and the target 1972 may be a metal block detectable by the inductive sensor. The sensor 1971 may be disposed on the gear box housing 1925 and the target 1972 may be disposed on the gear rack 1910, such as on one edge 1912-1, 1912-2 of the shelf 1919-1, 1919-2 at the midpoint of travel along gear rack 1910 or at another point that is not at either end of gear rack 1910. The sensor 1971 may be connected to circuit board 2020, which may be in data communication with the monitor 50. Home or zero is established when the sensor 1971 is disposed over the target 1972. Thus, if the target 1972 is at the midpoint of the gear rack 1910, then the home or zero will be the midpoint of gear rack 1910. As previously described, the linear relationship between revolution counts versus change in depth can be applied to determine the depth throughout the entire range of movement of the actuator 2050 or depth adjustment body 1994 based on revolution counts in either direction from the zero or home position.

It should be appreciated that the homing system 1970 may be used in conjunction with or in the alternative to the zeroing or homing methods described above.

As a verification or check of the depth based on the number of revolution counts as described above, the revolution counts may be correlated with the angle of the actuator 2050 or the depth adjustment body 1994 as detected by the accelerometer 2014. The correlation of the revolution counts with actual measured angles detected by the accelerometer 2014 will ensure proper depth calibration to account for variations in geometry of components from the manufacturer and to account for worn components on the row unit. A standard calibration equation may be used to correlate the depth setting (based on revolution counts) since there is a predetermined number of pulses from the magnet and Hall effect sensor that correlate to a predetermined depth change. For example, tests have shown that 250 revolution counts (producing 250 pulses from the magnet rotating past the Hall effect sensor) correlates to roughly a 0.11 inch (0.28 cm) change in furrow depth, and this change in furrow depth in relation to revolution counts is substantially linear across the entire depth range. Therefore, after calibrating to a known block thickness or to a home position using the homing system 1970, the linear relationship between revolution counts versus change in depth can be applied to determine the depth throughout the entire range of movement of the actuator 2050 or depth adjustment body 1994. Similarly, if the change in planting depth is substantially linear in relation to revolution counts, the angle of the actuator 2050 or depth adjustment body 1994 as detected by the accelerometer 2014 can likewise be correlated using a standard calibration equation.

In addition, it is known that different soils, tillage practices and field conditions can affect actual trench depth in comparison to trench depth settings. Thus, for example, if the commanded depth is 2 inches (5 cm), but measurement of the actual depth in the field reveals that the seed trench is only 1.5 inches (3.8 cm), an offset to the calibration may be applied to "true-up" the position of the actuator 2050 or the depth adjustment body 1994 with the actual trench depth to account for field conditions.

It should be appreciated, however, that if the relationship between revolution counts with respect to change in depth across the entire range of movement of the actuator 2050 or depth adjustment body 1994 is not linear, a non-linear relationship may be required to correlate the depth with the revolution counts and with the measured angles detected by the accelerometer 2014. Such non-linear correlation would be understood by those of ordinary skill in the art.

For any of the depth adjustment assemblies described herein that have a motor as part of their actuator (e.g., 1450, 1550, 1650, 1750, 1850, 1950, 2050), the set depth can be determined by the motors 1450, 1550, 1650, 1730, 1830, 1930, 1984, 2030 based on their rotations in either direction. If motors 1450, 1550, 1650, 1730, 1830, 1930, 1984, 2030 are stepper motors, the number of steps taken in either direction can be tracked by depth control and soil monitoring system 300.

Diagnostics

The angles detected by the accelerometer 2014 may be used as a diagnostic tool of the Hall effect sensors on the row units by comparing the angles detected for the depth adjustment body 1994 of one row unit with the readings of the accelerometers of the other row units on the planter. For example, if the angle detected by the accelerometer 2014 of one row unit is significantly different from the angles detected by the accelerometers 2014 of other row units, there may be a faulty Hall effect sensor not accurately counting revolutions of the motor 2030 or motor shaft 1931.

Additionally, if a repair or alteration is made to the row unit and the actuator 2050 is installed in a different position than its original position, the accelerometer 2014 will detect this discrepancy in relation to the reading of the accelerometers 2014 of the other row units and the discrepancy may be displayed to the operator on the planter monitor to notify the operator that an adjustment is necessary.

Also, the SRM accelerometer may be referenced to verify the position of the actuator 2050. For example, assuming the planter is operating on flat ground and the accelerometer 2014 and the actuator 2050 is at a 30 degree angle on the gear rack 1910, but then the topography changes to a 10 degree uphill slope, this change in slope would cause the accelerometer 2014 to signal that the actuator 2050 has moved from its commanded position unexpectedly when in reality it is correct, but the topography changed. To avoid such false readings, the signals generated by the accelerometer 2014 are compared against the signals generated by the accelerometer on the SRM. Thus, as the topography changes, the gravity vector from the SRM changes and this gravity vector can be referenced in relation to the accelerometer 2014, to confirm that the actuator 2050 did not move.

Additionally, the current sensors 2016, 2018 can detect if there is a jamming situation in the actuator 2050 if the current spikes when the depth adjustment body 1994 is not near either end of travel on the gear rack 1910 and the Hall effect sensor fails to pick up any pulses indicating that the motor 2030 has stalled.

Additional Depth Adjustment Assembly Embodiments

FIGS. 28-31 illustrate another embodiment of a depth adjustment assembly 90R. The depth adjustment assembly 90R comprises an actuator 3050 which includes an electric motor 3030. The electric motor 3030, may be a servo motor, a gear motor or a stepper motor. If a gear motor is used, the gear motor may be geared so low that it is effectively self-locking when not being powered to rotate. Alternatively, if the motor 3030 is not self-locking, a brake may be incorporated to prevent rotation of the worm gear 3032, the gear wheel 3036 or the shaft 3038 (all discussed later). It should be appreciated that unlike the embodiments 90H-90Q which either move along the depth adjustment slots 97 (e.g., 90H and 90H-1 of FIGS. 15-15B) or which move along a gear rack disposed over the depth adjustment slots 97 (e.g., 90I-90Q of FIGS. 16-16E and FIGS. 18-27), in the embodiment of the depth adjustment assembly 90R, the actuator/motor 3050/3030 does not travel along the row unit frame 14. Instead, in the embodiment of the depth adjustment assembly 90R, the actuator/motor 3050/3030 is fixed in place relative to the frame 14 by a mounting assembly 3000. The mounting assembly 3000 may include a mounting frame 3002 that is secured to the row unit frame 14 (e.g., by bolts not shown) over the depth adjustment slots 97 of the row unit 10. A motor mount 3004 is rigidly attached to the mounting frame 3002 from which the motor 3030 and the gear box 3020 are supported.

Figure 28:
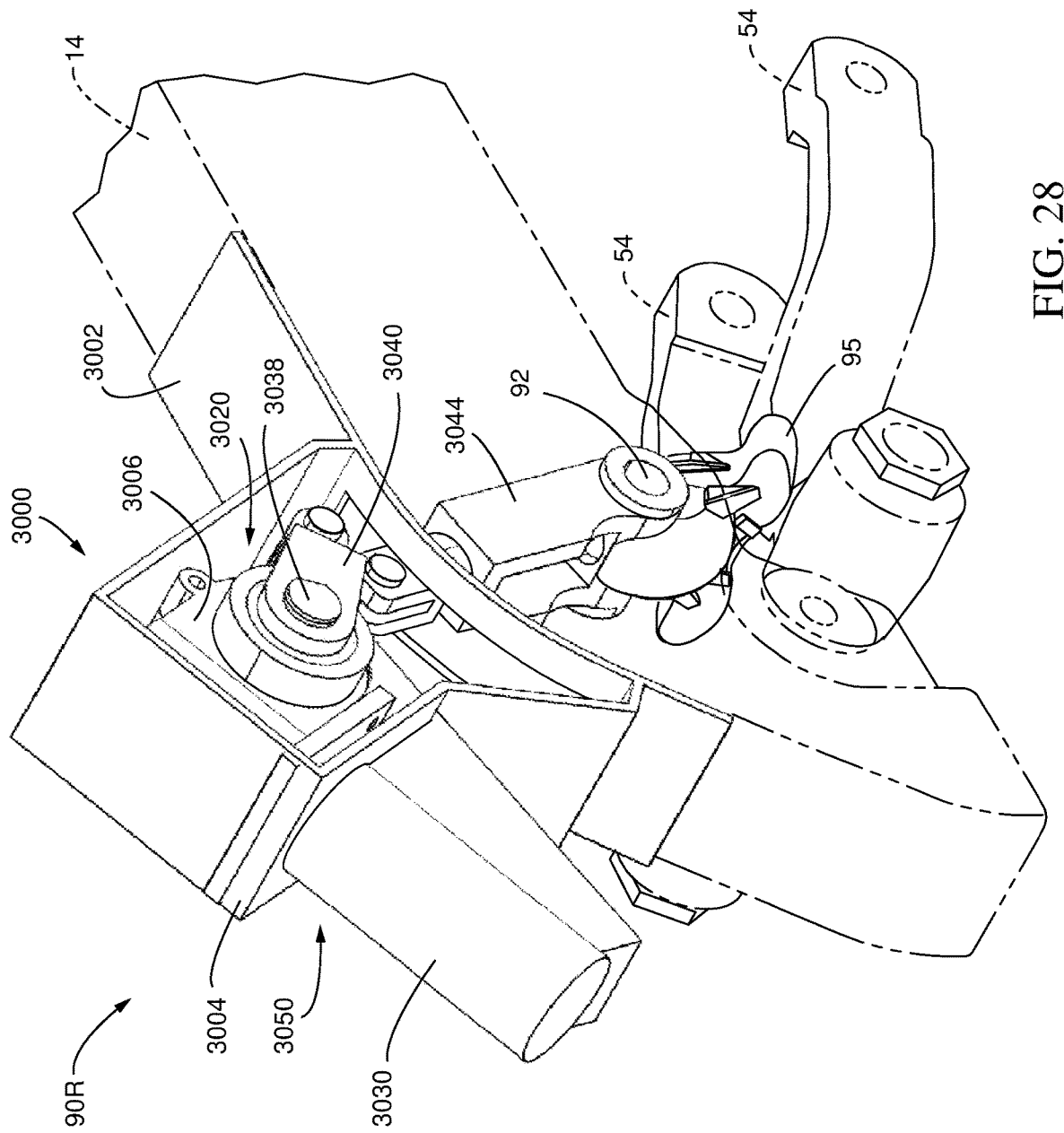
FIG. 28 is a partial perspective view of another embodiment of a depth adjustment assembly shown mounted to a frame member of a planter row unit.
Figure 29:
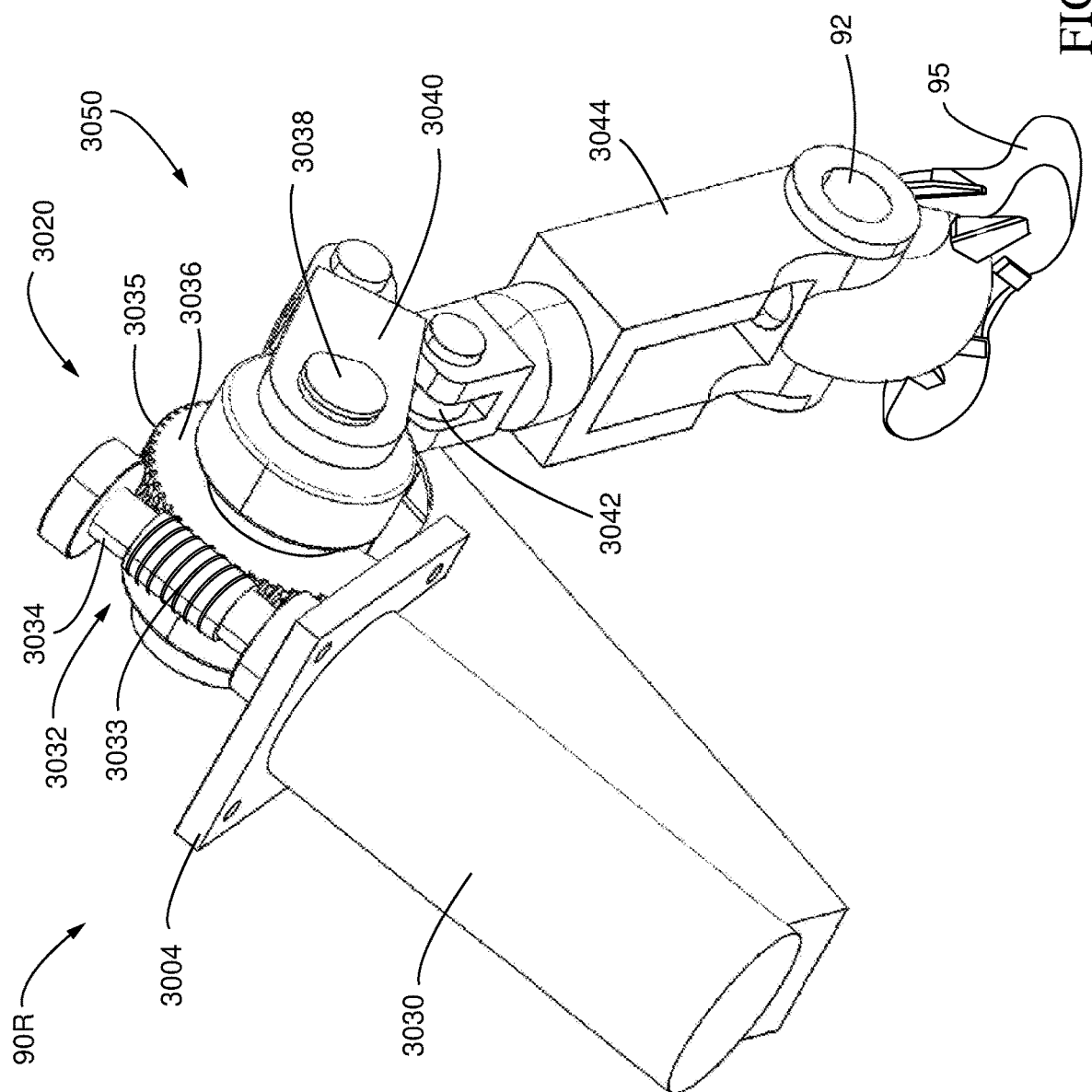
FIG. 29 is the same perspective view of the depth adjustment assembly of FIG. 28, but with components removed to show the internal components of an embodiment of the gear box.
Figure 30:
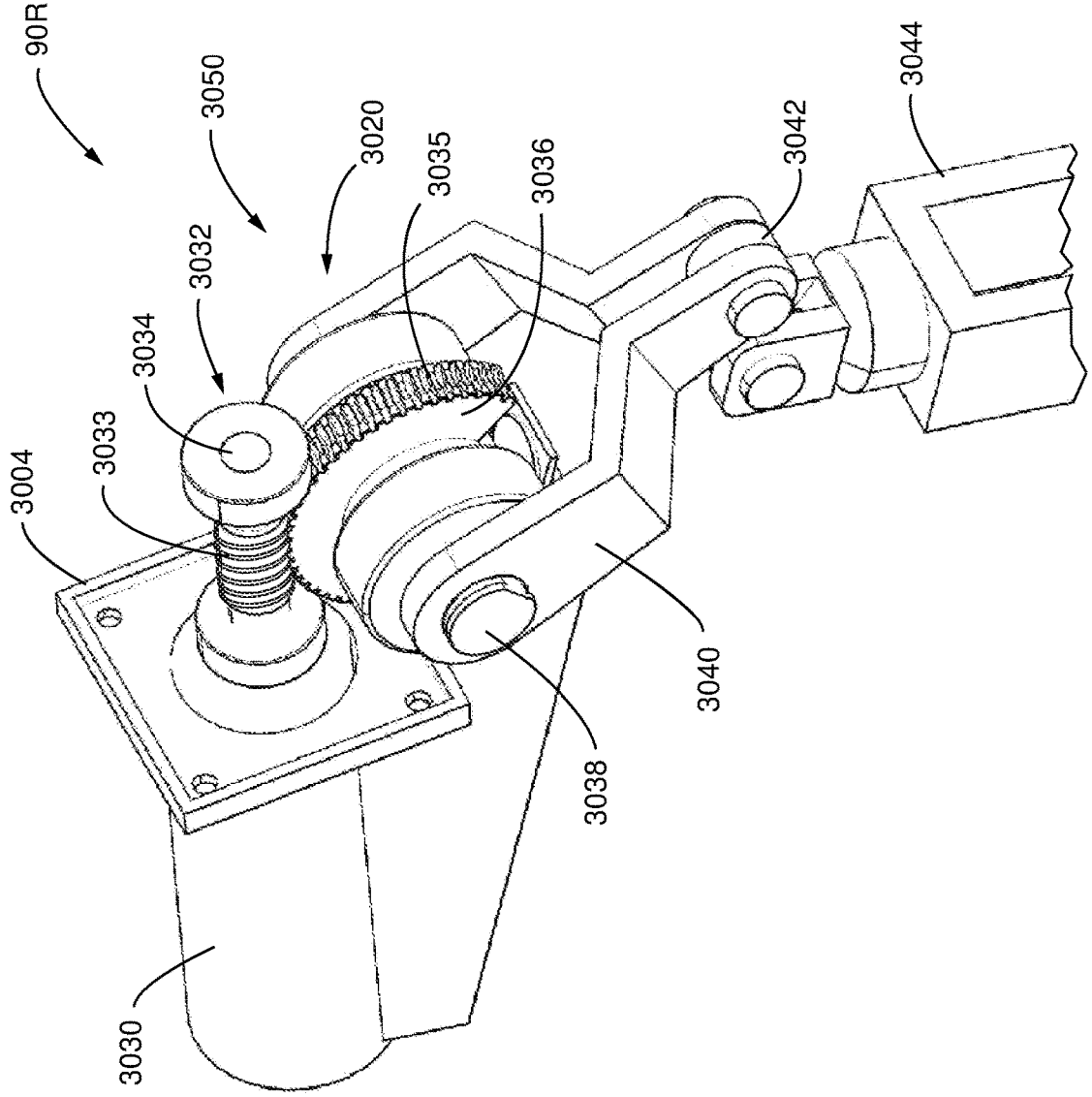
FIG. 30 is another perspective view of the depth adjustment assembly shown in FIG. 29 as viewed from the forward end looking rearward.

FIG. 29 is the same view as FIG. 28, but with the frame 14, gauge wheel arms 54, and mounting assembly 3000 removed for clarity. In addition, the gear box housing 3006 is also removed to show the structure and arrangement of the internal gears of the gear box 3020. FIG. 30 is another perspective view of FIG. 29 looking rearward. The motor 3030 is coupled to and drives a worm gear 3032 which includes helical teeth 3033 around a rotatable shaft 3034. The helical teeth 3033 engage with notches 3035 of a gear wheel 3036. The gear wheel 3036 is rotationally fixed to a transverse shaft 3038 and the transverse shaft 3038 is rotationally fixed to a clevis 3040. A link 3042 pivotally connects the clevis 3040 to the depth adjustment body 3044. The depth adjustment body 3044 is pivotally connected to the row unit frame 14 by pivot 92. The depth adjustment body 3044 may be the same as the depth adjustment body 1994 disclosed above in connection with embodiment 90M (see FIGS. 20E and 20F), but in this embodiment, there is no need for the shaft 1998 and spring 1991 as described in connection with embodiment 90M. A rocker 95 is pivotally attached to the lower end of the depth adjustment body 3044.

Figure 31:
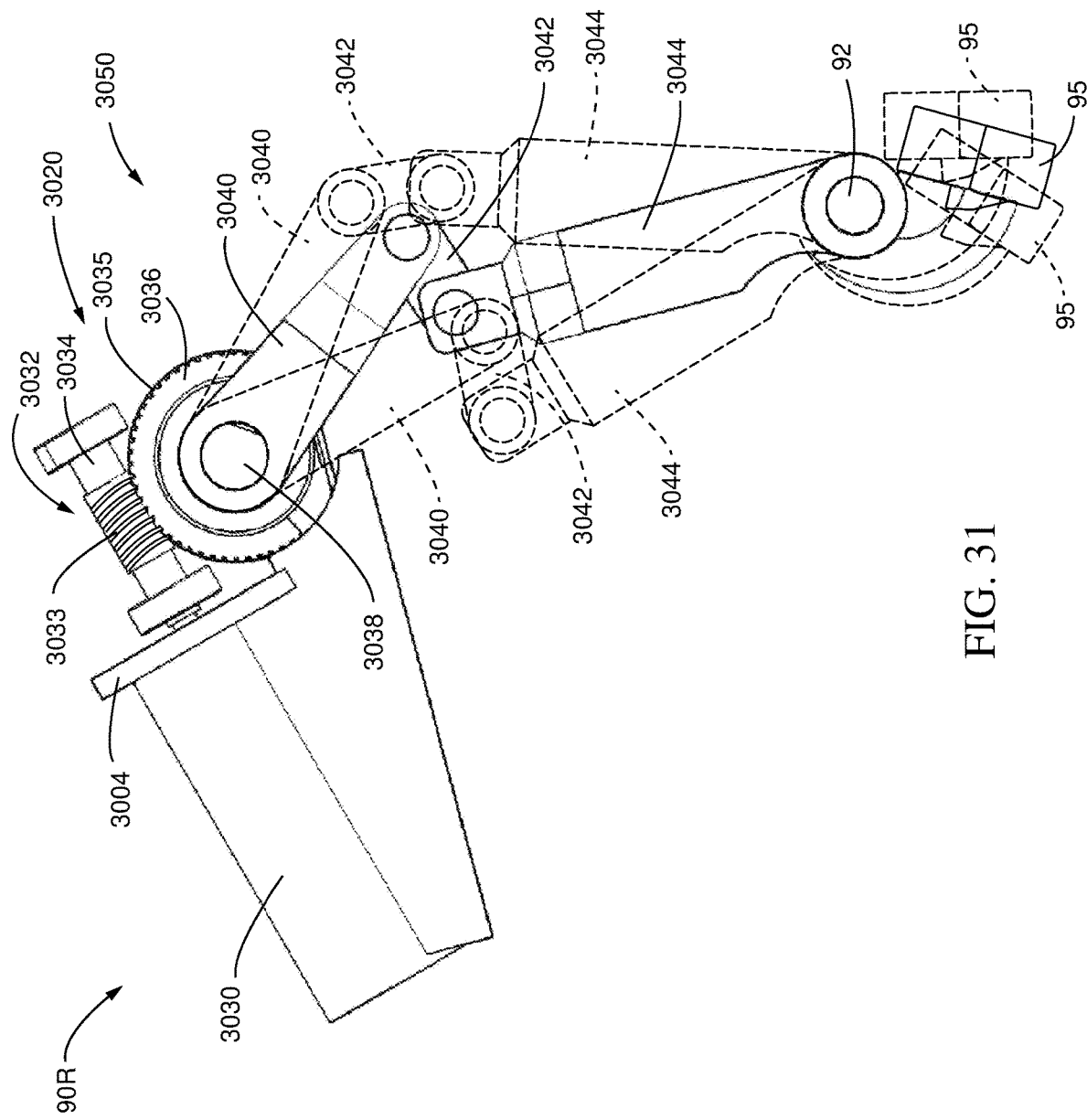
FIG. 31 is a side elevation view of the depth adjustment assembly as shown in FIG. 29 and illustrating the pivotal movement of the depth adjustment body.

FIG. 31 is a side elevation view of FIG. 29. As illustrated by dashed lines in FIG. 31, the rotation of the worm gear 3032 by the motor 3030 causes the gear wheel 3036 to rotate due to the engagement of the helical teeth 3033 with the notches 3035 of the gear wheel 3036. The rotation of the gear wheel 3036 causes the shaft 3038 to rotate, which, in turn, pivots the clevis 3040. Since the clevis 3040 is connected to the depth adjustment body 3044 by the link 3042, the depth adjustment body 3044 is forced to pivot around the pivot 92, thereby moving the rocker 95 as indicated by dashed lines. As previously explained, adjusting the position at which the rocker 95 engages with the gauge wheel arms 54 limits the upward movement of the gauge wheel arms 54, which, in turn, limits the upward travel of the bottom of the gauge wheels 52 relative to the bottom of the opening discs 62, thereby setting the depth of penetration of the opening discs 62 into the soil surface and thus, the depth of the seed furrow 3.

FIGS. 32-35 illustrate another embodiment of a depth adjustment assembly 90S. Like the previous embodiment 90R, there is an actuator 4050 which includes an electric motor 4030. The electric motor 4030, may be a servo motor, a gear motor or a stepper motor. If a gear motor is used, the gear motor may be geared so low that it is effectively self-locking when not being powered to rotate. Alternatively, if the motor 4030 is not self-locking, a brake may be incorporated to prevent rotation of the worm gear 4032, the gear wheel 4036 or shaft 4038 (all discussed later). As in the embodiment 90R, the actuator/motor 4050/4030 in this embodiment is fixed relative to the frame 14 by a mounting assembly 4000. The mounting assembly 4000 may include a mounting plate or frame 4002 that is secured to the row unit frame 14 (e.g., by bolts not shown) over the depth adjustment slots 97 of the row unit 10. A motor mount 4004 is rigidly attached to mounting frame 4002 from which the motor 4030 and the gear box 4020 are supported.

Figure 32:
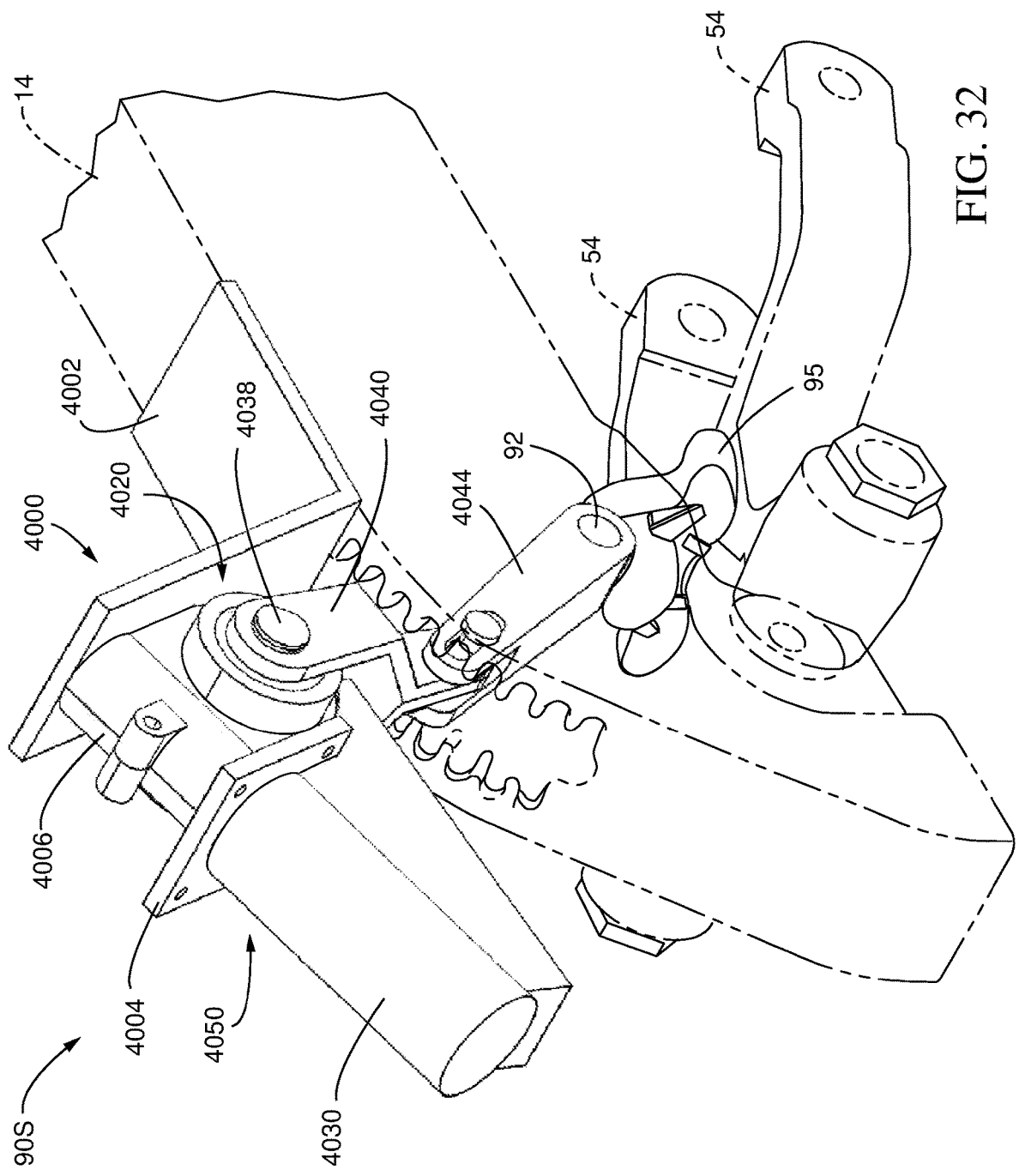
FIG. 32 is a partial perspective view of another embodiment of a depth adjustment assembly shown mounted to a frame member of a planter row unit.
Figure 33:
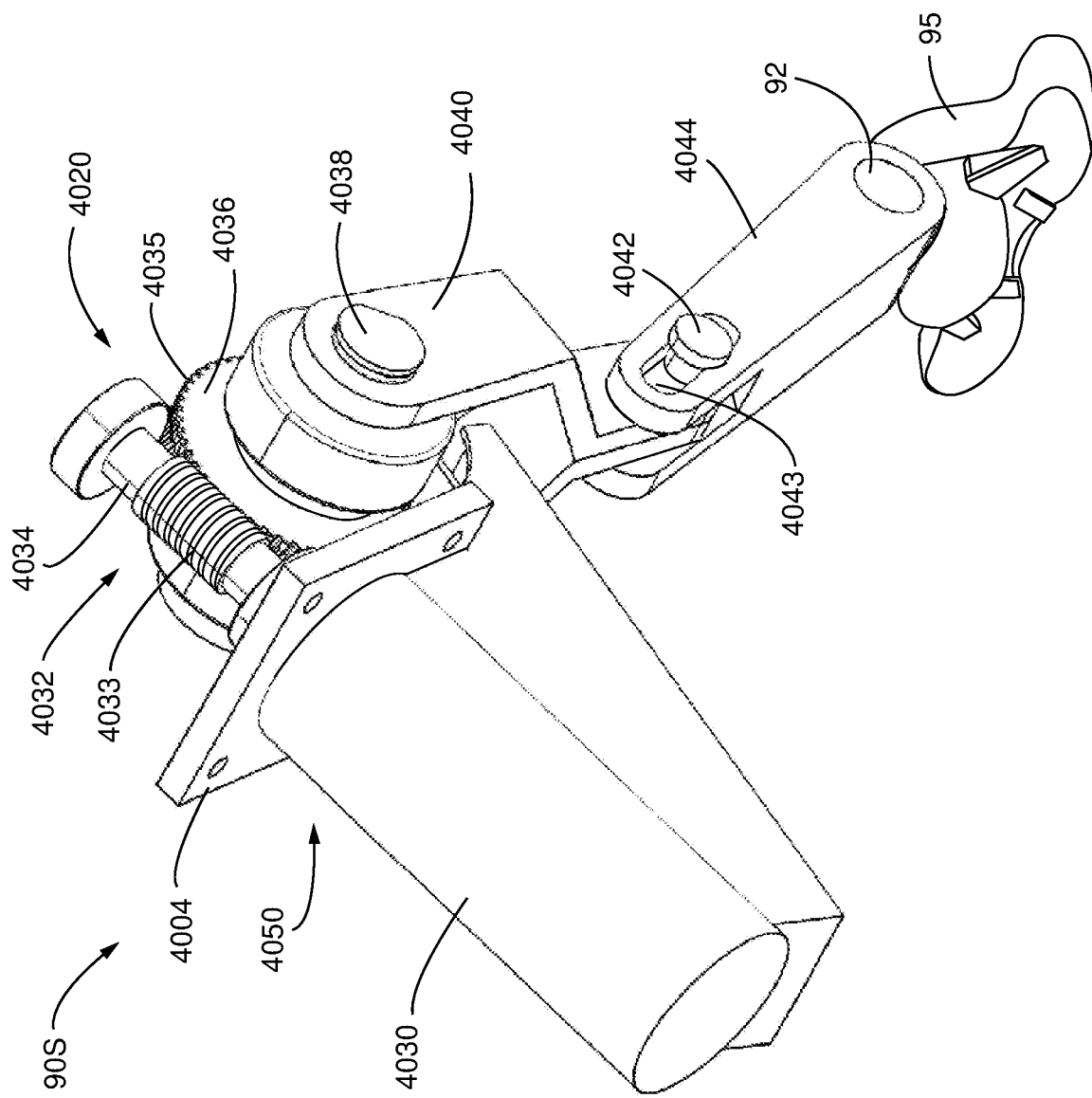
FIG. 33 is the same perspective view of the depth adjustment assembly of FIG. 32, but with components removed to show the internal components of an embodiment of the gear box.
Figure 34:
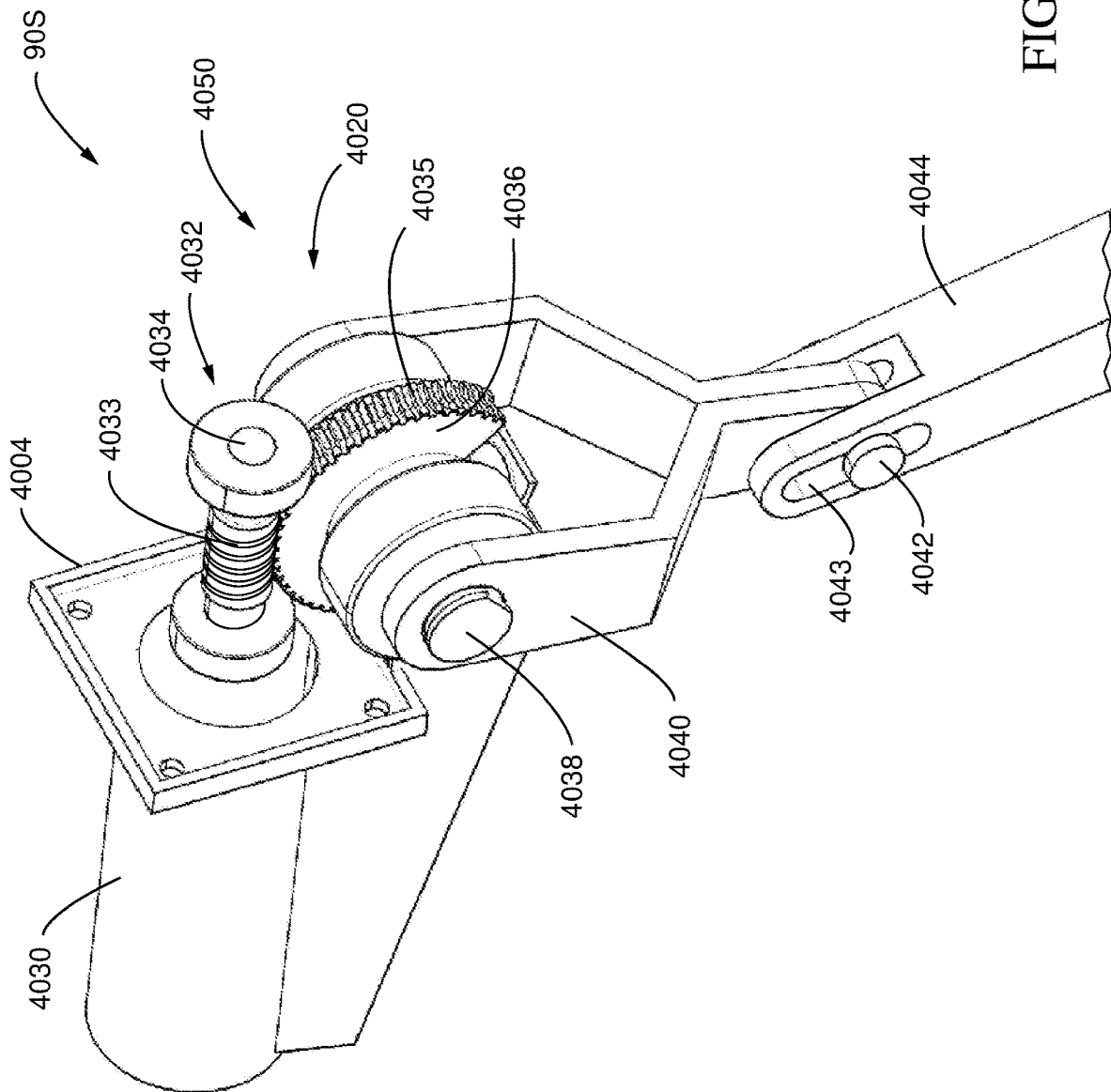
FIG. 34 is another perspective view of the depth adjustment assembly shown in FIG. 33 as viewed from the forward end looking rearward.

FIG. 33 is the same view as FIG. 32, but with the frame 14, gauge wheel arms 54, and mounting assembly 4000 removed for clarity. In addition, the gear box housing 4006 is also removed to show the structure and arrangement of the internal gears of the gear box 4020. FIG. 34 is a perspective view of FIG. 33 looking rearward. The motor 4030 is coupled to and drives a worm gear 4032 which includes helical teeth 4033 around a rotatable shaft 4034. The helical teeth 4033 engage with notches 4035 of a gear wheel 4036. The gear wheel 4036 is rotationally fixed to a transverse shaft 4038 and the transverse shaft 4038 is rotationally fixed to a clevis 4040. A depth adjustment body 4044 includes a slot 4043. A pin 4042 extends through the slot 4043 and pivotally connects the clevis 4040 to the depth adjustment body 4044. The depth adjustment body 4044 is pivotally connected to the row unit frame 14 by pivot 92. A rocker 95 is pivotally attached to the lower end of the depth adjustment body 4044.

Figure 35:
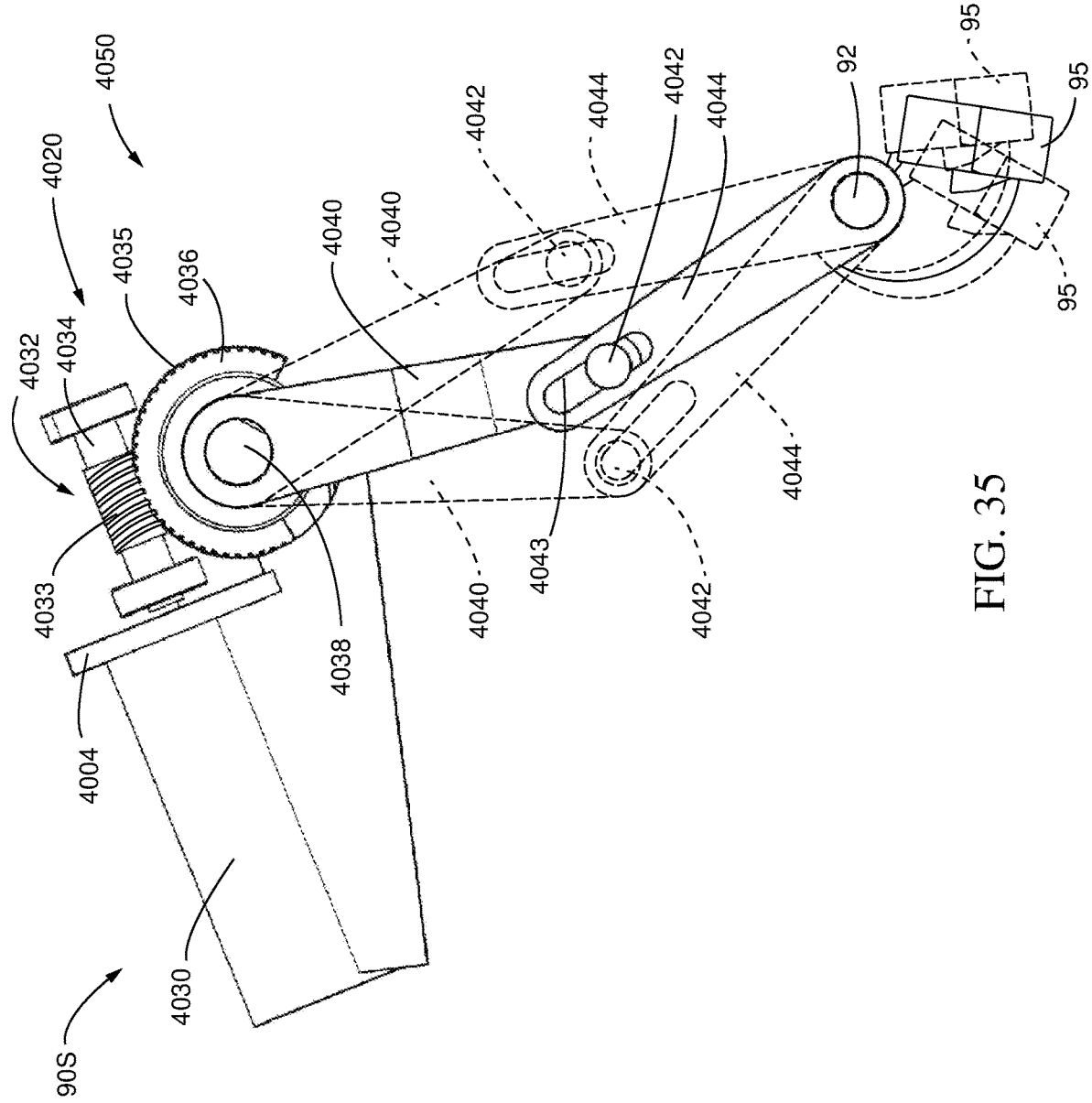
FIG. 35 is a side elevation view of the depth adjustment assembly as shown in FIG. 33 and illustrating the pivotal movement of the depth adjustment body.

FIG. 35 is a side elevation view of FIG. 33. As illustrated by dashed lines in FIG. 35, the rotation of the worm gear 4032 by the motor 4030 causes the gear wheel 4036 to rotate due to the engagement of the helical teeth 4033 with the notches 4035 of the gear wheel 4036. The rotation of the gear wheel 4036 causes the shaft 4038 to rotate, which, in turn, pivots the clevis 4040. Since the clevis 4040 is connected to the depth adjustment body 4044 by the pin 4042 movable within the slot 4043, the depth adjustment body 4044 is forced to pivot around the pivot 92, thereby moving the rocker 95 as indicated by dashed lines. As previously explained, adjusting the position at which the rocker 95 engages with the gauge wheel arms 54 limits the upward movement of the gauge wheel arms 54, which, in turn, limits the upward travel of the bottom of the gauge wheels 52 relative to the bottom of the opening discs 62, thereby setting the depth of penetration of the opening discs 62 into the soil surface and thus, the depth of the seed furrow 3.

Figure 36:
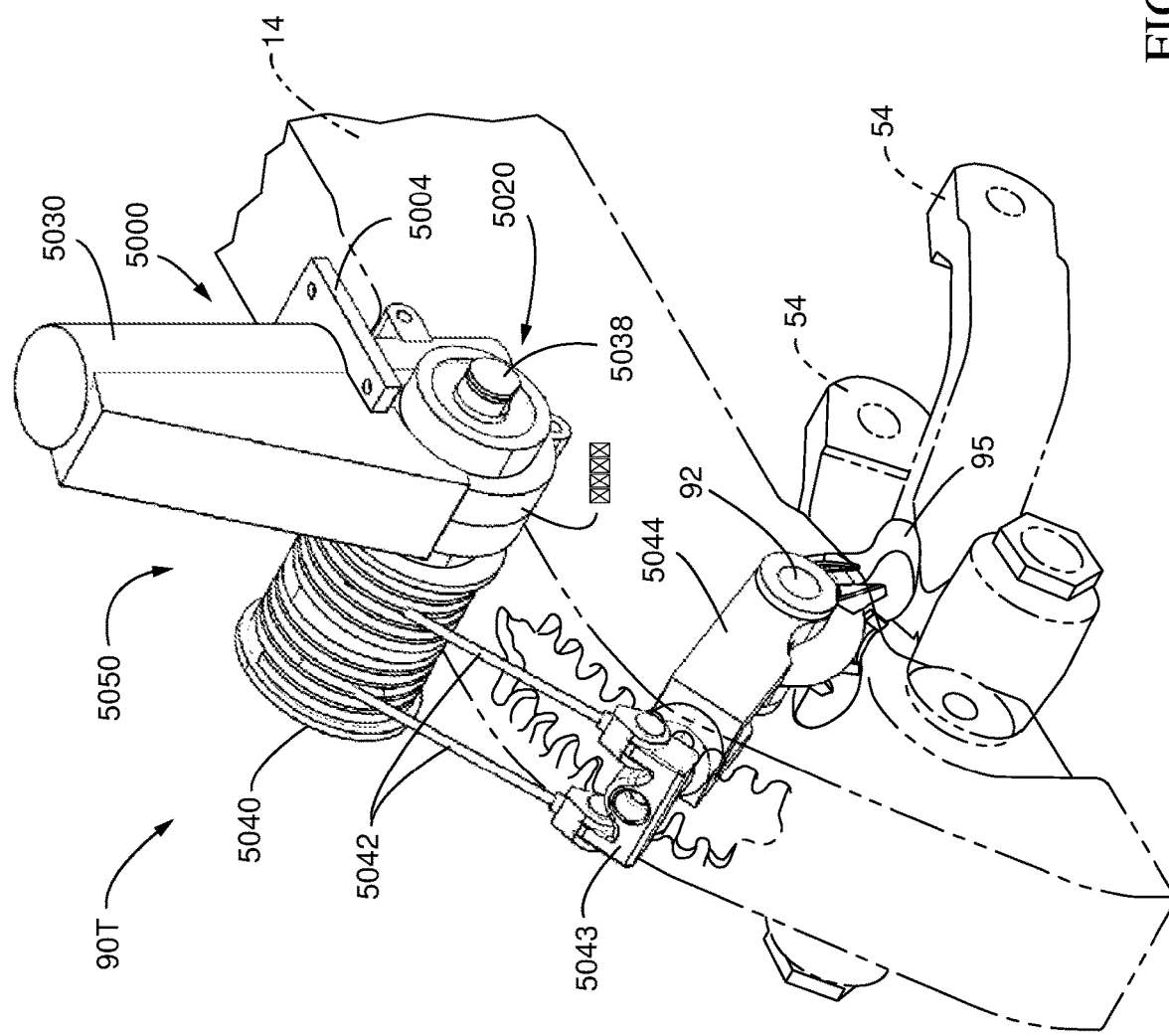
FIG. 36 is a partial perspective view of another embodiment of a depth adjustment assembly.
Figure 37:
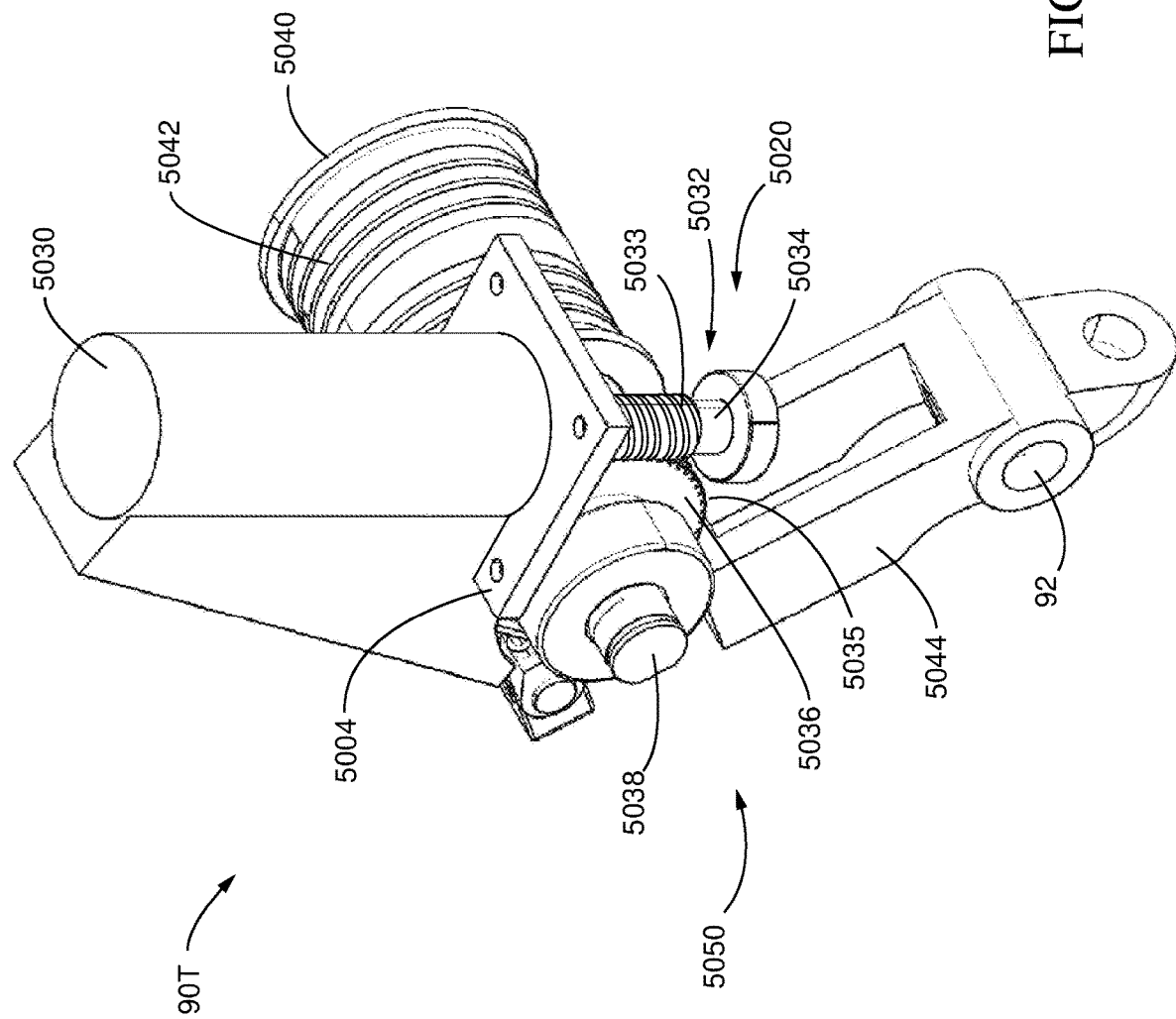
FIG. 37 is another perspective view of the depth adjustment assembly of FIG. 36 as viewed from the forward end looking rearward, but with components removed to show the internal components of an embodiment of the gear box.
Figure 38:
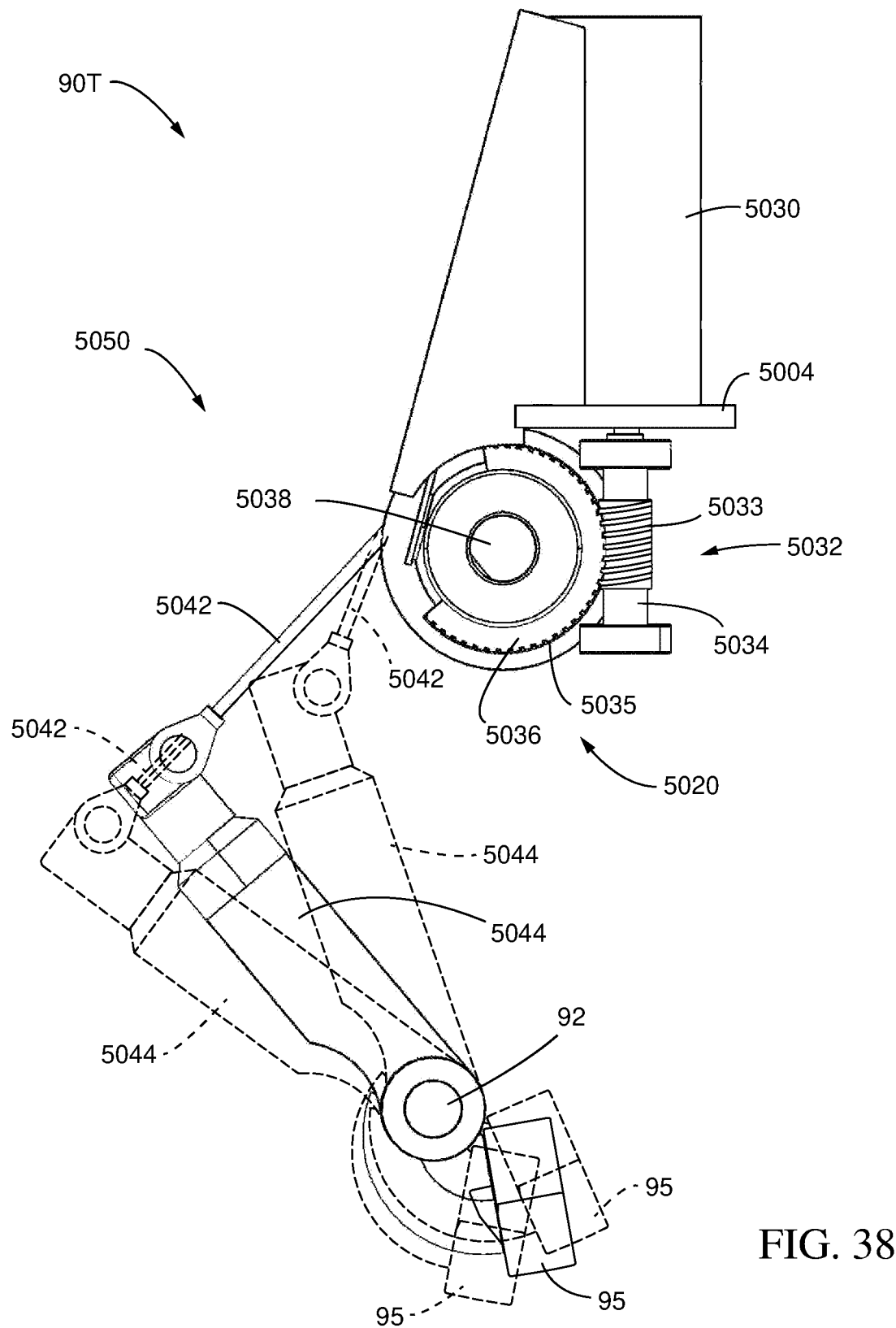
FIG. 38 is a side elevation view of the depth adjustment assembly as shown in FIG. 37 and illustrating the pivotal movement of the depth adjustment body.

FIGS. 36-38 illustrate another embodiment of a depth adjustment assembly 90T. Like the previous embodiments 90R, 90S there is an actuator 5050 which includes an electric motor 5030. The electric motor 5030, may be a servo motor, a gear motor or a stepper motor. If a gear motor is used, the gear motor may be geared so low that it is effectively self-locking when not being powered to rotate. Alternatively, if the motor 5030 is not self-locking, a brake may be incorporated to prevent rotation of the shaft 5034, the cable drum 5050, the worm gear 5032, the gear wheel 5036 or the shaft 5038 (all discussed later). As in the previous embodiments 90R, the actuator/motor 5050/5030 in this embodiment is fixed relative to the frame 14 by a mounting assembly 5000. The mounting assembly 5000 may include a motor mount 5004 which also serves to secure the depth adjustment actuator 90T to the row unit frame 14 (e.g., by bolts not shown) proximate the depth adjustment slots 97 from which the motor 5030 and the gear box 5020 are supported.

FIG. 37 is a perspective view of FIG. 36 looking rearward, but with the frame 14, gauge wheel arms 54, and mounting assembly 5000 removed for clarity. In addition, the gear box housing 5006 is also removed to show the structure and arrangement of the internal gears of the gear box 5020. The motor 5030 is coupled to and drives a worm gear 5032 which includes helical teeth 5033 around a rotatable shaft 5034. The helical teeth 5033 engage with notches 5035 of a gear wheel 5036. The gear wheel 5036 is rotationally fixed to a transverse shaft 5038 and the transverse shaft 5028 is rotationally fixed to a cable drum or pulley 5040. One or more cables 5042 (two are shown) are coiled around the cable drum 5040 with the free ends of the cable 5042 coupled to the depth adjustment body 5044 by a link 5042. The depth adjustment body 5044 is pivotally connected to the row unit frame 14 by pivot 92. A rocker 95 is pivotally attached to the lower end of the depth adjustment body 5044.

FIG. 38 is a side elevation view of FIG. 36, but with the frame 14, gauge wheel arms 54, mounting assembly 5000 and gear box housing 5006 removed for clarity. As illustrated by dashed lines in FIG. 38, the rotation of the worm gear 5032 by the motor 5030 causes the gear wheel 5036 to rotate due to the engagement of the helical teeth 5033 with the notches 5035 of the gear wheel 5036. The rotation of the gear wheel 5036 causes the shaft 5038 to rotate, which, in turn, rotates the cable spool 5040 rigidly attached for rotation therewith, causing the cables 5042 to coil or uncoil from the cable spool 5040 depending on the rotation of the shaft 5038. Since the depth adjustment body 3044 pivotally attached to the frame 14 by the pivot 92, as the cables 5042 are coiled or uncoiled from the cable spool 5040, the depth adjustment body 5044 pivots about the pivot 92 thereby moving the rocker 95 as indicated by dashed lines. As previously explained, adjusting the position at which the rocker 95 engages with the gauge wheel arms 54 limits the upward movement of the gauge wheel arms 54, which, in turn, limits the upward travel of the bottom of the gauge wheels 52 relative to the bottom of the opening discs 62, thereby setting the depth of penetration of the opening discs 62 into the soil surface and thus, the depth of the seed furrow 3.

Figure 39:
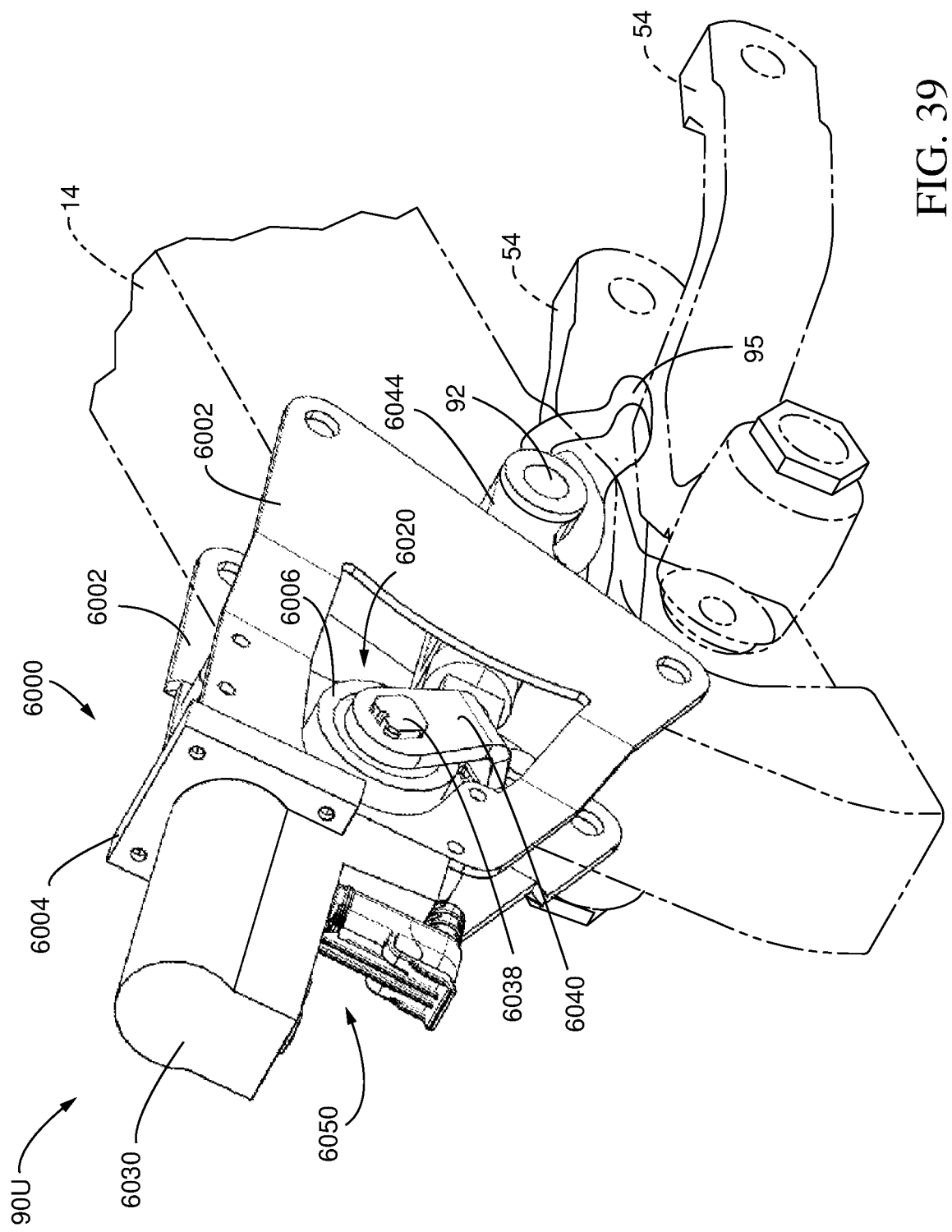
FIG. 39 is a partial perspective view of another embodiment of a depth adjustment assembly.
Figure 40:
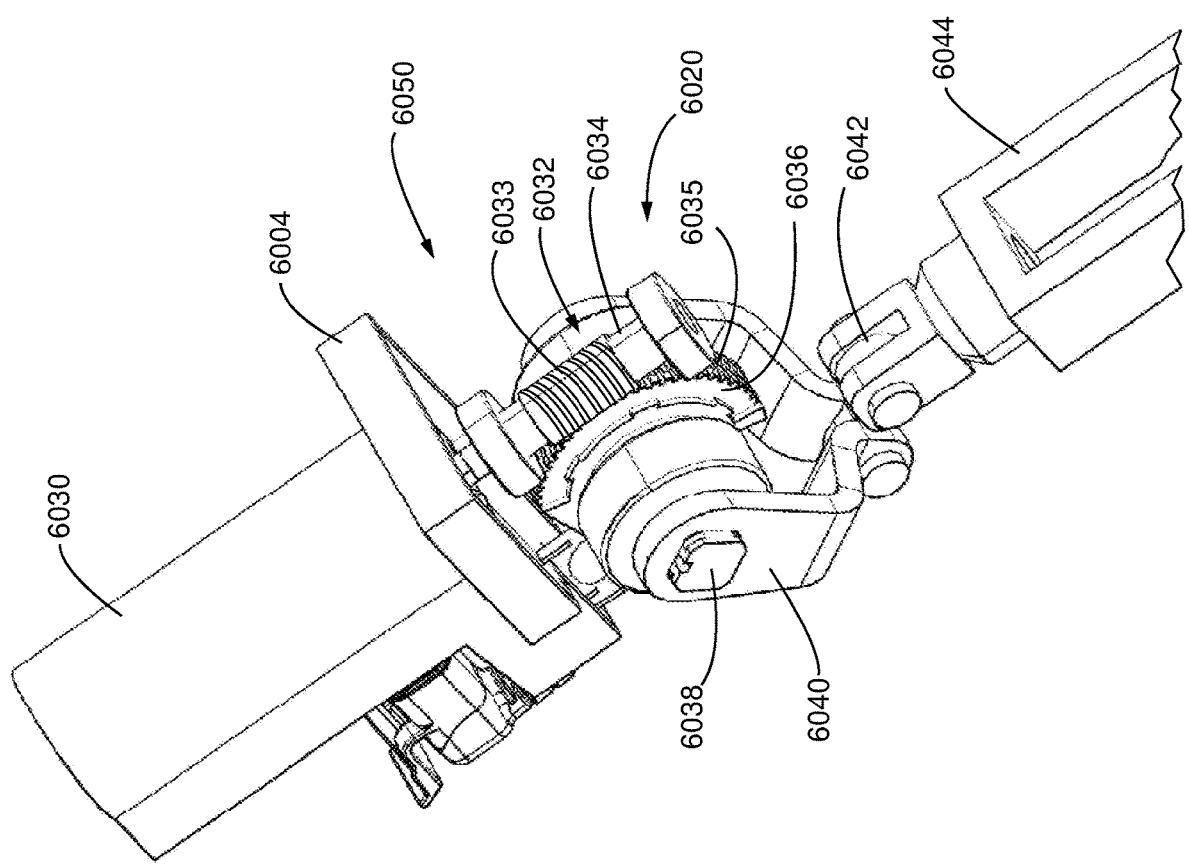
FIG. 40 is another perspective view of the depth adjustment assembly of FIG. 38 as viewed from the forward end looking rearward, but with components removed to show the internal components of an embodiment of the gear box.
Figure 41:
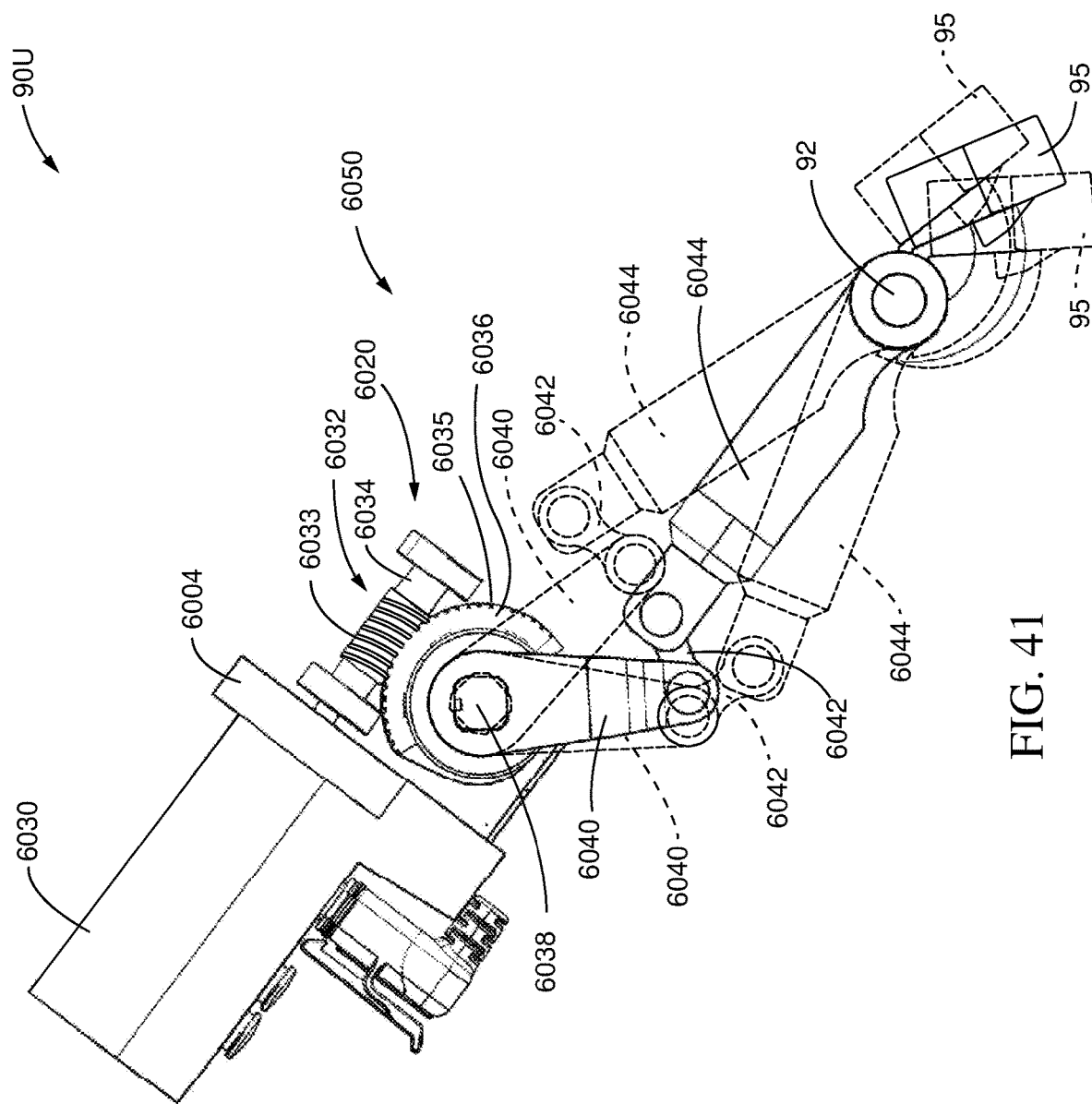
FIG. 41 is a side elevation view of the depth adjustment assembly as shown in FIG. 40 and illustrating the pivotal movement of the depth adjustment body.

FIGS. 39-41 illustrate another embodiment of a depth adjustment assembly 90U. Like the previous embodiments 90R, 90S, 90T the actuator 6050 includes an electric motor 6030. The electric motor 6030, may be a servo motor, a gear motor or a stepper motor. If a gear motor is used, the gear motor may be geared so low that it is effectively self-locking when not being powered to rotate. Alternatively, if the motor 6030 is not self-locking, a brake may be incorporated to prevent rotation of the worm gear 6032, gear wheel 6036 or the shaft 6038 (all discussed later). As in the previous embodiments 90R, 90S, 90T, the actuator/motor 6050/6030 in this embodiment is fixed relative to the row unit frame 14 by a mounting assembly 6000. The mounting assembly 6000 may include a pair of mounting plates 6002 that are secured to the sides of the row unit frame 14 (e.g., by bolts not shown) proximate the depth adjustment slots 97. A motor mount 6004 is rigidly attached to the mounting plates 6002 from which the motor 6030 and the gear box 6020 are supported.

FIG. 40 is a perspective view of FIG. 39 looking rearward, but with the frame 14, gauge wheel arms 54, mounting assembly 6000 removed for clarity. In addition, the gear box housing 6006 is also removed to show the structure and arrangement of the internal gears of the gear box 6020. The motor 6030 is coupled to and drives a worm gear 6032 which includes helical teeth 6033 around a rotatable shaft 6034. The helical teeth 6033 engage with notches 6035 of a gear wheel 6036. The gear wheel 6036 is rotationally fixed to a transverse shaft 6038 and the transverse shaft 6038 is rotationally fixed to a clevis 6040. A link 6042 pivotally connects the clevis 6040 to the depth adjustment body 6044. The depth adjustment body 6044 is pivotally connected to the row unit frame 14 by pivot 92.

FIG. 41 is a side elevation view of FIG. 39, but with the frame 14, gauge wheel arms 54, mounting assembly 6000 and gear box housing 6006 removed for clarity. As illustrated by dashed lines in FIG. 41, the rotation of the worm gear 6032 by the motor 6030 causes the gear wheel 6036 to rotate due to the engagement of the helical teeth 6033 with the notches 6035 of the gear wheel 6036. The rotation of the gear wheel 6036 causes the shaft 6038 to rotate, which, in turn, pivots the clevis 6040. Since the clevis 6040 is connected to the depth adjustment body 6044 by the link 6042, the depth adjustment body 6044 is forced to pivot around the pivot 92, thereby moving the rocker 95 as indicated by dashed lines. As previously explained, adjusting the position at which the rocker 95 engages with the gauge wheel arms 54 limits the upward movement of the gauge wheel arms 54, which, in turn, limits the upward travel of the bottom of the gauge wheels 52 relative to the bottom of the opening discs 62, thereby setting the depth of penetration of the opening discs 62 into the soil surface and thus, the depth of the seed furrow 3.

Figure 43:
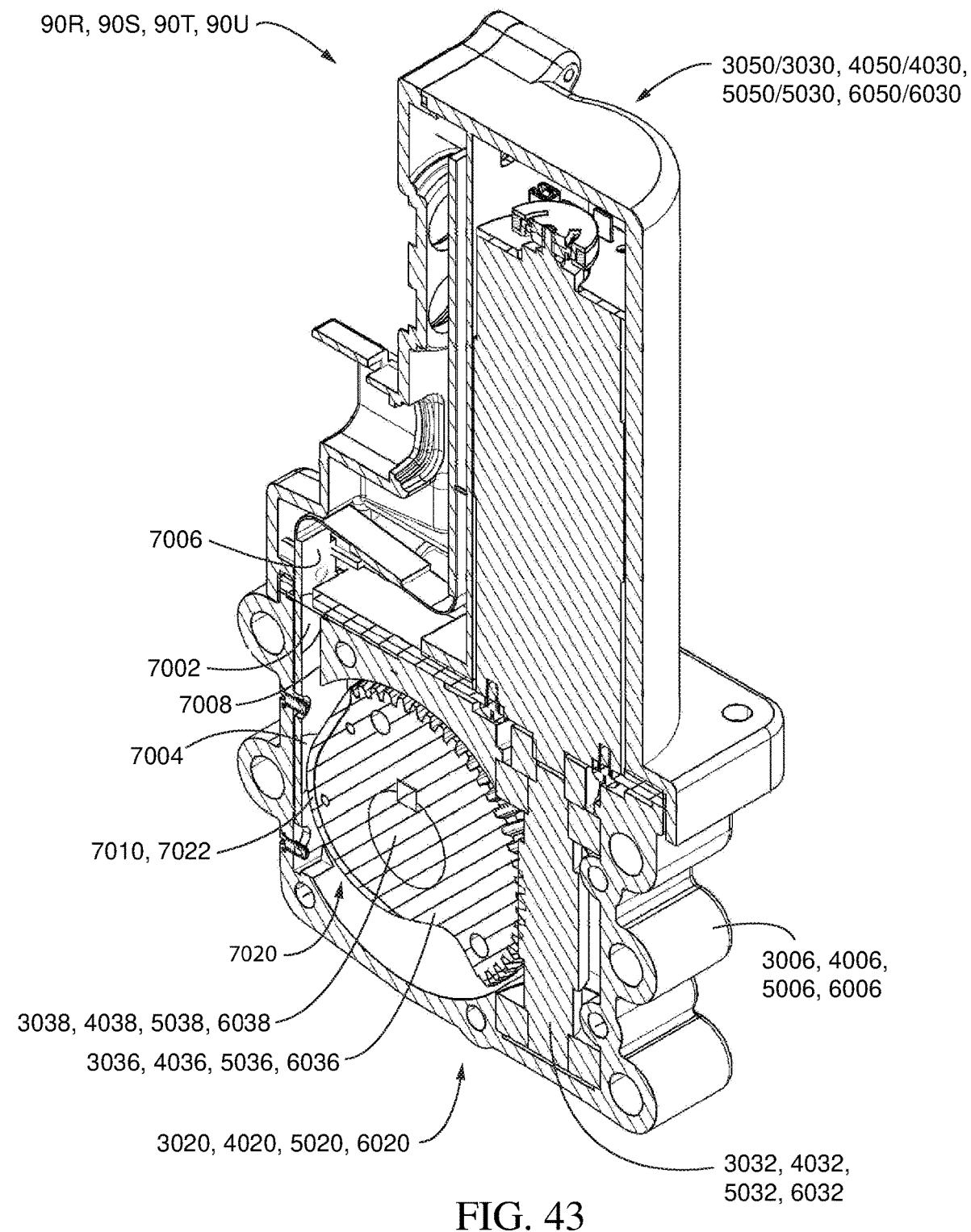
FIG. 43 is a cross-sectional perspective view of FIG. 42 as viewed along lines 43-43 of FIG. 42 and showing an embodiment of an inductance sensor.
Figure 44:
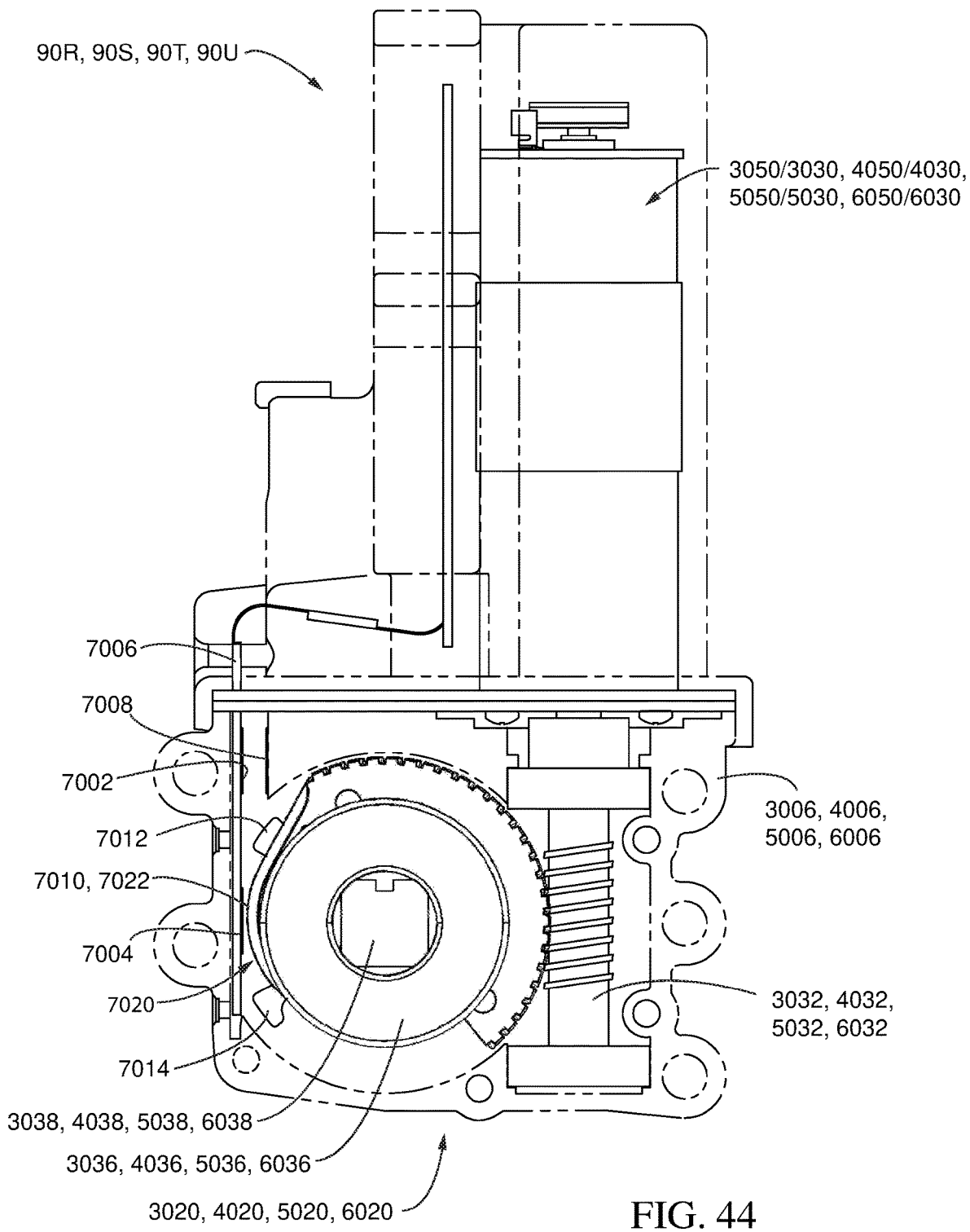
FIG. 44 is an elevation view of FIG. 43 showing the inductance sensor with the gearbox housing shown in phantom lines for clarity.

With respect to each of the depth adjustment assembly embodiments 90R, 90S, 90T, an absolute position sensor may be applied to the respective worm gear 3032, 4032, 5032, 6032, or to the respective gear wheel 3036, 4036, 5036, 6036 (or to the cable drum 5040 with respect to embodiment 90T). One such absolute position sensor may be in the form of an inductance sensor that senses a non-concentric curved surface, such that the relative distance changes as the non-concentric surface rotates. One such embodiment of an inductance sensor 7000 is shown in FIGS. 42-44.

Figure 42:
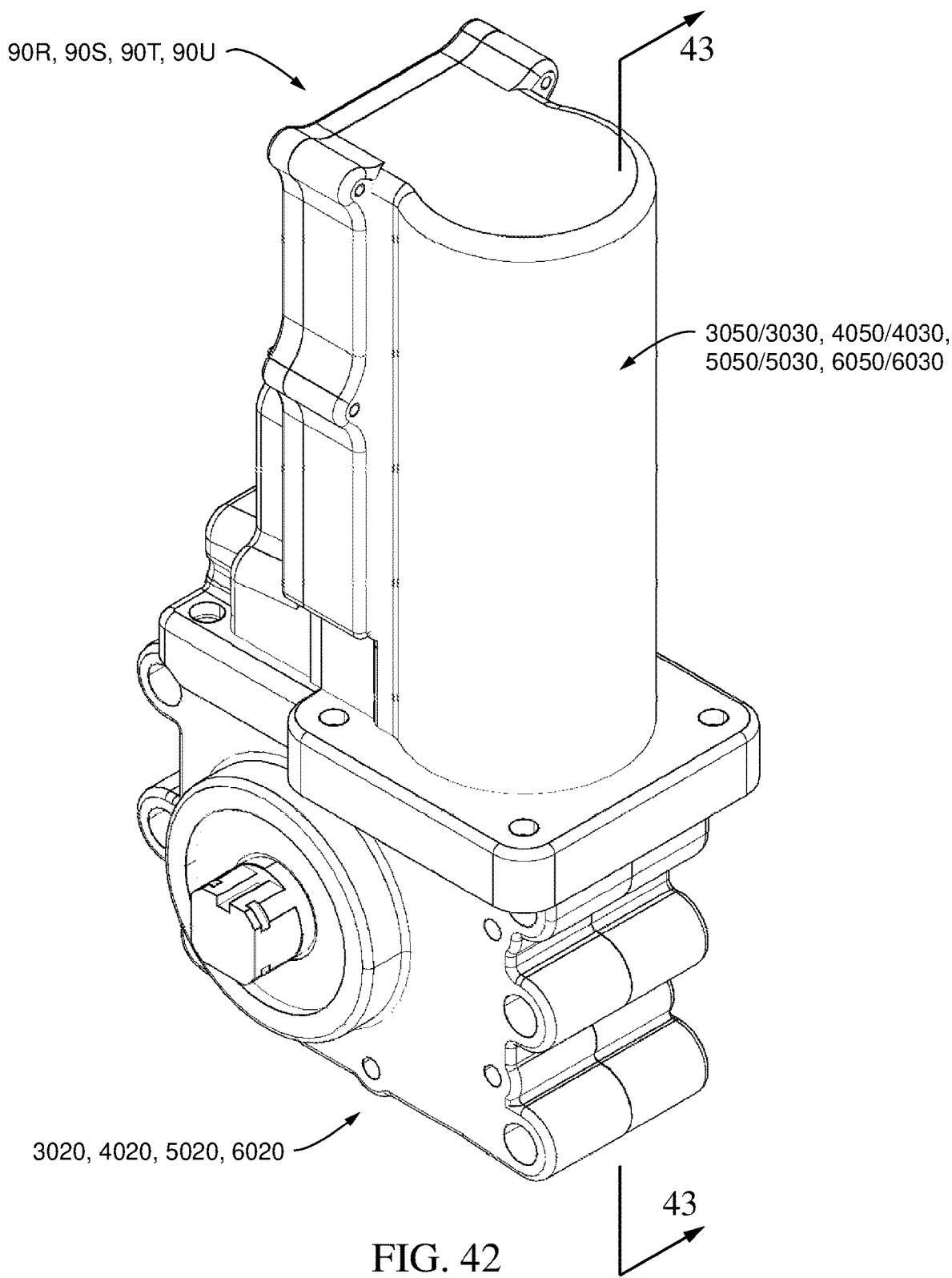
FIG. 42 is a perspective view showing an embodiment of a motor and gearbox of an actuator for a depth adjustment assembly which incorporates an inductance sensor.

FIG. 42 is a perspective view of an actuator/motor 3050/3030, 4050/4030, 5050/5030, 6050/6030 and gearbox 3020, 4020, 5020, 6020 such as described in connection with each of the respective depth adjustment assemblies 90R, 90S, 90T, 90U. FIG. 43 is a cross-section view the actuator/motor and gearbox as viewed along lines 43-43 of FIG. 42 showing an embodiment of the inductance sensor 7000. FIG. 44 is a side elevation view with the gearbox housing 3006, 4006, 5006, 6006 shown in phantom lines for clarity.

The inductance sensor 7000 utilizes contactless inductive sensing to measure the position of a conductive target, an example of a commercially available inductance sensor is the LDC131x or LDC 161x inductance sensor available from Texas Instruments. In a preferred embodiment, two inductive sensors 7002, 7004 are secured to a sensor board 7006 which extends into the gearbox housing 3006, 4006, 5006, 6006. The inductive sensors 7002, 7004 comprise coiled copper with ferrite backing for shielding. The sensor board 7006 is secured to a wall of the gearbox housing 3006, 4006, 5006, 6006 to ensure repeatable and robust placement of the inductive sensors 7002, 7004 relative to their respective targets 7008, 7010. The first inductive sensor 7002 is disposed on the sensor board 7006 relative to the first target 7008 which is secured to a stationary wall or surface of the gearbox housing 3006, 4006, 5006, 6006. Thus, the first inductive sensor 7002 with its stationary target 7008 serves as a reference sensor to detect expansion or contraction of the gearbox housing that may occur due to temperature variations. The detected changes due to expansion or contraction of the gearbox housing may be used to true-up the measurements of the second inductive sensor 7004. The second inductive sensor 7004 is disposed on the sensor board 7006 in line with the axis of the transverse shaft 3038, 4038, 5038, 6038 to which the gear wheel 3036, 4036, 5036, 6036 is rotationally fixed. The gear wheel 3036, 4026, 5036, 6036 includes a cam 7020 having a non-concentric or eccentric curved surface 7022 resulting in an eccentric profile which serves as the second target 7010 for the second inductive sensor 7004. Thus, it should be appreciated that as transverse shaft 3038, 4038, 5038, 6038 is caused to rotate due to engagement of the gear wheel 3036, 4036, 5036, 6036 with the rotating worm gear 3032, 4032, 5032, 6032 rotated by the motor 3030, 4030, 5030, 6030, the relative distance between the second inductive sensor 7004 and the eccentric profile of the second target 7010 will vary. This change in relative position of the second target 7010 with respect to the stationary second inductive sensor 7004 will thus correspond to the position of the depth adjustment body 3044, 4044, 5044, 6044, and thus the position of the gauge wheel arms 54 which correspond to the depth of penetration of the opening disc 62.

It should be appreciated that although the use of the reference sensor 7002 is preferred in order to take into account expansion or contraction of the gearbox housing for purposes of trueing-up the measurements of the second inductance sensor 7004, the reference sensor 7002 may be omitted such that the inductive sensor 7000 utilizes only one inductive sensor.

Optionally, positive stops 7012, 7014 are provided within the gear box housing 3006, 4006, 5006, 6006 to engage with the gear wheel 3036, 4036, 5036, 6036 to prevent the gear wheel from rotating too far in either direction, such that the notches 3035, 4035, 5035, 6035 of the gear wheel 3036, 4036, 5036, 6036 remain engaged with helical teeth 3033, 4033, 5033, 6033 of the worm gear 3032, 4032, 5032, 6032 and to prevent the eccentric curved surface 7022 from contact the second inductive sensor 7004.

Figure 46:
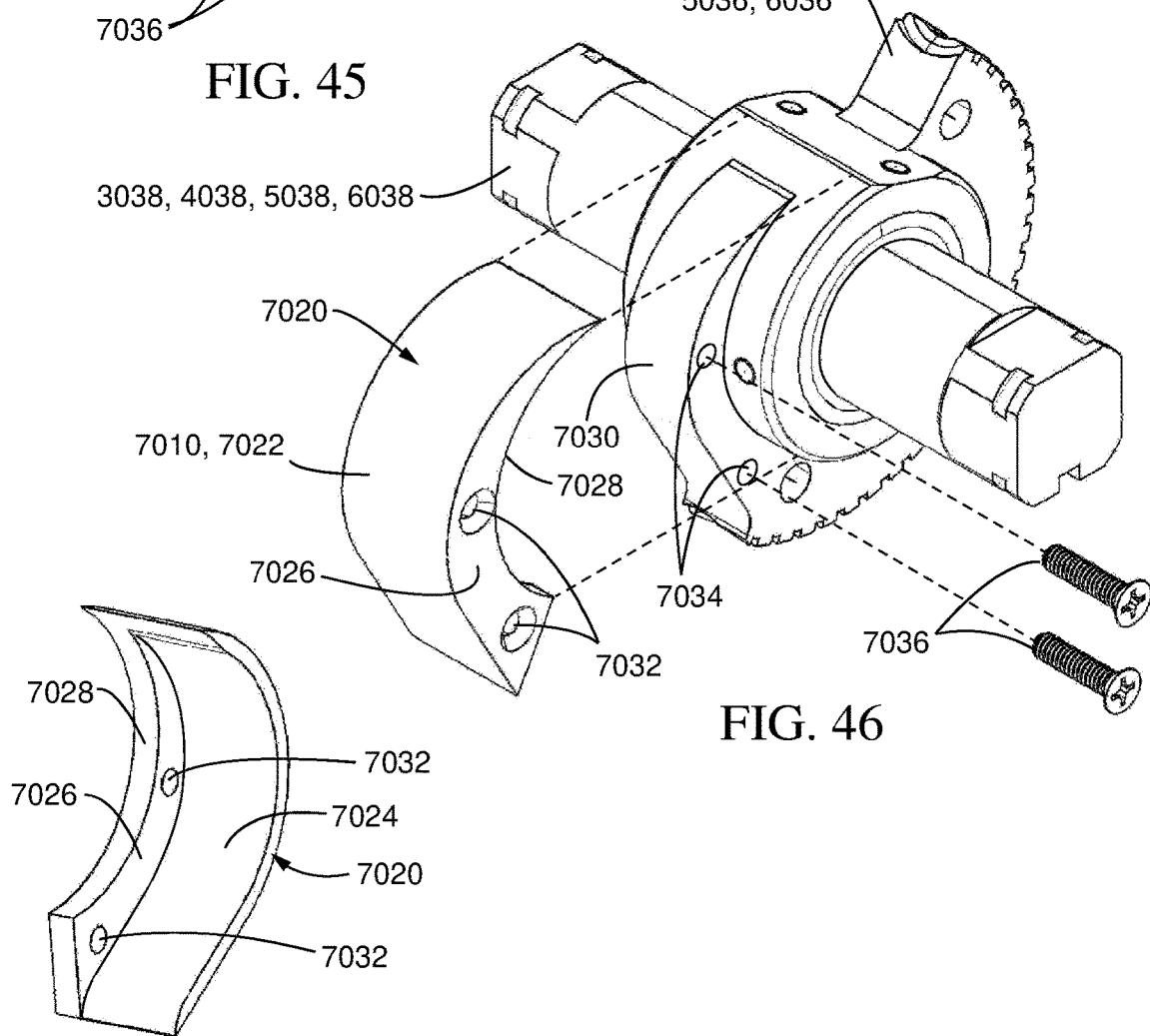
FIG. 46 is an exploded view of FIG. 45 showing the interchangeable cam removed from the gear wheel.
Figure 47:
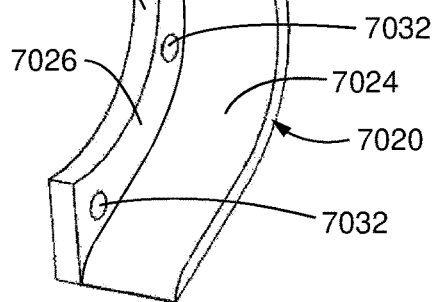
FIG. 47 is another perspective view of the interchangeable cam of FIG. 46.

The cam 7020 may be removably attached to the gear wheel 3036, 4036, 5036, 6036 such that different targets 7010 with different with eccentric curved surface profiles 7022 are interchangeable. By providing interchangeable cams 7020 that may be swapped out with one another, the depth adjustment assemblies 90R, 90S, 90T, 90U and inductance sensor 7000 can be modified depending on the configuration of the gauge wheel arms 54, the rocker 95 or the depth adjustment body 3044, 4044, 5044, 6044, which may vary by make or model of the row unit 10, or to accommodate different applications or uses for the depth adjustment assemblies 90R, 90S, 90U. By way of example, FIGS. 45-47 illustrate one embodiment for removably attaching a cam 7020 to the gear wheel 3036, 4036, 5036, 6036.

Figure 45:
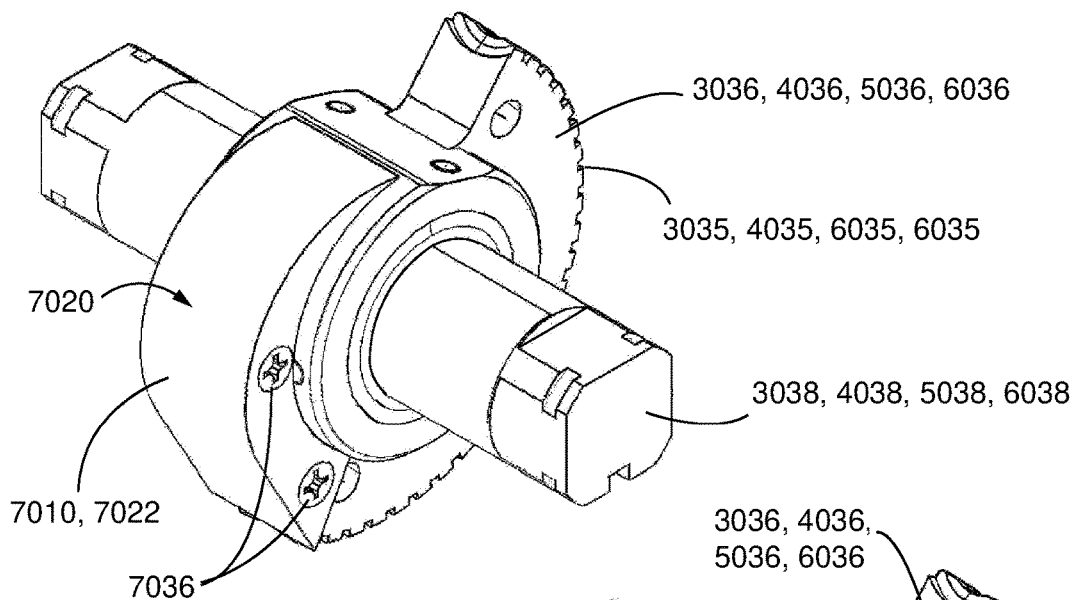
FIG. 45 is an enlarged perspective view of the gear wheel shown in FIG. 42 and showing an embodiment of an interchangeable cam for providing different targets with different eccentric curved surface profiles.

FIG. 45 is an enlarged perspective view showing the cam 7020 attached to the gear wheel 3036, 4036, 5036, 6036. FIG. 46 is an exploded perspective view of FIG. 45 showing the cam 7020 removed from the gear wheel. FIG. 47 is another perspective view of the cam 7020 shown rotated for illustration purposes. As best viewed in FIGS. 46 and 47, in one embodiment the gear wheel 3036, 4036, 5036, 6036 includes a lobe 7030 formed or machined on a side of the gear wheel opposite the notches 3035, 4035, 5035, 6035. The cam 7020 has an inner surface 7024 that mates with lobe 7030 and includes a flange 7026 with an edge 7028 that mates with a corresponding surface of the gear wheel 3036, 4036, 5036, 6036. The flange 7026 includes apertures 7032 that align with internally threaded bores 7034 in the lobe 7030. Threaded connectors 7036 extend through the apertures 7032 in the flange and are threadably received by the internally threaded bores 7034 in the lobe 7030, thus rigidly yet removably securing the cam 7020 to the gear wheel 3036, 4036, 5036, 6036 in a manner that ensures consistent and robust placement of interchangeable targets 7010 to the gear wheel to provide different eccentric curved surface profiles 7022. Those of skill in the art would recognize and appreciate that there are various other suitable means for removably fastening interchangeable targets 7010 with different eccentric curved surface profiles 7022 onto the gear wheel 3036, 4036, 5036, 6036, such that the foregoing is but one non-limiting example.

Another absolute position sensor may be in the form of a magnet and a Hall effect sensor, whereby a change in the magnetic field is detected as one rotates relative to the other. For example, a magnet may be attached to the worm gear 3032, 4032, 5032, 6032 with the hall effect sensor secured to a stationary component, such that as the magnet on the worm gear rotates relative to the Hall effect sensor the change in magnetic field is detected and which change in magnetic field is correlated to the position of the depth adjustment body 3044, 4044, 5044, 6044 and thus corresponding to the depth of the furrow 3.

Additionally, the calibration process and homing system 1970 described above in connection with the depth adjustment assembly 90P may be used with respect to each of the depth adjustment assembly embodiments 90R, 90S, 90T, 90U. However, in the embodiments 90S, 90T, 90U, because the actuator 3050, 4050, 5050, 6050 does not move relative to a gear track of the row unit frame 14 as in the embodiment 90P, the sensor 1971 and a target 1972 comprising the homing system 1970, would be placed to detect the position of the depth adjustment body 3044, 4044, 5044, 6044 relative to a home or zero position relative to fixed point. For example the sensor 1971 may be mounted on the row unit frame 14 and the target 1972 would be mounted to the depth adjustment body 3044, 4044, 5044, 6044 which pivots about the pivot 92.

Depth Control Systems

Figure 11:
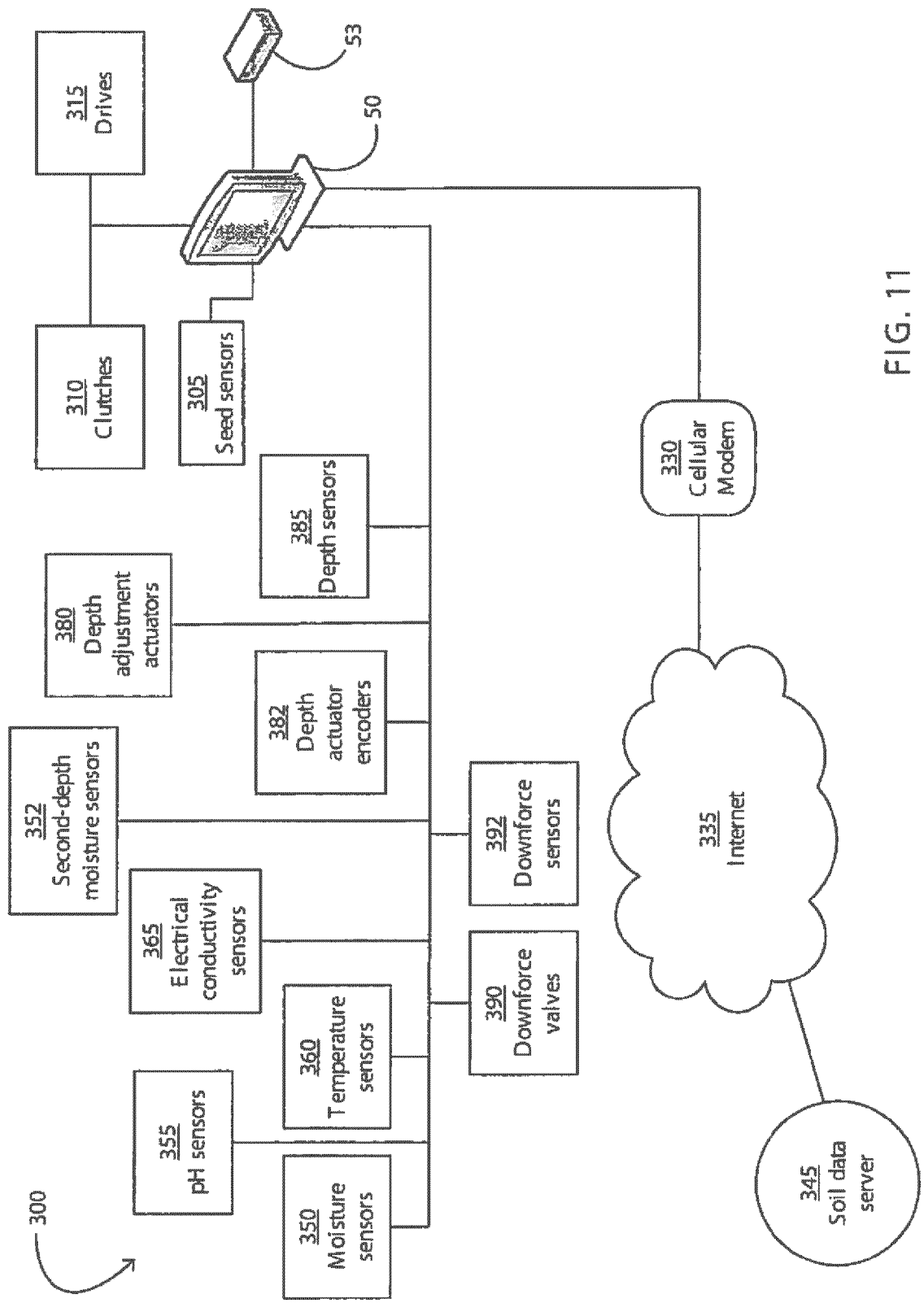
FIG. 11 schematically illustrates an embodiment of a system for controlling furrow depth.

The secondary depth adjustment actuators/motors 720, 800, 950, 1000, 1230, 1450, 1550, 1650 disclosed herein and the depth adjustment actuators/motors 1650, 1750/1730, 1850/1830, 1950/1930, 1984, 2050/2030, 3050/3030, 4050/4030, 5050/5030, 6050/6030 may be in data communication with a depth control and soil monitoring system 300 as illustrated in FIG. 11 and described herein.

In the depth control and soil monitoring system 300, a monitor 50 may be in electrical communication with components associated with each row unit 10 including seed meter drives 315, seed sensors 305, the GPS receiver 53, downforce sensors 392, downforce valves 390, depth adjustment actuators 380, and depth actuator encoders 382 (and in some embodiments actual depth sensors 385 such as those described in Applicant's International Patent Publication No. WO2014/066654, incorporated by reference herein). In some embodiments, particularly those in which each seed meter 30 is not driven by an individual drive 315, the monitor 50 may also be in electrical communication with clutches 310 configured to selectively operably couple the seed meter 30 to the drive 315.

Continuing to refer to FIG. 11, the monitor 50 is in electrical communication with a cellular modem 330 or other component configured to place the monitor 50 in data communication with the Internet, indicated by reference numeral 335. Via the Internet connection, the monitor 50 receives data from a soil data server 345. The soil data server 345 may include soil map files (e.g., shape files) associating soil types (or other soil characteristics) with GPS locations, RTK (Real Time Kinematic) data layer, elevation, or topography. In some embodiments, soil map files are stored in the memory of the monitor 50.

The monitor 50 may also be in electrical communication with one or more temperature sensors 360 mounted to the planter and configured to generate a signal related to the temperature of soil being worked by the planter row units 10. In some embodiments one or more of the temperature sensors 360 comprise thermocouples disposed to engage the soil as disclosed in Applicant's International Patent Publication No. WO2014/153157, the disclosure of which is incorporated herein in its entirety by reference. In such embodiments, the temperature sensors 360 may engage the soil at the bottom of the trench 38. In other embodiments, one or more of the temperature sensors 360 may comprise a sensor disposed and configured to measure the temperature of the soil without contacting the soil as disclosed in International Patent Publication No. WO2012/149398, the disclosure of which is hereby incorporated herein in its entirety by reference.

Referring to FIG. 11, the monitor 50 may be in electrical communication with one or more moisture sensors 350 mounted to the planter and configured to generate a signal related to the temperature of soil being worked by the planter row units 10. In some embodiments, the moisture sensor 350 comprises a reflectance sensor such as that disclosed in U.S. Pat. No. 8,204,689, hereby incorporated herein in its entirety by reference. In such embodiments, the moisture sensor 350 may be mounted to the shank 15 of the row unit 10 and disposed to measure the soil moisture at the bottom of the trench 38, preferably at a position longitudinally forward of the seed tube 32. The monitor 50 may also be in electrical communication with one or more second-depth moisture sensors 352. The second-depth moisture sensor 352 may comprise a reflectance sensor such as that disclosed in previously referenced U.S. Pat. No. 8,204,689, disposed to measure soil moisture at a depth at which consistent moisture reading is expected. In some embodiments the second-depth moisture sensor 352 is disposed to measure soil moisture at a greater depth than used for planting, such as between 3 and 6 inches and preferably approximately 4 inches below the soil surface. In other embodiments the second-depth moisture sensor 352 may be disposed to measure soil moisture at a lesser depth than used for planting, such as between 0.25 and 1 inch (0.64 and 2.54 cm) and preferably approximately 0.5 inches (1.3 cm) below the soil surface. The second-depth moisture sensor 352 may be disposed to open a trench laterally offset from the trenches 38 opened by the row units 10.

Referring to FIG. 11, the monitor 50 may be in electrical communication with one or more electrical conductivity sensors 365. The electrical conductivity sensors 365 may comprises one or more electrodes disposed to cut into the soil surface such as the sensors disclosed in U.S. Pat. Nos. 5,841,282 and 5,524,560, both of which are hereby incorporated herein in their entirety by reference.

Referring to FIG. 11, the monitor 50 may also be in electrical communication with one or more pH sensors 355. In some embodiments the pH sensors 355 are drawn by a tractor or by another implement (e.g., a tillage implement) such that data is stored in the monitor 50 for later use. In some such embodiments, the pH sensors 355 may be similar to those disclosed in U.S. Pat. No. 6,356,830. In some embodiments, the pH sensors 355 are mounted to the toolbar 8, preferably at a position laterally offset from the row units 10.

Depth Control Methods

According to some exemplary processes of controlling depth using the depth adjustment assemblies described herein, a user may manually adjust the primary and/or secondary depth adjustment assemblies.

According to some exemplary processes, the user may manually adjust the primary depth adjustment assembly and may use the monitor 50 to command a depth adjustment to the secondary depth adjustment assembly.

According to some exemplary processes, the user may manually adjust the primary depth adjustment assembly and the monitor 50 may command a desired depth adjustment to the secondary depth adjustment assembly (e.g., one of the actuators/motors 720, 800, 950, 1000, 1230, 1450, 1550, 1650) by receiving one or more agronomic variables from the sensors (e.g., sensors 350, 355, 360, 365, 352, 385) or from the soil data server 345 and determine a desired depth adjustment by consulting a database or algorithm relating one or more agronomic variables to a desired furrow depth.

According to some exemplary processes, the monitor 50 may command a desired depth adjustment to the depth adjustment assembly 1650, 1750, 1850, 1950, 1984, 2050, 3050, 4050, 5050, 6050 by receiving one or more agronomic variables from the sensors (e.g., sensors 350, 355, 360, 365, 352, 385) or from the soil data server 345 and determine a desired depth adjustment by consulting a database or algorithm relating one or more agronomic variables to a desired furrow depth.

According to some exemplary processes, the monitor 50 may command a desired depth adjustment to the depth adjustment assembly 1650, 1750, 1850, 1950, 1984, 2050, 3050, 4050, 5050, 6050 by determining the GPS-reported location of the row unit 10 and consulting a depth prescription map spatially relating locations and/or regions in the field to desired furrow depths.

Depth prescriptions are based on placing seeds at a proper depth to obtain desired germination and emergence. Factors that are used to determine a proper depth include, but are not limited to, soil type, organic matter content, moisture, soil temperature, soil texture, topography, and elevation. The depth prescription can be based on a combination of current temperature and moisture conditions in the field and the predicted temperature and moisture delivery from a weather forecast. This process is described in U.S. Patent Publication No. 2016/0037709, which is incorporated herein by reference.

In another embodiment, a minimum depth and a maximum depth set by an operator may be input into monitor 50 to control the desired depth within a range specified by the operator. The operator set minimum depth may be greater than the actual minimum depth obtainable by the depth adjustment assembly, and the operator set maximum depth may be less than the actual maximum depth obtainable by the depth adjustment assembly. This can be useful to constrain the depth to a desired depth range. For a given seed type, there can be a desired depth range for planting the seed so that the seed can germinate and emerge. When adjusting the depth based on a measured condition in the field, such as moisture, soil temperature, organic matter content, soil type, or soil texture using a sensor, such as described in U.S. Patent Publication No. US2016/0037709, the sensor may signal a depth change to go to a depth that has the selected soil property, but while trying to change to a depth to achieve the selected property, the depth may be outside of the selected range. Having the operator set minimum and maximum depths keeps the seed in the desired depth range. As an example, an operator may want corn seed to be planted between 1.75" and 2.5". If the sensor is measuring for moisture, and the moisture is insufficient at shallower depths, the depth adjustment mechanism would receive a signal to change to a deeper depth, but it can be constrained to stay within the operator selected range.

In some embodiments, the monitor 50 may record changes in depth in the field by associating commanded actuations of the actuator/motor 720, 800, 950, 1000, 1230, 1450, 1550, 1650, 1750/1730, 1850/1830, 1950/1930, 1984, 2050/2030, 3050/3030, 4050/4030, 5050/5030, 6050/6030 with GPS locations reported by the GPS receiver 52. In some such embodiments, the monitor 50 may record a change in depth concurrently with the commanded actuations of the actuator/motor 720, 800, 950, 1000, 1230, 1450, 1550, 1650, 1750/1730, 1850/1830, 1950/1930, 1984, 2050/2030, 3050/3030, 4050/4030, 5050/5030, 6050/6030. However, in operation, the force between the rocker 95 and the gauge wheel arm and/or the depth adjustment member may vary, e.g., as the row unit moves across uneven terrain. Thus, in some embodiments, the monitor may monitor the force on the gauge wheel arm and/or the depth adjustment rocker and record the change in depth only when the force is lower than a predetermined threshold. For example, with respect to the embodiment of FIG. 12, the monitor 50 may monitor the force on the gauge wheel arm and/or the depth adjustment rocker and record the change in depth only when the force is lower than a predetermined threshold at which the depth adjustment member can be advanced for a given position of the actuator 1230. The force on the gauge wheel arm and/or the depth adjustment rocker may be recorded by a load sensor such as a strain gauge mounted to the gauge wheel arm or other location through which the force is transmitted, or by a load sensing pin incorporated in the row unit as is known in the art.

In other implementations, the monitor 50 may command a temporary change (e.g., reduction) in row unit downforce applied by the downforce actuator 18 concurrently with (or before or after) a commanded change in the extension of the actuator/motor 720, 800, 950, 1000, 1230, 1450, 1550, 1650, 1750/1730, 1850/1830, 1950/1930, 1984, 2050/2030, 3050/3030, 4050/4030, 5050/5030, 6050/6030 in order to permit the depth adjustment. The monitor 50 may then command the row unit downforce applied by the actuator 18 to return to its previously commanded level.

Various modifications to the embodiments and the general principles and features of the apparatus, systems and methods described herein will be readily apparent to those of skill in the art. Thus, the appended claims should not be limited to the embodiments of the apparatus, systems and methods described herein and illustrated in the accompanying drawing figures, but should be accorded the widest scope consistent with their general teachings.

The invention claimed is:

1. An agricultural row unit, comprising:
   a row unit frame;
   a furrow opening disc rotatably supported by said row unit frame for opening a furrow in a soil surface as the row unit frame advances in a forward direction of travel;
   a gauge wheel disposed adjacent to said furrow opening disc and pivotably supported from said row unit frame by a gauge wheel arm such that said gauge wheel is displaceable with respect to said furrow opening disc;
   a depth adjustment assembly, including:
   a depth adjustment body pivotally connected via a pivot to said row unit frame, said depth adjustment body disposed to engage said gauge wheel arm to limit an amount of upward travel of said gauge wheel with respect to said furrow opening disc;
   a motor operable to cause rotation of a shaft, said shaft operably coupled with said depth adjustment body, whereby rotation of said shaft causes said depth adjustment body to pivotally move about said pivot thereby changing a position of contact of said depth adjustment body with said gauge wheel arm thus changing the amount of upward travel of said gauge wheel with respect to said furrow opening disc
   wherein said shaft is rotationally fixed to a clevis, said clevis pivotally linked to said depth adjustment body.

2. The agricultural row unit of claim 1, wherein said motor drives a worm gear, and wherein said worm gear is engaged with a gear wheel, and wherein said gear wheel is rotationally fixed to said shaft.

3. The agricultural row unit of claim 2, further comprising:
   an absolute position sensor disposed to detect a rotational position of one of said, worm gear and said gear wheel.

4. The agricultural row unit of claim 3, wherein said absolute position sensor is an inductance sensor.

5. The agricultural row unit of claim 4, wherein said absolute position sensor includes a Hall effect sensor and a magnet.

6. The agricultural row unit of claim 4, wherein said inductance sensor includes an inductive sensor disposed relative to a rotating target having a non-concentric curved surface, whereby said inductive sensor senses changes in relative distance to said rotating target.

7. The agricultural row unit of claim 6, wherein said non-concentric curved surface is removably attachable to said gear wheel.

8. The agricultural row unit of claim 2, further comprising a brake configured to prevent rotation of one of said worm gear, said gear wheel and said shaft.

9. The agricultural row unit of claim 1, wherein said motor is an electric motor, and said electric motor is one of a servo motor, a gear motor and a stepper motor.

10. The agricultural row unit of claim 1, wherein said motor is a self-locking motor.

11. The agricultural row unit of claim 10, wherein said self-locking motor is a gear motor that is geared low to effectively self-lock when said geared motor is not powered to rotate.

12. The agricultural row unit of claim 1, further comprising: a rocker connected to said depth adjustment body and engaging said gauge wheel arm.

* * * * *